United States Patent
Virnelson et al.

(10) Patent No.: US 10,883,016 B2
(45) Date of Patent: Jan. 5, 2021

(54) ACTINIC RADIATION-CURABLE URETHANE/UREA-CONTAINING AEROSPACE COATINGS AND SEALANTS

(71) Applicant: PRC-DeSoto International, Inc., Sylmar, CA (US)

(72) Inventors: Bruce Virnelson, Valencia, CA (US); Chandra Rao, Valencia, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 2 days.

(21) Appl. No.: 16/324,458

(22) PCT Filed: Aug. 8, 2017

(86) PCT No.: PCT/US2017/045871
§ 371 (c)(1),
(2) Date: Feb. 8, 2019

(87) PCT Pub. No.: WO2018/031532
PCT Pub. Date: Feb. 15, 2018

(65) Prior Publication Data
US 2019/0169465 A1    Jun. 6, 2019

Related U.S. Application Data

(60) Provisional application No. 62/372,158, filed on Aug. 8, 2016.

(51) Int. Cl.
| | | |
|---|---|---|
| *C09D 175/16* | (2006.01) | |
| *C08G 18/52* | (2006.01) | |
| *C08G 18/76* | (2006.01) | |
| *C08G 18/79* | (2006.01) | |
| *C08G 18/10* | (2006.01) | |
| *C08G 18/38* | (2006.01) | |
| *C08G 18/28* | (2006.01) | |
| *C09D 175/14* | (2006.01) | |
| *C09J 175/14* | (2006.01) | |
| *C08G 18/75* | (2006.01) | |

(52) U.S. Cl.
CPC ........... *C09D 175/16* (2013.01); *C08G 18/10* (2013.01); *C08G 18/2805* (2013.01); *C08G 18/3876* (2013.01); *C08G 18/52* (2013.01); *C08G 18/753* (2013.01); *C08G 18/7621* (2013.01); *C08G 18/7671* (2013.01); *C08G 18/792* (2013.01); *C09D 175/14* (2013.01); *C09J 175/14* (2013.01)

(58) Field of Classification Search
CPC .... C09D 175/16; C09D 175/14; C08G 18/10; C08G 18/2805; C08G 18/3876; C08G 18/52; C08G 18/753; C08G 18/7621; C08G 18/7671; C08G 18/792
See application file for complete search history.

(56) References Cited

U.S. PATENT DOCUMENTS

| | | | |
|---|---|---|---|
| 4,017,650 A | 4/1977 | Morgan | |
| 5,270,364 A | 12/1993 | Schwartz et al. | |
| 5,284,888 A | 2/1994 | Morgan | |
| 6,525,168 B2 | 2/2003 | Zook et al. | |
| 8,513,339 B1 | 8/2013 | Keledjian et al. | |
| 8,952,124 B2 | 2/2015 | Rao et al. | |
| 9,056,949 B2 | 6/2015 | Cai et al. | |
| 9,631,113 B2 * | 4/2017 | Rademacher | ........ C09D 133/14 |
| 2010/0041839 A1 | 2/2010 | Anderson et al. | |
| 2012/0040104 A1 | 2/2012 | Keledjian et al. | |
| 2012/0165498 A1 | 6/2012 | Kitano et al. | |
| 2013/0108798 A1 | 5/2013 | Bowman et al. | |
| 2014/0051789 A1 | 2/2014 | Rao et al. | |
| 2015/0252232 A1 | 9/2015 | Keledjian et al. | |
| 2017/0129986 A1 * | 5/2017 | Boghossian | ........... C08G 18/65 |

FOREIGN PATENT DOCUMENTS

| | | |
|---|---|---|
| JP | S56-065022 A | 6/1981 |
| JP | S61-179232 A | 8/1986 |
| JP | 2013-181095 A | 9/2013 |
| JP | 2013-538267 A | 10/2013 |
| JP | 2014-084393 A | 5/2014 |
| JP | 2015-501213 A | 1/2015 |
| JP | 2015-089907 A | 5/2015 |
| JP | 2015-205989 A | 11/2015 |
| WO | 2011/021363 A | 1/2013 |
| WO | 2013/062659 A1 | 5/2013 |
| WO | 2015/134885 A | 9/2015 |

OTHER PUBLICATIONS

International Search Report and Written Opinion for Application No. PCT/US2017/045871. dated Nov. 14, 2017, 8 pages.
Mather et al., "Michael addition reactions in macromolecular design for emerging technologies," *Prog. Polym. Sci.* 2006, vol. 31, p. 487-531.

* cited by examiner

*Primary Examiner* — Michael L Leonard
(74) *Attorney, Agent, or Firm* — William R. Lambert

(57) ABSTRACT

Actinic radiation-curable compositions containing polythiols and urethane/urea-containing polyalkenyl prepolymers that can be used for aerospace coatings and sealants. The coatings can be applied to surfaces and rapidly cured.

20 Claims, No Drawings

ACTINIC RADIATION-CURABLE URETHANE/UREA-CONTAINING AEROSPACE COATINGS AND SEALANTS

This application is a national phase entry of PCT International Application No. PCT/US2017/045871 filed on Aug. 8, 2017, which claims the benefit under 35 U.S.C § 119(e) of U.S. Provisional Application No. 62/372,158 filed on Aug. 8, 2016, each of which is incorporated by reference in its entirety.

FIELD

Actinic radiation-curable compositions containing polythiols and urethane/urea-containing polyalkenyl prepolymers can be used for aerospace coatings and sealants. The coatings and sealants can be used, for example, as a secondary fuel barrier on aircraft integral fuel tanks.

BACKGROUND

Curable coatings and sealants that meet the requirements of the aerospace industry are known. For example, coatings can include isocyanate-terminated prepolymers that are cured with aromatic polyamine curing agents. Such coatings and sealants can take from several days to weeks to fully cure at room temperature (23° C.) heating the part to accelerate the curing rate can be inconvenient and add expense to the coating operation.

To meet the evolving requirements of the aerospace industry new coating and sealant compositions that can be rapidly cured are desired

SUMMARY

According to the present invention, compositions comprise: a polythiol; and a polyalkenyl, wherein the polyalkenyl comprises a urethane-containing polyalkenyl prepolymer; a urea-containing polyalkenyl prepolymer; or a combination thereof.

According to the present invention, compositions are formulated as a sealant.

According to the present invention, methods of sealing a part comprise applying a composition of according to the present invention to a surface of a part; exposing the applied composition to ultraviolet radiation; and allowing the irradiated composition to cure to seal the part.

According to the present invention, parts comprise a cured composition according to the present invention.

According to the present invention, sealant systems comprise a first part, wherein the first part comprises a polythiol; and a second part, wherein the second part comprises a polyalkenyl, wherein the polyalkenyl comprises a urethane-containing polyalkenyl prepolymer; a urea-containing polyalkenyl prepolymer; or a combination thereof.

According to the present invention, methods of sealing a part, comprise: combining the first part of the sealant system according to the present invention and the second part of the sealant system according to the present invention to provide a sealant composition; applying the sealant composition to a surface of a part; exposing the applied composition to actinic radiation; and allowing the irradiated composition to cure to seal the part.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —$CONH_2$ is bonded to another chemical moiety through the carbon atom.

"Alkanediyl" refers to a diradical of a saturated, partially unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl.

"Alkanecycloalkane" refers to a saturated or partially unsaturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{7-18}$ alkanearene, $C_{7-16}$ alkanearene, $C_{7-12}$ alkanearene, $C_{7-8}$ alkanearene, $C_{7-12}$ alkanearene, $C_{7-10}$ alkanearene, or $C_{7-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{7-16}$ alkanearenediyl, $C_{7-12}$ alkanearenediyl, $C_{7-8}$ alkanearenediyl, $C_{7-12}$ alkanearenediyl, $C_{7-10}$ alkanearenediyl, or $C_{7-9}$ alkanearenediyl. Examples of alkanearenediyl groups include diphenyl methane-4,4'-diyl.

"Alkenyl" group refers to the structure $-CR=C(R)_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure $-CH=CH_2$.

"Alkoxy" refers to a $-OR$ group where R is alkyl as defined herein. Examples of alkoxy groups include methoxy, ethoxy, n-propoxy, iso-propoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, partially unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated or partially unsaturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated or partially unsaturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can be N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be N or 0.

"Heteroarenediyl" refers to an arenediyl group in which one or more of the carbon atoms are replaced with a heteroatom, such as N, O, S, or P. In a heteroarenediyl, the one or more heteroatoms can be N or O.

"Heteroalkanecycloalkanediyl" refers to an alkanecycloalkanediyl group in which one or more of the carbon atoms are replaced with a heteroatom, such as N, O, S, or P. In a heterocycloalkanediyl, the one or more heteroatoms can be N or O.

"Heteroalkanearenediyl refers to a alkanearenediyl group in which one or more of the carbon atoms are replaced with a heteroatom, such as N, O, S, or P. In a heterocycloalkanediyl, the one or more heteroatoms can be N or O.

"Substituted" refers to a group in which one or more hydrogen atoms are each independently replaced with the same or different substituent(s). A substituent can be halogen, $-S(O)_2OH$, $-S(O)_2$, $-SH$, $-SR$ where R is $C_{1-6}$ alkyl; $-COOH$, $-NO_2$, $-NR_2$ where each R is independently hydrogen or $C_{1-3}$ alkyl; $-CN$, $=O$, $C_{1-6}$ alkyl, $-CF_3$, $-OH$, phenyl, $C_{2-6}$ heteroalkyl, $C_{5-8}$ heteroaryl, $C_{5-6}$ cycloalkyl, $C_{5-6}$ heterocycloalkyl, $C_{1-6}$ alkoxy, $-COOR$ where R is $C_{1-6}$ alkyl, or $-COR$ where R is $C_{1-6}$ alkyl. A substituent can be $-OH$, $-NH_2$, or $C_{1-3}$ alkyl.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product(s) of the recited reactants, and can include partial reaction products as well as fully reacted products and other reaction products that are present in a lesser amount.

As used herein, the term "cure" or "cured" as used in connection with a composition, e.g., "composition when cured" or a "cured composition", means that any curable or cross-linkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer such as a thiol-terminated sulfur-containing prepolymer provided by the present disclosure can be combined with a curing agent to provide a curable composition, which can cure to provide a cured polymer network. Prepolymers are liquid at room temperature (20° C. to 25° C.) and pressure (760 torr; 101 kPa). For example, a prepolymer provided by the present disclosure can have a glass transition temperature $T_g$, for example, less than −20° C., less than −30° C., or less than −40° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve. A prepolymer provided by the present disclosure can exhibit a viscosity, for example, within a range from 20 poise to 1,000 poise (2 Pa-sec to 100 Pa-sec), from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

A "curable composition" refers to a composition that comprises at least two reactants capable of reacting to form a cured composition. For example, a curable composition can comprise a thiol-terminated polythioether prepolymer and a polyepoxide capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as a thiol-terminated polythioether prepolymer and the accelerator component can contain the other reactant such as a polyepoxide. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed and the viscosity of the curable composition can increase and at some point will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardness from 40 Shore A to 70 Shore A, determined according to ASTM 2240.

"Derived from" as in "a moiety derived from a compound" refers to a moiety that is generated upon reaction of a parent compound with a reactant. For example, a bis(alkenyl) compound such as $CH_2$=CH—R—CH=$CH_2$ can react with another compound such as two compounds having thiol groups to produce the moiety —$(CH_2)_2$—R—$(CH_2)_2$— derived from the reaction.

"Derived from the reaction of —V with a thiol" refers to a moiety —V'— that results from the reaction of a thiol group with a moiety comprising a terminal group reactive with a thiol group. For example, a group V— can be $CH_2$=CH—$CH_2$—O—, where the terminal alkenyl group $CH_2$=CH— is reactive with a thiol group —SH. Upon reaction with a thiol group, the moiety —V'— is —$CH_2$—$CH_2$—$CH_2$—O—.

"Backbone" such as a backbone of a prepolymer refers to the repeating segments of the prepolymer. For example, for a prepolymer having the structure R-$[A]_n$-R the repeating segment is -[A]- is backbone of the prepolymer refers to the moiety -$[A]_n$-.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer.

Specific gravity and density of compositions and sealants is determined according to ISO 2781.

Specific gravity and density of fillers is determined according to ISO 787 (Part 10).

Glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Viscosity is measured according to ASTM D-2849 § 79-90 using a Brookfield CAP 2000 viscometer, with a No. 6 spindle, at speed of 300 rpm, and a temperature of 25° C.

"Cycloalkanediyl" refers to a diradical of a saturated or partially monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

A urethane/urea-containing polythiol refers to a polythiol that has at least one urethane group —NH—CO—O— or at least one urea group —NH—CO—NH— in the polythiol. A urethane/urea-containing polythiol can have both a urethane group and a urea group in the polythiol.

A urethane/urea-containing polythiol prepolymer refers to a polythiol prepolymer having a backbone comprising at least one urethane and/or urea segment. For example, the repeating segment of the urethane/urea-containing polythiol comprises at least one urethane and/or urea segment.

A urethane/urea-containing polyalkenyl refers to a polyalkenyl that has at least one urethane group —NH—CO—O— or at least one urea group —NH—CO—NH— in the polyalkenyl. A urethane/urea-containing polyalkenyl can have both a urethane group and/or a urea group.

A urethane/urea-containing polyalkenyl prepolymer refers to a polyalkenyl prepolymer having a backbone comprising at least one urethane and/or urea segment. For example, the repeating segment of the urethane/urea-containing polyalkenyl comprises at least one urethane and/or urea segment.

A "polythiol" refers to a compound having at least two thiol groups. The at least two thiol groups can be terminal thiol groups and such polythiols can be referred to as thiol-terminated compounds. Thiol groups can also be pendent thiol groups. A polythiol can be a dithiol, having two thiol groups. A polythiol can have more than two thiol groups such as from three to six thiol groups. A polythiol can comprise a single type of polythiol, can be a combination of polythiols having the same thiol functionality, or can be a combination of polythiols representing different types of polythiols and/or different thiol functionalities. A polythiol includes polythiol prepolymers and monomeric polythiols.

A "polythiol prepolymer" refers to a polythiol having at least one repeat unit in the polythiol backbone. A polythiol prepolymer can have a weight average molecular weight, for example, from 500 Daltons to 6,000 Daltons, such as from 500 Daltons to 4,000 Daltons, from 500 Daltons to 3,000 Daltons, or from 500 Daltons to 2,000 Daltons. The dithiols of Examples 3 and 4 are examples of polythiol prepolymers.

A "monomeric polythiol" refers to a low molecular weight polythiol. A monomeric polythiol generally has a molecular weight that is less than that of a polythiol prepolymer. Monomeric polythiols can be difunctional or can have a thiol functionality greater than two. For example, certain trifunctional polythiols, such as the trifunctional polythiol of Example 5 may be considered a monomeric trifunctional polythiol. A monomeric polythiol can have a molecular weight, for example, from 100 Daltons to 300 Daltons, from 100 Daltons to 500 Daltons, from 100 Daltons to 750 Daltons, of from 100 Daltons to 1,000 Daltons.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls representing different types of polyalkenyls and/or different alkenyl functionalities. A polyalkenyl includes polyalkenyl prepolymers and monomeric polyalkenyls.

A "polyalkenyl prepolymer" refers to a polyalkenyl having at least one repeat unit in the polyalkenyl backbone. A polyalkenyl prepolymer generally has a weight average molecular weight from 500 Daltons to 6,000 Daltons, such as from 500 Daltons to 4,000 Daltons, from 800 Daltons to 3,000 Daltons, or from 500 Daltons to 2,000 Daltons. The polyalkenyl of Example 1 is an example of a polyalkenyl prepolymer.

A "monomeric polyalkenyl" refers to a polyalkenyl that does not include repeat units in the polyalkenyl backbone. A monomeric polyalkenyl can have a weight average molecular weight that is less than that of a polyalkenyl prepolymer. Monomeric polyalkenyls can be difunctional or have an alkenyl functionality greater than two. For example, certain trifunctional polyalkenyls, such as the trifunctional polyalkenyl of Example 3 may be considered a monomeric trifunctional polyalkenyl. A monomeric polyalkenyl can have a molecular weight, for example, from 100 Daltons to 300 Daltons, from 100 Daltons to 500 Daltons, from 100 Daltons to 750 Daltons, of from 100 Daltons to 1,000 Daltons.

"Polyfunctionalizing agent" refers to a compound having reactive functionality of three or more, such as from 3 to 6. A polyfunctionalizing agent can three reactive functional groups and can be referred to as a trifunctionalizing agent. Polyfunctionalizing agents can be used as precursors for synthesizing the sulfur-containing prepolymers provided by the present disclosure and/or can be used as a reactant in the polymer curing composition to increase the crosslinking density of the cured polymer network. A polyfunctionalizing agent can have reactive terminal thiol groups, reactive terminal alkenyl groups, or a combination thereof. A polyfunctionalizing agent can have a calculated molecular weight less than 1,000 Daltons, less than 800 Daltons, less than 600 Daltons, less than 400 Daltons, or less than 200 Daltons. A polyfunctionalizing agent can have the structure

where B is the core of the polyfunctionalizing agent, each V is a moiety terminated in a reactive functional group such as a thiol group or an alkenyl group, and z is an integer from 3 to 6, such as 3, 4, 5, or 6.

In polyfunctionalizing agents, each —V can have the structure, for example, —R—SH or —R—CH=CH$_2$, where R can be C$_{2-10}$ alkanediyl, C$_{2-10}$ heteroalkanediyl, substituted C$_{2-10}$ alkanediyl, or substituted C$_{2-10}$ heteroalkanediyl. A polyfunctionalizing agent can be terminated in other functional groups such as epoxy groups, isocyanate groups, hydroxyl, amino, or Michael acceptor groups.

In a polyfunctionalizing agent, each —V can have the structure —R$^7$-R$^8$ where R$^8$ is a reactive terminal group such as an alkenyl, thiol, isocyanate, epoxy, hydroxyl, amino, or Michael acceptor group, and each R$^7$ can be, for example, C$_{1-8}$ alkanediyl, C$_{1-8}$ heteroalkanediyl, substituted C$_{1-8}$ alkanediyl, and substituted C$_{1-8}$ heteroalkanediyl, In polyfunctionalizing agents, B can be C$_{2-8}$ alkane-triyl, C$_{2-8}$ heteroalkane-triyl, C$_{5-8}$ cycloalkane-triyl, C$_{5-8}$ heterocycloalkane-triyl, substituted C$_{5-8}$ cycloalkane-triyl, C$_{5-8}$ heterocycloalkane-triyl, C$_6$ arene-triyl, C$_{3-5}$ heteroarene-triyl, substituted C$_6$ arene-triyl, or substituted C$_{3-5}$ heteroarene-triyl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated. Examples of suitable thiol-terminated polyfunctionalizing agents include 1,3,5-triazine-2,4-6-trithiol and propane-1,2,3-trithiol.

"A moiety derived from reaction with an isocyanate group" refers to a moiety produced by the reaction of a parent moiety with an isocyanate group. For example, a hydroxyl-terminated parent moiety having the structure —R$^1$—OH, upon reaction with a moiety having a terminal isocyanate group —R$^2$—N=C=O, will produce the moiety —R$^1$—O—C(=O)—NH—R$^2$— and the moiety —O—C(=O)—NH— is said to be derived from reaction of —R$^1$—OH with the isocyanate group.

A compound having a thiol functionality or an alkenyl functionality refers to a compound which has reactive thiol or reactive alkenyl groups, respectively. The reactive thiol or reactive alkenyl groups may be terminal groups bonded to the ends of the molecule, may be bonded to the backbone of the molecule, or the compound may contain thiol or alkenyl groups that are terminal groups or that are bonded to the backbone.

"Core of a diisocyanate" refers to the moiety between the two isocyanate groups of a diisocyanate. For example, for a diisocyanate having the general structure O=C=N—R—N=C=O, the moiety —R— represents the core of the diisocyanate between the two isocyanate groups —N=C=O. As a further example, the core of the diisocyanate 4,4'-methylene dicyclohexyl diisocyanate ($H_{12}MDI$) having the structure:

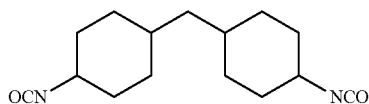

is represented by the structure

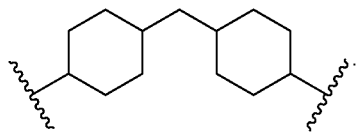 [SMILES: *C1CCC(CC2CCC(*)CC2)CC1]

A "core of a polyol" refers to a moiety of a polymeric polyol between the terminal hydroxyl groups. For example, the core of a polymeric polyol having the structure HO—(—$(CH_2)_4$—O—)$_n$—H is —(—$(CH_2)_4$—O—)$_n$—$(CH_2)_4$—.

A "core" of a compound refers to the segment between the reactive terminal groups. For example, the core of a polythiol HS—R—SH will be —R—.

A "backbone" of a prepolymer refers to a repeating segment of a prepolymer between the reactive terminal groups. For example, in a prepolymer having the structure HS—$R^1$—$[R^2]_3$—$R^3$—SH, the backbone of the prepolymer refers to element —$[R^2]_3$— having repeating segments —$[R^2]$—.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Compositions provided by the present disclosure can comprise urethane/urea-containing polythiol prepolymer and/or a urethane/urea-containing polyalkenyl prepolymer.

Compositions provided by the present disclosure can comprise a urethane/urea-containing dithiol prepolymer and a urethane/urea dialkenyl prepolymer.

Compositions provided by the present disclosure can comprise a urethane/urea-containing polythiol prepolymer and/or a monomeric urethane/urea-containing polythiol and a urethane/urea-containing polyalkenyl prepolymer and/or a monomeric urethane/urea-containing polyalkenyl.

Compositions provided by the present disclosure can comprise a urethane/urea-containing dialkenyl prepolymer, a urethane/urea-containing dithiol prepolymer, and a hydroxyl-functional polythiol such as a hydroxyl-functional dithiol.

Compositions provided by the present disclosure can comprise a urethane/urea-containing polyalkenyl prepolymer, a urethane/urea-containing polythiol prepolymer, a monomeric polyalkenyl, and a hydroxyl-functional polythiol.

Compositions provided by the present disclosure can comprise a urethane/urea-containing polyalkenyl prepolymer, and a polythiol.

Compositions provided by the present disclosure can comprise (a) a polythiol; and (b) a polyalkenyl comprising a urethane-containing polyalkenyl prepolymer, a urea-containing polyalkenyl prepolymer, or a combination thereof.

Compositions provided by the present disclosure can comprise (a) a polythiol prepolymer, wherein the polythiol prepolymer comprises a urethane-containing polythiol prepolymer, a urea-containing polythiol prepolymer, a polythiol prepolymer that does not contain a urethane group or urea group, or a combination of any of the foregoing; and (b) a polyalkenyl prepolymer, wherein the polyalkenyl prepolymer comprises a urethane-containing polyalkenyl prepolymer, a urea-containing polyalkenyl prepolymer, a polyalkenyl prepolymer that does not contain a urethane group or urea group, or a combination of any of the foregoing.

Compositions provided by the present disclosure can comprise (a) a polythiol prepolymer, wherein the polythiol prepolymer comprises a urethane-containing dithiol prepolymer, a urea-containing dithiol prepolymer, a dithiol prepolymer that does not contain a urethane group or urea group, or a combination of any of the foregoing; and (b) a polyalkenyl prepolymer comprising a urethane-containing dialkenyl prepolymer, a urea-containing dialkenyl prepolymer, a dialkenyl prepolymer that does not contain a urethane group or urea group, or a combination of any of the foregoing Compositions provided by the present disclosure can comprise (a) a polythiol, where the polythiol comprises a polythiol having a thiol functionality from 3 to 6; and (b) a polyalkenyl comprising a urethane-containing polyalkenyl prepolymer, a urea-containing polyalkenyl prepolymer, or a combination thereof.

Compositions provided by the present disclosure can comprise (a) a polythiol, where the polythiol comprises a urethane-containing polythiol having a thiol functionality from 3 to 6, a urea-containing polythiol having a thiol functionality from 3 to 6, a polythiol that does not contain a urethane group or urea group having a thiol functionality from 3 to 6, or a combination of any of the foregoing; and (b) a polyalkenyl comprising a urethane-containing polyalkenyl prepolymer, a urea-containing polyalkenyl prepolymer, or a combination thereof.

Compositions provided by the present disclosure can comprise (a) a polythiol, wherein the polythiol comprises a dithiol and a polythiol having a thiol functionality from 3 to 6; and (b) a polyalkenyl comprising a urethane-containing polyalkenyl prepolymer, a urea-containing polyalkenyl prepolymer, or a combination thereof.

Compositions provided by the present disclosure can comprise (a) a polythiol, wherein the polythiol comprises a dithiol, wherein the dithiol can comprise a urethane-containing dithiol; a urea-containing dithiol; a dithiol that does not contain a urethane group or urea group; or a combination of any of the foregoing; and a polythiol having a thiol functionality from 3 to 6, wherein the polythiol having a thiol functionality from 3 to 6 comprises: a urethane-containing polythiol having a thiol functionality from 3 to 6; a urea-containing polythiol having a thiol functionality from 3 to 6; a polythiol having a thiol functionality from 3 to 6 that does not contain a urethane group or urea group; or a combination of any of the foregoing.

Compositions provided by the present disclosure can comprise (a) a polythiol, wherein the polythiol comprises a hydroxyl-functional polythiol; and (b) a polyalkenyl prepolymer, wherein the polyalkenyl prepolymer comprises a urethane-containing polyalkenyl prepolymer, a urea-containing polyalkenyl prepolymer, or a combination thereof.

Compositions provided by the present disclosure can comprise (a) a polythiol, wherein the polythiol comprises a hydroxyl-functional dithiol, a hydroxyl-functional polythiol having a thiol functionality from 3 to 6, or a combination thereof; and (b) a polyalkenyl prepolymer comprising a urethane-containing polyalkenyl prepolymer, a urea-containing polyalkenyl prepolymer, or a combination thereof.

Compositions provided by the present disclosure can comprise (a) a polythiol, wherein the polythiol comprises a hydroxyl-functional dithiol, a urethane/urea-containing polythiol prepolymer having a thiol functionality of two, three or four, or a combination of any of the foregoing; and (b) a polyalkenyl prepolymer, wherein the polyalkenyl prepolymer comprises a urethane/urea-containing polyalkenyl prepolymer, a trifunctional alkenyl, a tetrafunctional alkenyl, or a combination of any of the foregoing.

A polythiol is a compound that has at least two reactive thiol groups, such as from 2 to 6 reactive thiol groups. The reactive thiol groups can be terminal thiol groups.

A polythiol can comprise a urethane-containing polythiol, a urea-containing polythiol, a polythiol that does not contain a urethane and urea group, a hydroxyl-functional polythiol, or a combination of any of the foregoing.

A polythiol can comprise a dithiol, a polythiol having a thiol functionality greater than 2, or a combination thereof.

A polythiol can comprise a polythiol prepolymer, a monomeric polythiol, or a combination thereof. A polythiol can comprise a urethane/urea-containing polythiol prepolymer and a monomeric hydroxyl-functional polythiol.

A polythiol can comprise a polythiol without any urethane groups and urea groups. A polythiol without any urethane groups and urea groups can be a dithiol without any urethane and urea groups and/or a polythiol without any urethane and urea groups having a thiol functionality greater than 2 such as from 3 to 6, or a combination thereof.

A polythiol can comprise a dithiol of Formula (1a), a polythiol of Formula (1b), or a combination thereof:

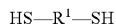   (1a)

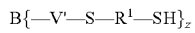   (1b)

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^3)_p$—X—$]_q$—$(CHR^3)_r$—; wherein,
  each $R^3$ is independently selected from hydrogen and methyl;
  each X is independently selected from —O—, —S—, —NH—, and —N(—CH$_3$)—;
  p is an integer from 2 to 6;
  q is an integer from 1 to 5; and
  r is an integer from 2 to 10;
B represents a core of a z-valent, polyfunctionalizing agent B(—V)$_z$ wherein,
  z is an integer from 3 to 6; and
  each —V is a moiety comprising a terminal group reactive with a thiol group; and
  each —V'— is derived from the reaction of —V with a thiol.

Polythiols of Formula (1a) and (1b) do not comprise urethane groups or urea groups.

In polythiols of Formula (1a) and (1b), $R^1$ can be $C_{2-6}$ n-alkanediyl, such as ethane-diyl, n-propane-diyl, n-butane-diyl, n-pentane-diyl, or n-hexane-diyl.

In polythiols of Formula (1a) and (1b), $R^1$ can be —[(—CHR—)$_p$—X—]$_q$—(—CHR—)$_r$—.

In polythiols of Formula (1a) and (1b), $R^1$ can be —[(—CHR—)$_p$—X—]$_q$—(—CHR—)$_r$—, where at least one R can be —CH$_3$.

In polythiols of Formula (1a) and (1b), $R^1$ can be —[(—CH$_2$—)$_p$—X—]$_q$—(—CH$_2$—)$_r$—.

In polythiols of Formula (1a) and (1b), $R^1$ can be —[(—CH$_2$—)$_p$—X—]$_q$—(—CH$_2$—)$_r$—, and each X can be —O—.

In polythiols of Formula (1a) and (1b), $R^1$ can be —[(—CH$_2$—)$_p$—X—]$_q$—(—CH$_2$—)$_r$—, and each X can be —S—.

In polythiols of Formula (1a) and (1b), $R^1$ can be —[(—CH$_2$—)$_p$—X—]$_q$—(—CH$_2$—)$_r$—, and each p can be 2 and r can be 2.

In polythiols of Formula (1a) and (1b), $R^1$ can be —[(—CH$_2$—)$_p$—X—]$_q$—(—CH$_2$—)$_r$—, where p can be 1, 2, 3, 4, or 5.

In polythiols of Formula (1a) and (1b), $R^1$ can be —[(—CH$_2$—)$_p$—X—]$_q$—(—CH$_2$—)$_r$—, where q can be 1, 2, 3, 4, or 5.

In polythiols of Formula ((1a) and (1b), $R^1$ can be —[(—CH$_2$—)$_p$—X—]$_q$—(—CH$_2$—)$_r$—, where r can be 1, 2, 3, 4, or 5.

In polythiols of Formula (1a) and (1b), $R^1$ can be —[(—CH$_2$—)$_p$—X—]$_q$—(—CH$_2$—)$_r$—, where each p can be 2 and r can be 2; and q can be 1, 2, 3, 4, or 5.

In polythiols of Formula (1a) and (1b), $R^1$ can be —[(—CH$_2$—)$_p$—X—]$_q$—(—CH$_2$—)$_r$—, where each X can be —S—; each p can be 2 and r can be 2; and q can be 1, 2, 3, 4, or 5.

In polythiols of Formula (1a) and (1b), $R^1$ can be —[(—CH$_2$—)$_p$—X—]$_q$—(—CH$_2$—)$_r$—, where each X can be —O—; each p can be 2 and r can be 2; and q can be 1, 2, 3, 4, or 5.

In polythiols of Formula (1a) and (1b), $R^1$ can be —(CH$_2$)$_2$—O—(CH$_2$)$_2$—O—(CH$_2$)$_2$—.

Examples of suitable polythiols include dithiols such as dimercaptodiethylsulfide (DMDS) (in Formula (1a), $R^1$ is —[(—CH$_2$—)$_p$—X—]$_q$—(CH$_2$)$_r$—, where p is 2, r is 2, q is 1, and X is —S—); dimercaptodioxaoctane (DMDO, 2,2'-(ethylenedioxydiethanethiol) (in Formula (1a), $R^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (1a), $R^1$ is —[(—CH$_2$—)$_p$—X—]$_q$—(CH$_2$)$_r$—, wherein p is 2, r is 2, q is 1, and X is —O—).

Other examples of suitable dithiols of Formula (1a) include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A dithiol may have one or more pendent groups comprising a lower alkyl group such as $C_{1-6}$ alkyl, a lower alkoxy group such as $C_{1-6}$ alkoxy, and a hydroxyl group. Suitable alkyl pendent groups include, for example, $C_{1-6}$ linear alkyl, $C_{3-6}$ branched alkyl, cyclopentyl, and cyclohexyl.

Examples of suitable dithiols having pendent methyl groups include, methyl-substituted DMDS, such as HS—CH$_2$—CH(—CH$_3$)—S—(CH$_2$)$_2$—SH, HS—CH(—CH$_3$)—CH$_2$—S—(CH$_2$)$_2$—SH and dimethyl substituted DMDS, such as HS—CH$_2$—CH(—CH$_3$)—S—CH(—CH$_3$)—CH$_2$—SH and HS—CH(—CH$_3$)—CH$_2$—S—CH$_2$—CH(—CH$_3$)—SH.

In polythiols of Formula (1b), z can be 3, 4, 5, or 6.

In polythiols of Formula (1b), a terminal group reactive with a thiol group can comprise an alkenyl group, a Michael acceptor group, or an epoxy group.

In polythiols of Formula (1b), a polyfunctionalizing agent B(—V)$_z$ can comprise, for example, triallyl cyanurate (TAC), triallyl isocyanurate, trimethylolpropane trivinyl ether, or combinations of any of the foregoing.

Examples of suitable polythiols having a thiol functionality greater than two (2) include trimethylolpropane tri(3-mercaptopropionate) (TMPMP), pentaerythritol tetra(3-mercaptopropionate) (PETMP), dipentaerythritol hexa(3-mercaptopropionate), ethoxylated trimethylolpropane tri(3-mercaptopropionate), ethoxylated trimethylolpropane tri(3-mercaptopropionate), tris[2-(3-mercaptopropionyloxy) ethyl] isocyanurate (TEMPIC), or combinations of any of the foregoing. Suitable polythiols are available, for example, from Bruno Bock Thiochemicals under the Thiocure® tradename.

A polythiol having a thiol functionality greater than two (2) can be 1,2,3-propanetrithiol.

Polythiols of Formula (1) and Formula (2) can be referred to as monomeric polythiols Monomeric polythiols can have a theoretical molecular weight less than 200 Daltons, less than 400 Daltons, or less than 600 Daltons.

A urethane/urea-containing polythiol prepolymer refers to a polythiol prepolymer that incorporates at least one urethane group —NH—CO—O— or at least one urea group —NH—CO—NH— in the polythiol prepolymer backbone. A urethane/urea-containing polythiol prepolymer refers to a urethane-containing polythiol prepolymer, a urea-containing polythiol prepolymer, a polythiol prepolymer having both urethane and urea groups in the polythiol backbone, and a combination of any of the foregoing. A urethane-containing polythiol prepolymer can contain at least one urethane group in the polythiol prepolymer backbone. A urea-containing polythiol prepolymer can contain at least one urea group in the polythiol prepolymer backbone. A urethane/urea containing polythiol prepolymer can also contain at least one urethane group and at least one urea group in the polythiol prepolymer backbone. A urethane/urea-containing polythiol prepolymer can comprise from 1 to 20 urethane and/or urea groups in the prepolymer backbone. The urethane and/or urea groups can be present within repeating segments of the prepolymer backbone.

A urethane/urea-containing polythiol can comprise a urethane/urea-containing dithiol, a urethane/urea-containing polythiol having a thiol functionality greater than 2 such as from 3 to 6, or a combination thereof.

A difunctional polythiol prepolymer can comprise a urethane-containing dithiol prepolymer of Formula (2a), a urea-containing dithiol prepolymer of Formula (2b), or a combination thereof:

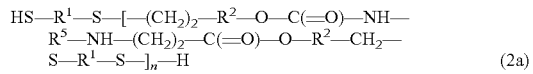

(2a)

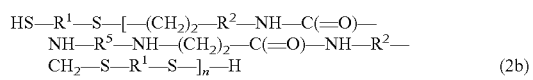

(2b)

wherein, n is an integer from 1 to 20;

R$^1$ is selected from C$_{2-10}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—;

wherein, each R$^3$ is independently selected from hydrogen and methyl;

each X is independently selected from —O—, —S—, —NH—, and —N(—CH$_3$)—;

p is an integer from 2 to 6;

q is an integer from 1 to 5; and r is an integer from 2 to 10;

each R$^2$ is independently selected from C$_{3-10}$ alkanediyl, substituted C$_{3-10}$ alkanediyl, C$_{3-10}$ heteroalkanediyl, and substituted C$_{3-10}$ heteroalkanediyl; and each R$^5$ is independently selected from C$_{2-10}$ alkanediyl, C$_{2-10}$ heteroalkanediyl, C$_{5-12}$ cycloalkanediyl, C$_{5-12}$ heterocycloalkanediyl, C$_{6-20}$ arenediyl, C$_{5-20}$ heteroarenediyl, C$_{6-20}$ alkanecycloalkanediyl, C$_{6-20}$ heteroalkanecycloalkanediyl, C$_{7-20}$ alkanearenediyl, C$_{7-20}$ heteroalkanearenediyl, substituted C$_{2-10}$ alkanediyl, substituted C$_{2-10}$ heteroalkanediyl, substituted C$_{5-12}$ cycloalkanediyl, substituted C$_{5-12}$ heterocycloalkanediyl, substituted C$_{6-20}$ arenediyl, substituted C$_{5-20}$ heteroarenediyl, substituted C$_{6-20}$ alkanecycloalkanediyl, substituted C$_{6-20}$ heteroalkanecycloalkanediyl, substituted C$_{7-20}$ alkanearenediyl, and substituted C$_{7-20}$ heteroalkanearenediyl.

In urethane/urea-containing dithiol prepolymers of Formula (2a) and Formula (2b), each substituent group can independently be selected from C$_{1-3}$ alkyl, C$_{1-3}$ alkoxy, and —OH.

In urethane/urea-containing dithiol prepolymers of Formula (2a) and Formula (2b), n can be an integer from 1 to 20, from 1 to 10, or from 1 to 50, such as 1, 2, 3, 4, or 5.

In urethane/urea-containing dithiol prepolymers of Formula (2a) and Formula (2b), each R$^1$ can independently be selected from C$_{2-10}$ alkanediyl, C$_{2-10}$ heteroalkanediyl, substituted C$_{2-10}$ alkanediyl, C$_{2-10}$ substituted heteroalkanediyl, and —[—(CHR$^3$)$_p$—X—]$_q$—(CHR$^3$)$_r$—.

In dithiol prepolymers of Formula (2a) and (2b), R$^1$ can be C$_{2-6}$ n-alkanediyl, such as ethane-diyl, n-propane-diyl, n-butane-diyl, n-pentane-diyl, or n-hexane-diyl.

In dithiol prepolymers of Formula (2a) and (2b), each R$^1$ can be —[(—CHR—)$_p$—X—]$_q$—(—CHR—)$_r$—.

In dithiol prepolymers of Formula (2a) and (2b), each R$^1$ can be —[(—CHR—)$_p$—X—]$_q$—(—CHR—)$_r$—, where at least one R can be —CH$_3$.

In dithiol prepolymers of Formula (2a) and (2b), each R$^1$ can be —[(—CH$_2$—)$_p$—X—]$_q$(—CH$_2$—)$_r$—.

In dithiol prepolymers of Formula (2a) and (2b), each R$^1$ can be —[(—CH$_2$—)$_p$—X—]$_q$—(—CH$_2$—)$_r$—, and each X can be —O—.

In dithiol prepolymers of Formula (2a) and (2b), each R$^1$ can be —[(—CH$_2$—)$_p$—X—]$_q$—(—CH$_2$—)$_r$—, and each X can be —S—.

In dithiol prepolymers of Formula (2a) and (2b), each R$^1$ can be —[(—CH$_2$—)$_p$—X—]$_q$—(—CH$_2$—)$_r$—, and each p can be 2 and r can be 2.

In dithiol prepolymers of Formula (2a) and (2b), each R$^1$ can be —[(—CH$_2$—)$_p$—X—]$_q$—(—CH$_2$—)$_r$—, where p can be 1, 2, 3, 4, or 5.

In dithiol prepolymers of Formula (2a) and (2b), each R$^1$ can be —[(—CH$_2$—)$_p$—X—]$_q$—(—CH$_2$—)$_r$—, where q can be 1, 2, 3, 4, or 5.

In dithiol prepolymers of Formula (2a) and (2b), each $R^1$ can be $-[(-CH_2-)_p-X-]_q-(-CH_2-)_r-$, where r can be 1, 2, 3, 4, or 5.

In dithiol prepolymers of Formula (2a) and (2b), each $R^1$ can be $-[(-CH_2-)_p-X-]_q-(-CH_2-)_r-$, where each p can be 2 and r can be 2; and q can be 1, 2, 3, 4, or 5.

In dithiol prepolymers of Formula (2a) and (2b), each $R^1$ can be $-[(-CH_2-)_p-X-]_q-(-CH_2-)_r-$, where each X can be $-S-$; each p can be 2 and r can be 2; and q can be 1, 2, 3, 4, or 5.

In dithiol prepolymers of Formula (2a) and (2b), each $R^1$ can be $-[(-CH_2-)_p-X-]_q-(-CH_2-)_r-$, where each X can be $-O-$; each p can be 2 and r can be 2; and q can be 1, 2, 3, 4, or 5.

In dithiol prepolymers of Formula (2a) and (2b), each $R^1$ can be derived from a dithiol such as a dithiol of Formula (1a). Examples of suitable dithiols include dimercaptodiethylsulfide (DMDS) (in Formula (2a) and (2b), $R^1$ is $-[(-CH_2-)_p-X-]_q-(-CH_2-)_r-$, where p is 2, r is 2, q is 1, and X is $-S-$); dimercaptodioxaoctane (DMDO) (in Formula (2a) and (2b), $R^1$ is $-[(-CH_2-)_p-X-]_q-(-CH_2-)_r-$, where p is 2, q is 2, r is 2, and X is $-O-$); and 1,5-dimercapto-3-oxapentane (in Formula (2a) and (2b), $R^1$ is $-[(-CH_2-)_p-X-]_q-(-CH_2-)_r-$, where p is 2, r is 2, q is 1, and X is $-O-$).

In dithiol prepolymers of Formula (2a) and (2b), each $R^1$ can independently be $C_{3-10}$ heteroalkanediyl wherein the at least one hetero atom is $-O-$.

In dithiol prepolymers of Formula (2a) and (2b), each $R^1$ can have the structure $-(CH_2)_n-O-(CH_2)_2-$, where n can be an integer from 2 to 7, such as 2, 3, 4, 5, 6, and 7.

In dithiol prepolymers of Formula (2a) and (2b), each $R^2$ can be selected from $C_{3-10}$ alkanediyl and $C_{3-10}$ heteroalkanediyl. In dithiols of Formula (2a) and (2b), each $R^2$ can be $-CH_2-O-$, $-(CH_2)_2-O-$, $-(CH_2)_3-O-$, $-(CH_2)_4-O-$, $-(CH_2)_5-O-$, or $-(CH_2)_6-O-$. In dithiols of Formula (2a) and (2b), each $R^2$ can be $-(CH_2)_4-O-$.

In dithiol prepolymers of Formula (2a) and (2b), each $R^2$ can be derived from a hydroxyl/amino-functional vinyl ether. Examples of suitable hydroxyl/amino-functional vinyl ethers include those having the structure of Formula (3a) and Formula (3b), as described herein.

In dithiol prepolymers of Formula (2a) and (2b), the moiety $R^5$ can be a core of a diisocyanate, such as an aliphatic diisocyanate, a cycloaliphatic diisocyanate, or an aromatic diisocyanate.

Suitable aliphatic diisocyanates for preparing urethane/urea-containing polythiol prepolymers provided by the present disclosure include isophorone diisocyanate (IPDI), tetramethyl xylene diisocyanate (TMXDI), 4,4'-methylene dicyclohexyl diisocyanate ($H_{12}$MDI), methylene diphenyl diisocyanate (MDI), toluene diisocyanate (TDI), 1,6-hexamethylene diisocyanate (HDI), 1,5-diisocyanato-petnane, and a combination of any of the foregoing.

Examples of suitable aliphatic diisocyanates include 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) ($H_{12}$MDI). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Examples of suitable alicyclic diisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include bis(isocyanatoethyl)benzene, $\alpha,\alpha,\alpha',\alpha'$-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, 4,4-methylene dicyclohexyl diisocyanate ($H_{12}$MDI), and a combination of any of the foregoing.

Other examples of suitable diisocyanates for preparing urethane/urea-containing prepolymers include 2,2,4-trimethylhexamethylene diisocyanate (TMDI), 1,6-hexamethylene diisocyanate (HDI), 1,1'-methylene-bis-(4-isocyanatocyclohexane), 4,4'-methylene-bis-(cyclohexyl diisocyanate), hydrogenated toluene diisocyanate, 4,4'-isopropylidene-bis-(cyclohexyl isocyanate), 1,4-cyclohexyl diisocyanate (CHDI), 4,4'-dicyclohexylmethane diisocyanate (Desmodur® W), and 3-isocyanato methyl-3,5,5-trimethylcyclohexyl diisocyanate (IPDI). Mixtures and combinations of these diisocyanates can also be used.

A suitable diisocyanate can have a molecular weight, for example, from 150 Daltons to 600 Daltons, from 100 Daltons to 1,000 Daltons, or from 300 Daltons to 1,000 Daltons.

In urethane/urea-containing dithiol prepolymers of Formula (2a) and (2b), each $R^5$ can have the structure, for example:

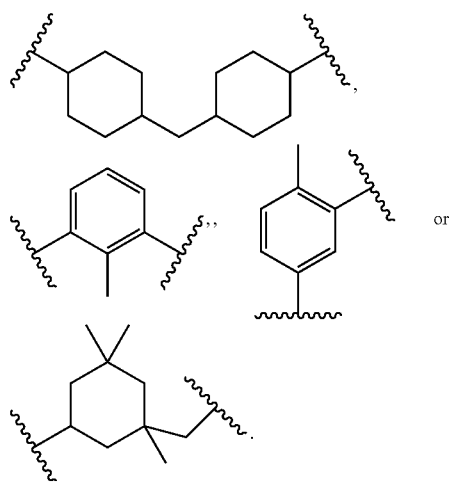

In urethane/urea-containing dithiol prepolymers of Formula (2a) and Formula (2b), n can be an integer from 1 to 20, from 1 to 10, or from 1 to 5, such as 1, 2, 3, 4, or 5; each $R^1$ can be $-(CH_2)_2-O-(CH_2)_2-O-(CH_2)_2-$; $R^2$ can be $-(CH_2)_4-O-(CH_2)_2-$; and $R^5$ can be:

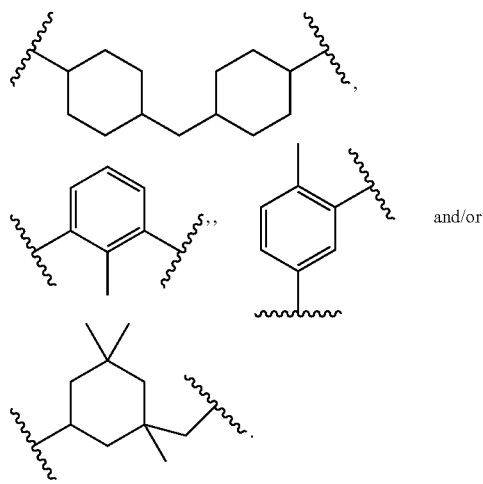

Dithiol prepolymers of Formula (2a) and Formula (2b) can be prepared by (a) reacting a diisocyanate with a hydroxyl/amino-functional vinyl ether to provide a vinyl ether-terminated diisocyanate precursor; and (b) reacting the vinyl ether-terminated diisocyanate precursor with a dithiol to provide the corresponding urethane/urea-containing dithiol prepolymer.

Accordingly, a dithiol prepolymer provided by the present disclosure can comprise the reaction product of reactants comprising a diisocyanate, a hydroxyl/amino-functional vinyl ether, and a dithiol.

A hydroxyl-functional vinyl ether can have the structure of Formula (3a):

$$CH_2=CH-O-(CH_2)_t-OH \quad (3a)$$

where t is an integer from 2 to 10. In hydroxyl-functional vinyl ethers of Formula (3a), t can be 1, 2, 3, 4, 5, or t can be 6. Examples of suitable hydroxyl-functional vinyl ethers useful for reacting with a diisocyanate include 1,4-cyclohexane dimethylol monovinyl ether, 1-methyl-3-hydroxypropyl vinyl ether, 4-hydroxybutyl vinyl ether, and a combination of any of the foregoing. A hydroxyl-functional vinyl ether can be 4-hydroxybutyl vinyl ether. Referring to urethane/urea-containing prepolymers of Formula (2a) and (2b), $R^2$ can be derived from a hydroxyl-functional vinyl ether and $R^2$ can be $-O-(CH_2)_t-$.

An amino-functional vinyl ether can have the structure of Formula (3b):

$$CH_2=CH-O-(CH_2)_t-NH_2 \quad (3b)$$

where t is an integer from 2 to 10. In amino-functional vinyl ethers of Formula (3b), t can be 1, 2, 3, 4, 5, or t can be 6. Examples of suitable amino-functional vinyl ethers useful for reacting with a diisocyanate include 3-amino propyl vinyl ether. Referring to urethane/urea-containing prepolymers of Formula (2a) and (2b), $R^2$ can be derived from an amino-functional vinyl ether and $R^2$ can be $-O-(CH_2)_t-$.

A hydroxyl/amino-functional vinyl ether or combination of hydroxyl/amino-functional vinyl ethers can be reacted with a diisocyanate or combination of diisocyanates in the presence of a suitable catalyst at an elevated temperature to provide a corresponding divinyl ether-terminated diisocyanate. Examples of suitable catalysts for this reaction include tin catalysts such as dibutyltin dilaurate. The hydroxyl/amino-functional vinyl ethers and the diisocyanates can be reacted in a 2:1 equivalent ratio to provide the corresponding urethane-containing divinyl ether.

The divinyl ether-terminated diisocyanate precursor can be reacted with a dithiol at temperature to provide a urethane/urea-containing dithiol prepolymer of Formula (2a) and/or Formula (2b). The divinyl ether-terminated diisocyanate precursor can be reacted with a dithiol in a molar ratio of n moles of the divinyl ether-terminated diisocyanate precursor and (n+1) moles of the dithiol such as a ratio of 1:2, 2:3, 3:4, etc.

Urethane/urea-containing polythiols can also comprise urethane/urea-containing polythiols having a thiol functionality greater than 2, such as from 3 to 6.

Urethane/urea-containing polythiols having a thiol functionality greater than 2 can comprise a urethane-containing polythiol of Formula (4a), a urea-containing polythiol of Formula (4b), or a combination thereof:

$$B\{-R^7-NH-C(=O)-O-R^2-(CH_2)_2-S-R^1-SH\}_z \quad (4a)$$

$$B\{-R^7-NH-C(=O)-NH-R^2-(CH_2)_2-S-R^1-SH\}_z \quad (4b)$$

wherein,

R¹ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$; wherein, each $R^3$ is independently selected from hydrogen and methyl;

each X is independently selected from —O—, —S—, —NH—, and —N(—CH₃)—;

p is an integer from 2 to 6;

q is an integer from 1 to 5; and r is an integer from 2 to 10;

$R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

B represents a core of a z-valent, polyfunctionalizing agent $B(-V)_z$ wherein, z is an integer from 3 to 6;

each —V is —R⁷—N=C=O; and $R^7$ is selected from $C_{2-10}$ alkanediyl, substituted $C_{2-10}$ alkanediyl, $C_{2-10}$ heteroalkanediyl, and substituted $C_{2-10}$ heteroalkanediyl.

In urethane/urea-containing polythiols of Formula (4a) and (4b), each substituent group can independently be selected from $C_{1-3}$ alkyl, $C_{1-3}$ alkoxy, or —OH.

In urethane/urea-containing polythiols of Formula (4a) and (4b), $R^1$ can be defined as for the polythiols of Formula (1a) and Formula (1b).

In urethane/urea-containing polythiols of Formula (4a) and (4b), $R^2$ can be defined as for the polythiols of Formula (1a) and Formula (1b).

In urethane/urea-containing polythiols of Formula (4a) and (4b), B and z can be defined as for the polythiols of Formula (1b).

In urethane/urea-containing polythiols of Formula (4b), z can be 3, 4, 5, or 6,

In urethane/urea-containing polythiols of Formula (4a) and (4b), $R^2$ can be for example, —(CH₂)₂—O—, —(CH₂)₃—O—, —(CH₂)₄—O—, —(CH₂)₅—O—, or —(CH₂)₆—O—.

In urethane/urea-containing polythiols of Formula (4a) and (4b), $R^2$ can be —(CH₂)₄—O—.

In urethane/urea-containing polythiols of Formula (4b), $R^7$ can be $C_{2-10}$ alkanediyl or $C_{2-10}$ heteroalkanediyl.

In urethane/urea-containing polythiols of Formula (4b), $R^7$ can be —(CH₂)₂—, —(CH₂)₃—, —(CH₂)₄—, —(CH₂)₅—, —(CH₂)₆—, or —(CH₂)₇—.

In urethane/urea-containing polythiols of Formula (4b), B can have the structure:

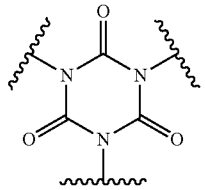 [SMILES: *n1c(=O)n(*)c(=O)n(*)c1=O]

In urethane/urea-containing polythiols of Formula (4b), $B(-V)_z$ can be a hexamethylene diisocyanate trimer such as Desmodur® N 3390.

In urethane/urea-containing polythiols of Formula (4b), z can be 3; $R^2$ can be —(CH₂)₄—O—; $R^7$ can be —(CH₂)₆—; and B can have the structure:

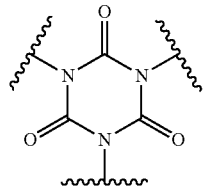

A urethane/urea-containing polythiol of Formula (4a) and Formula (4b) can be prepared by (a) reacting a polyisocyanate having an isocyanate functionality greater than 2 such as from 3 to 6 with a compound having terminal groups reactive with isocyanate groups such as a hydroxyl/amino-functional alkenyl compound such as a hydroxyl/amino-containing vinyl ether to form the corresponding urethane/urea-containing polyalkenyl, and (b) reacting the urethane/urea-containing polyalkenyl with a dithiol to form a urethane/urea-containing polythiol of Formula (4a) and Formula (4b).

Accordingly, a urethane/urea-containing polythiol of Formula (4a) and Formula (4b) can comprise the reaction product of reactants comprising a polyisocyanate, a hydroxyl/amino-functional polyalkenyl such as a hydroxyl/amino-functional divinyl ether, and a dithiol.

Examples of suitable polyfunctional isocyanates include Desmodur® N 3390 (1,3,5-tris(6-isocyanatohexyl)-1,3,5-triazinane-2,4-6-trione), 1,3,5-triisocyanato-1,3,4-triazinane-2,4,6-trione, 1-isocyanato-1-aza-diazanidayclohexane-2,4,6-trione, 1,3,5-triisocyanato-2-methylbenzene, 1,2,3-triisocyanatobenzene, 2,4,6-triisocyanato-1,3,5-triazine, 1,3,5-triisocyanatobenzene, 1,2,3-triisocyanato-2-methylcyclohexane, 1,2,3-triisocyanato-5-methylbenzene, 1,2,4-triisocyanato-1-methylcyclohexane, 2-ethyl-1,3,5-triisocyanato-4-methylbenzene, 1,2,3-triisocyanato-4,5-dimethylbenzene, 1,2,4-triisocyanato-3,5-dimethylbenzene, and combinations of any of the foregoing.

Suitable hydroxyl/amino vinyl ethers include any of those disclosed herein including the hydroxyl/amino-containing vinyl ethers of Formula (3a) and Formula (3b).

Suitable dithiols include any of those disclosed herein including dithiols of Formula (1a).

Urethane/urea-containing polythiols of Formula (4a) and Formula (4b) can comprise the reaction products of reactants comprising Desmodur® N-3390, 4-hydroxybutyl vinyl ether, and DMDO.

Urethane/urea-containing polythiols having a thiol functionality greater than 2 can comprise a urethane-containing polythiol of Formula (4c), a urea-containing polythiol of Formula (4d), or a combination thereof:

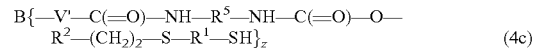 (4c)

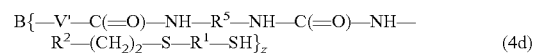 (4d)

wherein,

R¹ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$; wherein, each $R^3$ is independently is selected from hydrogen and methyl;

each X is independently selected from —O—, —S—, —NH—, and —N(—CH₃)—;

p is an integer from 2 to 6;

q is an integer from 1 to 5; and r is an integer from 2 to 10;

each $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl;

B represents a core of a z-valent, polyfunctionalizing agent $B(-V)_z$ wherein, z is an integer from 3 to 6; and each —V is a moiety comprising a terminal group reactive with an isocyanate group; and each —V'— is derived from the reaction of —V with a terminal group reactive with an isocyanate group.

In urethane/urea-containing polythiols of Formula (4c) and Formula (4d), each substituent group can independently be selected from $C_{1-3}$ alkyl, $C_{1-3}$ alkoxy, or —OH.

In urethane/urea-containing polythiols of Formula (4c) and (4d), $R^1$ can be defined as for the polythiols of Formula (1a) and Formula (1b).

In urethane/urea-containing polythiols of Formula (4c) and (4d), $R^2$ can be defined as for the polythiols of Formula (1a) and Formula (1b).

In urethane/urea-containing polythiols of Formula (4c) and (4d), $R^5$ can be defined as for the polythiols of Formula (2a) and Formula (2b).

In urethane/urea-containing polythiols of Formula (4c) and (4d), z can be 3, 4, 5, or 6.

In urethane/urea-containing polythiols of Formula (4c) and (4d), a terminal group reactive with an isocyanate group can be a hydroxyl group or an amino group.

In urethane/urea-containing polythiols of Formula (4c) and (4d), each —V'— can be a moiety derived from the reaction of a hydroxyl group or an amino group with an isocyanate group.

In urethane/urea-containing polythiols of Formula (4c) and (4d), $R^2$ can be, for example, —$(CH_2)_2$—O—, —$(CH_2)_3$—O—, —$(CH_2)_4$—O—, —$(CH_2)_5$—O—, or —$(CH_2)_6$—O—.

In urethane/urea-containing polythiols of Formula (4c) and (4d), $R^2$ can be —$(CH_2)_4$—O—.

In urethane/urea-containing polythiols of Formula (4c) and (4d), $R^2$ can be selected from $C_{2-10}$ alkanediyl and $C_{2-10}$ heteroalkanediyl.

In urethane/urea-containing polythiols of Formula (4c) and (4d), $R^2$ can be selected from —$(CH_2)_2$—, —$(CH_2)_3$—, —$(CH_2)_4$—, —$(CH_2)_5$—, —$(CH_2)_6$—, or —$(CH_2)_7$—.

In urethane/urea-containing polythiols of Formula (4c) and (4d), B can have the structure:

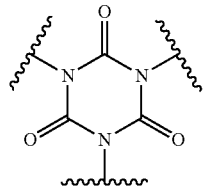

In urethane/urea-containing polythiols of Formula (4c) and (4d), B(—V), can be hexamethylene diisocyanate trimer such as Desmodur® N 3390.

In urethane/urea-containing polythiols of Formula (4d), —V can be —$R^7$—OH or —$R^7$—$NH_2$, where $R^7$ is defined as for Formula (4a) and (4b).

In urethane/urea-containing polythiols of Formula (4c) and (4d), z can be 3; $R^2$ can be —$(CH_2)_4$—O—; $R^7$ can be —$(CH_2)_6$—; $R^5$ can comprise a moiety having the structure:

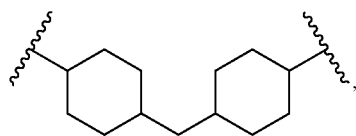

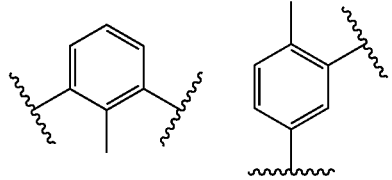

and

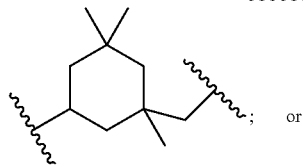

; or

B can be a moiety having the structure

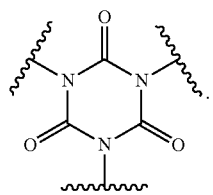 [SMILES: *n1c(=O)n(*)c(=O)n(*)c1=O]

Urethane/urea-containing polythiols of Formula (4c) and Formula (4d) can be prepared by reacting (a) a polyfunctionalizing agent having terminal groups reactive with an isocyanate group such as a hydroxyl group or an amino group with a diisocyanate to form an isocyanate-terminated polyfunctionalizing agent; (b) reacting the isocyanate-terminated polyfunctionalizing agent with a hydroxyl/amino-functional alkenyl such as a hydroxyl/amino-functional vinyl ether to form a urethane/urea-containing polyalkenyl compound, and (c) reacting the urethane/urea-containing polyalkenyl compound with a dithiol.

Accordingly, urethane/urea-containing polythiols of Formula (4c) and Formula (4d) can comprise the reaction products of reactants comprising a polyfunctionalizing agent having terminal groups reactive with an isocyanate group such as a hydroxyl group or an amino group, a diisocyanate, a hydroxyl/amino-functional alkenyl such as a hydroxyl/amino-functional vinyl ether, and a dithiol.

Examples of suitable polyfunctionalizing agents having terminal groups reactive with an isocyanate group include polyols. Polyol polyfunctionalizing agents can be represented by the formula $B(-V)_z$, where B represents a core of a z-valent polyfunctionalizing agent $B(-V)_z$, z is an integer from 3 to 6; and each —V is a moiety comprising a terminal hydroxyl (—OH) group such as $-R^7-OH$, where $R^7$ is defined herein. Examples of suitable trifunctional, tetrafunctional or higher polyols include branched chain alkane polyols such as glycerol or glycerin, tetramethylolmethane, trimethylolethane (for example 1,1,1-trimethylolethane), trimethylolpropane (TMP) (for example 1,1,1-trimethylolpropane), erythritol, pentaerythritol, dipentaerythritol, tripentaerythritol, sorbitan, alkoxylated derivatives thereof, and combinations of any of the foregoing. A polyol can be a cycloalkane polyol, such as trimethylene bis(1,3,5-cyclohexanetriol). A polyol can be an aromatic polyol, such as trimethylene bis(1,3,5-benzenetriol). Examples of other suitable polyols include polyols which can be alkoxylated derivatives, such as ethoxylated, propoxylated and butoxylated. A suitable polyol can be alkoxylated with from 1 to 10 alkoxy groups: glycerol, trimethylolethane, trimethylolpropane, benzenetriol, cyclohexanetriol, erythritol, pentaerythritol, sorbitol, mannitol, sorbitan, dipentaerythritol and tripentaerythritol. Alkoxylated, ethoxylated and propoxylated polyols and combinations thereof can be used alone or in combination with unalkoxylated, unethoxylated and unpropoxylated polyols having at least three hydroxyl groups and mixtures thereof. The number of alkoxy groups can be from 1 to 10, or from 2 to 8 or any rational number between 1 and 10. An alkoxy group can be ethoxy and the number of ethoxy groups can be 1 to 5 units. A polyol can be trimethylolpropane having up to 2 ethoxy groups. Suitable alkoxylated polyols include ethoxylated trimethylolpropane, propoxylated trimethylolpropane, ethoxylated trimethylolethane, and combinations of any of the foregoing.

Suitable hydroxyl/amino-functional vinyl ethers include any of those disclosed herein including the hydroxyl/amino-functional vinyl ethers of Formula (3a) and Formula (3b).

Suitable dithiols include any of those disclosed herein including dithiols of Formula (1a).

Urethane/urea-containing polythiols of Formula (4c) and Formula (4d) can comprise, for example, the reaction products of reactants comprising a polyfunctionalizing agent such as trimethylene bis(1,3,5-benzenetriol), a diisocyanate comprising $H_{12}MDI$, a hydroxyl/amino-functional vinyl ether comprising 4-hydroxybutyl vinyl ether or 3-amino propyl vinyl ether, and a dithiol such as DMDO.

A polythiol can comprise a hydroxyl-functional polythiol including a hydroxyl-functional dithiol, a hydroxyl-functional polythiol having a thiol functionality greater than 2 such as from 3 to 6, or a combination thereof.

A polythiol can comprise a hydroxyl-functional polythiol of Formula (5a), a hydroxyl-functional polythiol of Formula (5b), a hydroxyl functional polythiol of Formula (5c), or a combination of any of the foregoing:

$HS-R^1-S-R^4-S-R^1-SH$ (5a)

$B\{-V'-S-R^1-SH\}_z$ (5b)

$SH-R^1-S-CH_2-CH(-OH)-R^6-CH(-OH)-CH_2-S-R^1-SH$ (5c)

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;
wherein,
each $R^3$ is independently selected from hydrogen and methyl;
each X is independently selected from —O—, —S—, —NH—, and —N(—CH$_3$)—;
p is an integer from 2 to 6;
q is an integer from 1 to 5; and
r is an integer from 2 to 10;
$R^4$ is selected from substituted $C_2$-$C_{10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, $C_{7-20}$ alkanearenediyl, and substituted $C_{7-20}$ heteroalkanearenediyl, wherein $R^4$ comprises at least one pendent hydroxyl group;
$R^6$ is selected from substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, $C_{7-20}$ alkanearenediyl, and substituted $C_{7-20}$ heteroalkanearenediyl;
B represents a core of a z-valent, polyfunctionalizing agent $B(-V)_z$ wherein,
z is an integer from 3 to 6; and
each V is a moiety comprising a terminal group reactive with a thiol group; and
each —V'— is derived from the reaction of —V with a thiol and comprises at least one hydroxyl group.

In hydroxyl-functional dithiols of Formula (5a), Formula (5b), and Formula (5c), each $R^1$ can independently be selected from $C_{2-10}$ alkanediyl, $C_{2-10}$ heteroalkanediyl, and $-[-(CHR^3)_p-X-]_q-(CHR^3)_r-$.

In hydroxyl-functional dithiols of Formula (5a), Formula (5b), and Formula (5c), each $R^1$ can be defined as for a dithiol of Formula (1a).

In hydroxyl-functional dithiols of Formula (5a)-(5c), each substitute group can be a hydroxyl group or the moiety can be substituted with two or more hydroxyl groups.

In hydroxyl-functional dithiols of Formula (5a), each $R^4$ can independently be selected from substituted $C_{2-10}$ alkanediyl, substituted $C_{2-10}$ heteroalkanediyl, and substituted $C_{7-20}$ alkanearenediyl, where $R^4$ comprises at least one pendent hydroxyl group.

In hydroxyl-functional dithiols of Formula (5a), each $R^4$ can contain at least one aromatic ring.

In hydroxyl-functional dithiols of Formula (5a), each $R^4$ can have the structure $-CH_2-CH(-OH)-R^6-CH(-OH)-CH_2-$, where $R^6$ is defined as for Formula (5a).

In hydroxyl-functional dithiols of Formula (5a), each $R^4$ can comprise a moiety having the structure:

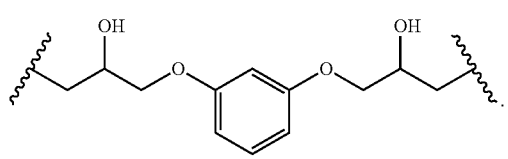 [SMILES: *CC(O)COc1cccc(OCC(O)C*)c1]

Hydroxyl-functional dithiols of Formula (5a) and Formula (5b) can be prepared by reacting a diepoxide or a combination of diepoxides with a dithiol or a combination of dithiols in the presence of a suitable catalyst at an elevated temperature. The diepoxide can be reacted with a dithiol in an equivalents ratio of 1:2.

Accordingly, hydroxyl-functional dithiols of Formula (5a) and Formula (5b) can comprise the reaction product of reactants comprising a diepoxide or a combination of diepoxides and a dithiol or combination of dithiols. For example, a hydroxyl-functional dithiol of Formula (5a) and Formula (5b) can comprise the reaction product of reactants comprising resorcinol diglycidyl ether and DMDO.

Examples of suitable diepoxides include resorcinol diglycidyl ether, glycidyl amine of m-xylene diamine, trimethylolethane triglycidyl ether, trimethylolpropane triglycidyl ether, tris(4-hydroxyphenyl)methane triglycidyl ether, pentaerythritol glycidyl ether, diglycidylphenyl glycidyl ether, 1,2,6-hexanetriol triglycidyl ether, methanetetrayltetrakis (glycidyl ether), and a combination of any of the foregoing.

Examples of suitable dithiols include any of those disclosed herein such as DMDO.

Examples of suitable catalysts include tertiary amine catalysts such as triethylenediame (1,4-diazabicyclo[2.2.2] octane, DABCO®), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

In hydroxyl-functional polythiols of Formula (5b), z can be 3, 4, 5, or 6.

In hydroxyl-functional polythiols of Formula (5b), each —V'— can be derived from the reaction of a moiety —V comprising a terminal group reactive with a thiol group. A group reactive with a thiol group can be, for example, an alkenyl group, a Michael acceptor group, or an epoxy group.

In hydroxyl-functional polythiols of Formula (5b), a moiety —V can comprise a pendent hydroxyl group and/or when —V comprises a terminal epoxy group, upon reaction with a thiol group, the resulting moiety —V'— will comprise a pendent hydroxyl group.

In hydroxyl-functional polythiols of Formula (5b), a moiety —V can comprise a moiety having the structure —$R^{10}$-$R^{11}$, where $R^{10}$ can be substituted $C_{1-10}$ alkanediyl, or substituted $C_{1-10}$ heteroalkanediyl, where the substituent group comprises at least one hydroxyl group; and $R^{11}$ can be an alkenyl —CH=$CH_2$ group, a Michael acceptor group, or an epoxy group.

Examples of suitable Michael acceptor groups include activated alkenes, such as an alkenyl group proximate to an electron-withdrawing group such as an ketone, nitro, halo, nitrile, carbonyl, or nitro group. A Michael acceptor group can comprise a vinyl ketone, a vinyl sulfone, a quinone, an enamine, a ketimine, oxazolidine, or an acrylate. Other examples of Michael acceptors are disclosed in Mather et al., *Prog. Polym. Sci.* 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. A Michael acceptor group can be derived from a vinyl ketone and has the structure —$S(O)_2$—CR=$CH_2$, where each R independently comprises hydrogen, fluorine, or $C_{1-3}$ alkyl. In certain embodiments, each R is hydrogen.

In hydroxyl-functional polythiols of Formula (5b), B(—V)$_z$ can be a polyepoxide (polyglycidyl ether). Examples of suitable polyepoxides include glycidyl amine of m-xylene diamine, trimethylolethane triglycidyl ether, trimethylolpropane triglycidyl ether, tris(4-hydroxyphenyl) methane triglycidyl ether, pentaerythritol glycidyl ether, diglycidylphenyl glycidyl ether, 1,2,6-hexanetriol triglycidyl ether, methanetetrayltetrakis(glycidyl ether), and a combination of any of the foregoing.

Hydroxyl-functional polythiols of Formula (5b) can be prepared by reacting a polyfunctionalizing agent comprising a functionality greater than 2 such as from 3 to 6, at least one pendent hydroxyl group, and terminal functional groups reactive with thiol groups; with a dithiol.

Accordingly, hydroxyl-functional polythiols can comprise the reaction product of reactants comprising a hydroxyl-functional polyfunctionalizing agent having terminal groups reactive with thiol groups, and a dithiol. For example, hydroxyl-functional polythiols can comprise the reaction products of reactants comprising resorcinol diglycidyl ether and DMDO.

In hydroxyl-functional dithiols of Formula (5c), each $R^6$ can independently be $C_{2-10}$ alkanediyl, $C_{2-10}$ heteroalkanediyl, $C_{7-20}$ alkanearendiyl, $C_{7-20}$ heteroalkanearenediyl, or $C_{10-20}$ alkanecycloalkanediyl, or $C_{10-20}$ heteroalkanecycloalkanediyl.

In hydroxyl-functional dithiols of Formula (5c), each $R^6$ can contain at least one aromatic ring.

In hydroxyl-functional dithiols of Formula (5c), each $R^6$ can independently comprise a moiety having the structure:

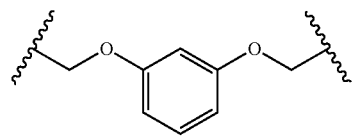 [SMILES: *COc1cccc(OC*)c1]

Hydroxyl-functional dithiols of Formula (5c) can be prepared by reacting a diepoxide (diglycidyl ether) or combination of diepoxides (combination of diglycidyl ethers) and a dithiol or combination of dithiols.

Accordingly hydroxyl-functional dithiols of Formula (5c) can comprise the reaction product of reactants comprising a diepoxide (diglycidyl ether) and a dithiol.

A diepoxide can be an aliphatic diepoxide, an alicyclic diepoxide, and aromatic diepoxide, or a combination of any of the foregoing.

Examples of suitable aliphatic diepoxides include neopentyl glycol diglycidyl ether, dipropylene glycol diglycidyl ether, diethylene glycol diglycidyl ether, ethylene glycol diglycidyl ether, 1,4-butanediol diglycidyl ether, polypropylene glycol diglycidyl ether, 1,6-hexanediol diglycidyl ether, diglycidyl ether, and combinations of any of the foregoing.

Examples of suitable alicyclic and aromatic diepoxides include resorcinol diglycidyl ether, hexahydrophthalic acid diglycidyl ester, hydrogenated bisphenol-A diglycidyl ether, 1,4-cyclohexanedimethanol diglycidyl ether, bisphenol A diglycidyl ether, bisphenol F diglycidyl ether, 1,4-bis(glycidyloxymethyl)cyclohexane, 2-[[4-(oxiran-2-ylmethoxy) naphthalene-1-yl]oxymethyl]oxirane, 2-methoxy-4-glycidylphenyl)glycidyl ether, and combinations of any of the foregoing.

Suitable polyglycidyl ethers are available from Emerald Performance Materials under the tradenames Epalloy® and Erisys™.

Polythiols of Formula (5a)-(5c) can have a weight average molecular weight, for example, from 200 Daltons to 2,000 Daltons, or from 100 Daltons to 1,000 Daltons A polyalkenyl prepolymer can comprise a urethane-containing polyalkenyl prepolymer, a urea-containing polyalkenyl prepolymer, a polyalkenyl prepolymer without urethane groups and urea groups, or a combination of any of the foregoing.

A polyalkenyl prepolymer can comprise a difunctional alkenyl-terminated prepolymer, a polyalkenyl prepolymer having an alkenyl functionality greater than two such as an alkenyl functionality from 3 to 6, or a combination thereof.

A urethane/urea-containing polyalkenyl prepolymer can comprise a difunctional urethane/urea-containing polyalkenyl prepolymer, a polyalkenyl prepolymer having a functionality greater than 2 such as from 3 to 6, or a combination thereof.

A polyalkenyl prepolymer having an alkenyl functionality greater than 2 can comprise a trifunctional alkenyl-terminated prepolymer, a tetrafunctional alkenyl-terminated prepolymer, or a combination thereof.

A difunctional urethane/urea-containing polyalkenyl prepolymer can comprise a urethane-containing polyalkenyl prepolymer of Formula (6a), a urea-containing polyalkenyl prepolymer of Formula (6b), or a combination thereof:

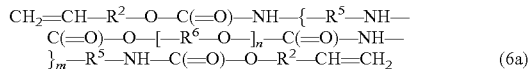  (6a)

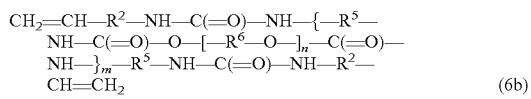  (6b)

wherein,
m is an integer from 1 to 20;
n is an integer from 1 to 20;
 each $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;
 each $R^5$ is selected from substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl; and
 each $R^6$ is independently selected from $C_{2-10}$ alkanediyl, substituted $C_{2-10}$ alkanediyl, $C_{2-10}$ heteroalkanediyl, and substituted $C_{2-10}$ heteroalkanediyl.

In urethane/urea-containing polyalkenyl prepolymers of Formula (6a) and Formula (6b), each substituent group can independently be selected from $C_{1-3}$ alkyl, $C_{1-3}$ alkoxy, and —OH.

In difunctional urethane/urea-containing polyalkenyl prepolymers of Formula (6a) and Formula (6b), n can be an integer from 1 to 20, from 1 to 10, or from 1 to 5, such as 1, 2, 3, 4, or 5.

In difunctional urethane/urea-containing polyalkenyl prepolymers of Formula (6a) and Formula (6b), m can be an integer from 1 to 20, from 1 to 10, or from 1 to 5, such as 1, 2, 3, 4, or 5.

In difunctional urethane/urea-containing polyalkenyl prepolymers of Formula (6a) and Formula (6b), each $R^2$ independently can be selected from $C_{4-10}$ alkanediyl, substituted $C_{4-10}$ alkanediyl, $C_{4-10}$ heteroalkanediyl, and substituted $C_{4-10}$ heteroalkanediyl.

In difunctional urethane/urea-containing polyalkenyl prepolymers of Formula (6a) and Formula (6b), each $R^2$ can be independently selected from $C_{6-10}$ alkanediyl, substituted $C_{6-10}$ alkanediyl, $C_{6-10}$ heteroalkanediyl, and substituted $C_{6-10}$ heteroalkanediyl.

In difunctional urethane/urea-containing polyalkenyl prepolymers of Formula (6a) and Formula (6b), each $R^2$ independently can be selected from $C_{6-10}$ heteroalkanediyl and substituted $C_{6-10}$ heteroalkanediyl, where the one or more heteroatoms comprises —S— or —O—.

In difunctional urethane/urea-containing polyalkenyl prepolymers of Formula (6a) and Formula (6b), each $R^2$ can be independently selected from —(CH$_2$)$_6$—O—(CH$_2$)$_2$—, —(CH$_2$)$_5$—O—(CH$_2$)$_2$—, —(CH$_2$)$_4$—O—(CH$_2$)$_2$—, —(CH$_2$)$_3$—O—(CH$_2$)$_2$—, and —(CH$_2$)$_2$—O—(CH$_2$)$_2$—.

In difunctional urethane/urea-containing polyalkenyl prepolymers of Formula (6a) and Formula (6b), each $R^2$ can be —(CH$_2$)$_4$—O—(CH$_2$)$_2$—.

In difunctional urethane/urea-containing polyalkenyl prepolymers of Formula (6a) and Formula (6b), each $R^5$ can represent the core of a diisocyanate such as any of the diisocyanates disclosed herein, including, for example 2,4-toluene diisocyanate (2,4-TDI) and 2,6 toluene diisocyanate (2,6-TDI).

In difunctional urethane/urea-containing polyalkenyl prepolymers of Formula (6a) and Formula (6b), each $R^5$ can have the chemical structures:

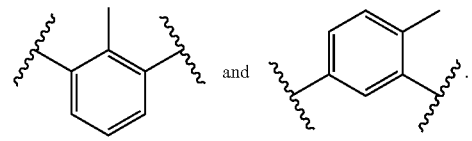

In difunctional urethane/urea-containing polyalkenyl prepolymers of Formula (6a) and Formula (6b), each $R^6$ can be the core a polymeric polyol.

A difunctional urethane/urea-containing polyalkenyl prepolymers of Formula (6a) and Formula (6b), the moiety —O—[—R$^6$—O—]$_n$— can be derived from a polymeric polyol.

In difunctional urethane/urea-containing polyalkenyl prepolymers of Formula (6a) and Formula (6b), each $R^6$ can be the core of an aliphatic polyol such as, for example, polytetrahydrofuran, polycaprolactone, or poly(1,4-butanediol).

In difunctional urethane/urea-containing polyalkenyl prepolymers of Formula (6a) and Formula (6b) each $R^6$ can be selected from —(CH$_2$)$_4$—O—, —[—(CH$_2$)$_4$—]$_{0.6}$—[—CH$_2$—CH(—CH$_2$—CH$_3$]$_{0.2}$—[—(CH$_2$)$_4$—]$_{0.2}$—, and —(CH$_2$)$_5$—CH(—OH)—.

In urethane/urea-containing alkenyl-terminated prepolymers of Formula (6a) and Formula (1b), n can be an integer from 1 to 5; m can be an integer from 1 to 5; $R^2$ can be —(CH$_2$)$_4$—O—(CH$_2$)$_2$—; $R^5$ can be a moiety having the structure:

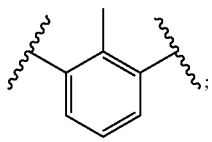 [SMILES: *c1cccc(*)c1C]

and $R^6$ can be selected from $-(CH_2)_4-$, $-[-(CH_2)_4-]_{0.6}-[-CH_2-CH(-CH_2-CH_3)]_{0.2}-[-(CH_2)_4-]_{0.2}-$, and $-(CH_2)_5-CH(-OH)-$.

Difunctional urethane/urea-containing polyalkenyl prepolymers of Formula (6a) and Formula (6b) can be prepared by (a) reacting a polymeric polyol with a diisocyanate to provide a urethane/urea-containing isocyanate-terminated prepolymer; and (b) reacting the urethane/urea-containing isocyanate-terminated prepolymer with a hydroxyl/amino-functional alkenyl such as a hydroxyl/amino-functional vinyl ether to provide a urethane/urea-containing polyalkenyl prepolymer.

Examples of a commercially available urethane-containing isocyanate prepolymers include Adiprene® L-167 olefin, available from Chemtura Corporation, and Laromer® LR9000 available from BASF.

Accordingly, urethane/urea-containing polyalkenyl prepolymers can comprise the reaction product of reactants comprising a polymeric polyol, a diisocyanate, and a hydroxyl/amino-functional alkenyl such as a hydroxyl/amino-functional vinyl ether.

Examples of suitable polymeric polyols include polytetrahydrofuran polyols, polycaprolactone polyols, and polybutane polyols polyester polyols, polyether polyols, and polycarbonate polyols.

Suitable diisocyanates include any of those disclosed herein.

Suitable hydroxyl/amino-functional vinyl ethers include 4-hydroxbutyl vinyl ether, 3-amino propyl vinyl ether, and 1,4-cyclohexanedimethanol monovinyl ether.

The reaction between a urethane-containing isocyanate-terminated prepolymer and a hydroxyl/amino-functional alkenyl such as a hydroxyl/amino-functional vinyl ether can be carried out in the presence of a suitable catalyst such as dibutyltin dilaurate or other tin-based catalyst at elevated temperature.

The reaction between a urea-containing isocyanate-terminated prepolymer and a hydroxyl/amino-functional alkenyl such as a hydroxyl/amino-functional vinyl ether can be carried out at ambient temperature.

In difunctional urethane/urea-containing polyalkenyl prepolymers of Formula (6a) and Formula (6b), $R^6$ can be the core of a polymeric diol.

A polymeric diol can comprise a polyether diol. Polyether polyols useful in preparing urethane/urea-containing polyalkenyl prepolymers provided by the present disclosure include those having the structure of Formula (7):

where m can be an integer from 1 to 10, and n can be an integer from 5 to 50.

Suitable polyether diols include Terathane® polyether glycols (Invista), which are blends of linear diols in which the terminal hydroxyl groups are separated by repeating tetramethylene ether groups. A Terathane® polyether glycol can be Terathane® 1000 (n averages 14), Terathane® 2000 (n averages 27), Terathane® 2900 (polytetramethylene ether glycol, PTMEG), Terathane® 650 or a combination of any of the foregoing. These polyether glycols have a molecular weight from 950 Daltons to 1,050 Daltons, from 1,900 Daltons to 2,100 Daltons, and from 625 Daltons to 675 Daltons, respectively. Other Terathane® polyether glycols may be used. Terathane® is a blend of linear diols in which the hydroxyl groups are separated by reacting tetramethylene ether groups (poly(oxy-1,4-butanediyl)$_a$-hydro-w-hydroxyl) HO—(—CH$_2$—CH$_2$—CH$_2$—CH$_2$—)$_n$—H where n can be an integer from 4 to 45.

Suitable polyether glycols are available from BASF under the tradename PolyTHF®.

A polyether polyol can have a weight average molecular weight from about 250 Daltons to about 3,000 Daltons. For example, a polyether polyol can have a weight average molecular weight from 650 Daltons to 2000 Daltons, from 1,000 Daltons to 1,800 Daltons, or from 1,000 Daltons to 1,400 Daltons. A polyether polyol can be crystalline.

More than one type of polyether polyol can be used. A composition can comprise a combination of polyether polyols having several different weight average molecular weights. A composition can comprise a mixture of polyether polyols having several different glass transition temperatures.

Examples of suitable polyester polyols include polyester glycols, polycaprolactone polyols, polycarbonate polyols and combinations of any of the foregoing. Polyester glycols can include the esterification products of one or more dicarboxylic acids having from four to ten carbon atoms, such as adipic acid, succinic acid, or sebacic acid, with one or more low molecular weight glycols having from two to ten carbon atoms, such as ethylene glycol, propylene glycol, diethylene glycol, 1,4-butanediol, neopentyl glycol, 1,6-hexanediol, and 1,10-decanediol. Examples of suitable polycaprolactone polyols include those prepared by condensing caprolactone in the presence of difunctional active hydrogen material such as water or low molecular weight glycols, for example ethylene glycol and propylene glycol. Examples of suitable polycaprolactone polyols include commercially available materials designated as the CAPA® series from Solvay Chemical; such as CAPA® 2047A and CAPA® 2077A, and the polycaprolactone TONE® series from Dow Chemical, such as TONE® 0201, 0210, 0230, and 0241. A polycaprolactone polyol can have a number average molecular weight ranging, for example, from 500 Daltons to 2,000 Daltons, or from 500 Daltons to 1,000 Daltons. Polyester polyols include those within the Desmophen® and Baycoll® product lines available from Covestro.

Examples of suitable polycarbonate polyols include aliphatic polycarbonate diols, for example those based upon alkylene glycols, ether glycols, alicyclic glycols or mixtures thereof. The alkylene groups for preparing the polycarbonate polyol can comprise from 5 to 10 carbon atoms and can be straight chain, cycloalkylene, or combinations thereof. Examples of such alkylene groups include hexylene, octylene, decylene, cyclohexylene and cyclohexyldimethylene. Suitable polycarbonate polyols can be prepared, for example, by reacting a hydroxy terminated alkylene glycol with a dialkyl carbonate, such as methyl, ethyl, n-propyl or n-butyl carbonate, or diaryl carbonate, such as diphenyl or dinaphthyl carbonate, or by reacting of a hydroxyl-terminated alkylene diol with phosgene or bischloroformate, in a manner well-known to those skilled in the art. Examples of such polycarbonate polyols include those commercially available as Ravecarb™107 from Enichem S.p.A. (Polimeri Europa), and polyhexylene carbonate diols, 1,000 number average molecular weight, such as 13410-1733 polycarbonate diol prepared from hexanediol, available from Stahl.

Examples of other suitable polycarbonate polyols that are commercially available include KM10-1122, KM10-1667 (prepared from a 50/50 weight percent mixture of cyclohexane dimethanol and hexanediol) (commercially available from Stahl U.S.A. Inc.) and Desmophen® 2020E (Bayer Corp.).

Suitable polymeric polyols include polycarbonate diols and polycarbonate-polyester diols such as Desmophen® C available from Covestro.

Polymeric diols can include dimer-acid diols. For example, dimer acid diols can include Priplast™ dimer acid-based polyester polyols available from Croda Polymers & Coatings.

Suitable fluoro polyols such as fluoro polyether diols and fluoro polyester diols are available from Solvay.

A urethane/urea-containing polyalkenyl can comprise a urethane-containing polyalkenyl of Formula (8a), a urea-containing polyalkenyl of Formula (8b), or a combination thereof:

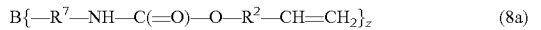

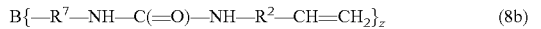

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

$R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and B represents a core of a z-valent, polyfunctionalizing agent $B(-R^7-N=C=O)_z$ wherein z is an integer from 3 to 6.

In urethane/urea-containing polyalkenyls of Formula (8a) and Formula (8b), z can be 3, 4, 5, or 6.

In urethane/urea-containing polyalkenyls of Formula (8a) and Formula (8b), $R^2$ can be selected from $-(CH_2)_2-O-$, $-(CH_2)_3-O-$, $-(CH_2)_4-O-$, $-(CH_2)_5-O-$, and $-(CH_2)_6-O-$.

In urethane/urea-containing polyalkenyls of Formula (8a) and Formula (8b), $R^2$ can be $-(CH_2)_4-O-$.

In urethane/urea-containing polyalkenyls of Formula (8a) and Formula (8b), each $R^7$ can be independently selected from $C_{2-10}$ alkanediyl and $C_{2-10}$ heteroalkanediyl.

In urethane/urea-containing polyalkenyls of Formula (8a) and Formula (8b), each $R^7$ can be selected from $-(CH_2)_2-$, $-(CH_2)_3-$, $-(CH_2)_4-$, $-(CH_2)_5-$, $-(CH_2)_6-$, and $-(CH_2)_7-$.

In urethane/urea-containing polyalkenyls of Formula (8a) and Formula (8b), B can have the structure:

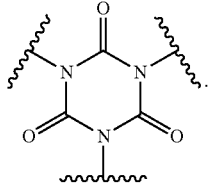 [SMILES: *n1c(=O)n(*)c(=O)n(*)c1=O]

In urethane/urea-containing polyalkenyls of Formula (8a) and Formula (8b), $B(-V)_z$ can be hexamethylene diisocyanate trimer such as Desmodur® N 3390), z can be 3; $R^2$ can be $-(CH_2)_4-O-$; each $R^7$ can be $-(CH_2)_6-$; and B can be a moiety having the structure:

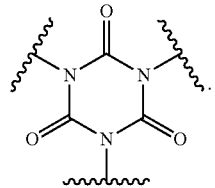

Polyfunctional urethane/urea-containing polyalkenyl of Formula (8a) and Formula (8b) can be prepared by reacting a polyisocyanate having an isocyanate functionality greater than 2 such as from 3 to 6 with a hydroxyl/amino-functional alkenyl such as a hydroxyl/amino-functional vinyl ether in the presence of a suitable catalyst such as a tin-based catalyst.

Accordingly, a polyfunctional urethane/urea-containing polyalkenyl can comprise the reaction product of a polyisocyanate having a functionality greater than 2 such as from 3 to 6; and a hydroxyl/amino functional alkenyl such as hydroxyl/amino-functional vinyl ether.

Examples of suitable polyisocyanates having an isocyanate functionality greater than 2 include Desmodur® N 3390, 1,3,5-triisocyanato-1,3,4-triazinane-2,4,6-trione, 1-isocyanato-1-aza-diazanidayclohexane-2,4,6-trione, 1,3,5-triisocyanato-2-methylbenzene, 1,2,3-triisocyanatobenzene, 2,4,6-triisocyanato-1,3,5-triazine, 1,3,5-triisocyanato-benzene, 1,2,3-triisocyanato-2-methylcyclohexane, 1,2,3-triisocyanato-5-methylbenzene, 1,2,4-triisocyanato-1-methylcyclohexane, 2-ethyl-1,3,5-triisocyanto-4-methylbenzene, 1,2,3-triisocyanato-4,5-dimethylbenzene, 1,2,4-triisocyanato-3,5-dimethylbenzene, and combinations of any of the foregoing.

Examples of suitable hydroxyl/amino-functional vinyl ethers include 4-hydroxybutyl vinyl ether, 3-amino propyl vinyl ether, and 1,4-cyclohexanedimethanol mono vinyl ether.

A urethane/urea-containing polyalkenyl can comprise a urethane-containing polyalkenyl of Formula (8c), a urea-containing polyalkenyl of Formula (8d), or a combination thereof:

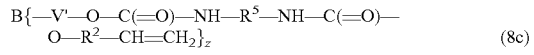

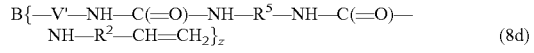

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$ heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and B represents a core of a z-valent, polyfunctionalizing agent $B(-V)_z$ wherein, z is an integer from 3 to 6; and
each —V comprises a moiety comprising a terminal group reactive with an isocyanate group; and
—V'— is a moiety derived from the reaction of —V with an isocyanate group.

In polyalkenyls of Formula (8c) and (8d), $R^2$ can be selected from $C_{2-10}$ alkanediyl and $C_{2-12}$ heteroalkanediyl.

In polyalkenyls of Formula (8c) and (8d), $R^5$ can be a core of a diisocyanate. Examples of suitable diisocyanates include dicyclohexylmethane-4,4'-diisocyanate methylene-bis-(4-isocyanatocyclohexane) ($H_{12}$MDI), isophorone diisocyanate, 2,4-toluene diisocyanate, 2,6-toluene diisocyanate, and 2,4-toluenediisocyanate.

Suitable polyfunctionalizing agents $B(-V)_z$ include polyols and polyamines, which include terminal groups reactive with thiol groups.

Urethane/urea-containing polyalkenyls having an alkenyl functionality greater than 2 such as polyalkenyls of Formula (8c) and Formula (8d) can be prepared by (a) reacting a polyfunctionalizing agent having terminal groups reactive with isocyanate groups with a diisocyanate to provide the corresponding isocyanate-terminated polyfunctionalizing agent; and (b) reacting the isocyanate-terminated polyfunctionalizing agent with a hydroxyl/amino-functional alkenyl such as a hydroxyl/amino-functional vinyl ether to provide the corresponding polyfunctional urethane/urea-containing polyalkenyl.

Accordingly, a polyfunctional urethane/urea-containing polyalkenyl can comprise the reaction product of reactants comprising a polyfunctionalizing agent having terminal groups reactive with isocyanate groups or a combination of polyfunctionalizing agents having terminal groups reactive with isocyanate groups, a diisocyanate or a combination of diisocyanates, and a hydroxyl/amino-functional alkenyl such as a hydroxyl/amino-functional vinyl ether or a combination of hydroxyl/amino-functional alkenyls such as a combination of hydroxyl/amino-functional vinyl ethers.

Examples of suitable hydroxyl-terminated polyfunctionalizing agents include polyols. Polyol polyfunctionalizing agents can be represented by the formula $B(-V)_z$, where B represents a core of a z-valent polyfunctionalizing agent $B(-V)_z$, z is an integer from 3 to 6; and each —V is a moiety comprising a terminal hydroxyl (—OH) group.

Examples of suitable amino-terminated polyfunctionalizing agents include 1,3,5-triazine-2,4,6-triamine, benzene-1,3,5-triamine, pyrimidine-4,5,6-triamine, 4H-1,2,4-triazole-3,4,5-triamine, benzene-1,2,4-triamine, and 2,6-dimethylbenzene-1,3,5-triamine.

Examples of suitable diisocyanates include any of those disclosed herein.

Examples of suitable hydroxyl/amino vinyl ethers include 4-hydroxybutyl vinyl ether, 3-amino propyl vinyl ether, and 1,4-cyclohexanedimethanol mono vinyl ether.

Compositions provided by the present disclosure can comprise a surfactant or defoamer. A suitable defoamer includes BYK-1794, an emissions-free and silicone-free polymeric defoamer, from Palmer Holland.

A composition can comprise, for example, from 40 wt % to 70 wt % of a difunctional urethane/urea-containing polyalkenyl prepolymer and from 30 wt % to 55 wt % of a urethane/urea-containing dithiol, from 45 wt % to 65 wt % of a difunctional urethane/urea-containing polyalkenyl prepolymer and from 35 wt % to 50 wt % of a urethane/urea-containing dithiol, or from 50 wt % to 60 wt % of a difunctional urethane/urea-containing polyalkenyl prepolymer and from 40 wt % to 50 wt % of a urethane/urea-containing dithiol, wherein wt % is based on the total weight of the polyalkenyls and the polythiols in the composition.

A composition can comprise, for example, from 2 wt % to 6 wt % of a hydroxyl/amino-functional dithiol, from 2.5 wt % to 5.5 wt % of a hydroxyl-functional dithiol, from 3 wt % to 5 wt % of a hydroxyl/amino-functional dithiol, or from 3 wt % to 4 wt % of a hydroxyl/amino-functional dithiol, wherein wt % is based on the total weight of the polyalkenyls and the polythiols in the composition.

A composition can comprise, for example, from 2.5 wt % to 7 wt % of a trifunctional polyalkenyl, from 3 wt % to 6.5 wt % of a trifunctional polyalkenyl, from 3.5 wt % to 6 wt % of a trifunctional polyalkenyl, from 4 wt % to 5.5 wt % of a trifunctional polyalkenyl, or from 4 wt % to 5 wt % of a trifunctional polyalkenyl, wherein wt % is based on the total weight of the polyalkenyls and the polythiols in the composition.

A composition can comprise, for example, from 1 wt % to 7 wt % of a tetrafunctional polythiol, from 1.5 wt % to 5 wt % of a tetrafunctional polythiol, from 1.5 wt % to 4 wt % of a tetrafunctional polythiol, from 2 wt % to 3.5 wt % of a tetrafunctional polythiol, or from 2 wt % to 3 wt % of a tetrafunctional polythiol, wherein wt % is based on the total weight of the polyalkenyls and the polythiols in the composition.

A composition can comprise, for example, from 40 wt % to 70 wt % of a difunctional urethane/urea-containing polyalkenyl prepolymer, from 30 wt % to 55 wt % of a urethane/urea-containing dithiol, and from 2 wt % to 6 wt % of a hydroxyl/amino-functional dithiol; from 45 wt % to 65 wt % of a difunctional urethane/urea-containing polyalkenyl prepolymer, from 35 wt % to 50 wt % of a urethane/urea-containing dithiol, and from 3 wt % to 5 wt % of a hydroxyl/amino-functional dithiol; or from 50 wt % to 60 wt % of a difunctional urethane/urea-containing polyalkenyl prepolymer, from 40 wt % to 50 wt % of a urethane/urea-containing dithiol, and from 3 wt % to 4 wt % of a hydroxyl/amino-functional dithiol; wherein wt % is based on the total weight of the polyalkenyls and the polythiols in the composition.

A composition can comprise, for example, from 40 wt % to 70 wt % of a difunctional urethane/urea-containing polyalkenyl prepolymer, from 30 wt % to 55 wt % of a urethane/urea-containing dithiol, and from 2.5 wt % to 7 wt % of a trifunctional polyalkenyl; from 45 wt % to 65 wt % of a difunctional urethane/urea-containing polyalkenyl prepolymer, from 35 wt % to 50 wt % of a urethane/urea-containing dithiol, and from 4 wt % to 5.5 wt % of a trifunctional polyalkenyl; or from 50 wt % to 60 wt % of a difunctional urethane/urea-containing polyalkenyl prepolymer, from 40 wt % to 50 wt % of a urethane/urea-containing dithiol, and from 4 wt % to 5 wt % of a trifunctional polyalkenyl; wherein wt % is based on the total weight of the polyalkenyls and the polythiols in the composition.

A composition can comprise, for example, from 40 wt % to 70 wt % of a difunctional urethane/urea-containing polyalkenyl prepolymer, from 30 wt % to 55 wt % of a urethane/urea-containing dithiol, and from 1 wt % to 7 wt % of a tetrafunctional polythiol; from 45 wt % to 65 wt % of a difunctional urethane/urea-containing polyalkenyl prepolymer, from 35 wt % to 50 wt % of a urethane/urea-containing dithiol, and from 1.5 wt % to 4 wt % of a tetrafunctional polythiol; or from 50 wt % to 60 wt % of a difunctional urethane/urea-containing polyalkenyl prepolymer, from 40 wt % to 50 wt % of a urethane/urea-containing dithiol, and from 2 wt % to 3 wt % of a tetrafunctional polythiol; wherein wt % is based on the total weight of the polyalkenyls and the polythiols in the composition.

A composition can comprise, for example, from 40 wt % to 70 wt % of a difunctional urethane/urea-containing polyalkenyl prepolymer, from 30 wt % to 55 wt % of a urethane/urea-containing dithiol, from 2 wt % to 6 wt % of a hydroxyl/amino-functional dithiol, and from 2.5 wt % to 7 wt % of a trifunctional polyalkenyl; from 45 wt % to 65 wt % of a difunctional urethane/urea-containing polyalkenyl prepolymer, from 35 wt % to 50 wt % of a urethane/urea-containing dithiol, from 3 wt % to 5 wt % of a hydroxyl/amino-functional dithiol, and from 4 wt % to 5.5 wt % of a trifunctional polyalkenyl; or from 50 wt % to 60 wt % of a difunctional urethane/urea-containing polyalkenyl prepolymer, from 40 wt % to 50 wt % of a urethane/urea-containing dithiol, from 3 wt % to 4 wt % of a hydroxyl/amino-functional dithiol, and from 4 wt % to 5 wt % of a trifunctional polyalkenyl; wherein wt % is based on the total weight of the polyalkenyls and the polythiols in the composition.

A composition can comprise, for example, from 40 wt % to 70 wt % of a difunctional urethane/urea-containing polyalkenyl prepolymer, from 30 wt % to 55 wt % of a urethane/urea-containing dithiol, from 2 wt % to 6 wt % of a hydroxyl/amino-functional dithiol, and from 1 wt % to 7 wt % of a tetrafunctional polythiol; from 45 wt % to 65 wt % of a difunctional urethane/urea-containing polyalkenyl prepolymer, from 35 wt % to 50 wt % of a urethane/urea-containing dithiol, from 3 wt % to 5 wt % of a hydroxyl/amino-functional dithiol, and from 1.5 wt % to 4 wt % of a tetrafunctional polythiol; or from 50 wt % to 60 wt % of a difunctional urethane/urea-containing polyalkenyl prepolymer, from 40 wt % to 50 wt % of a urethane/urea-containing dithiol, from 3 wt % to 4 wt % of a hydroxyl/amino-functional dithiol, and from 2 wt % to 3 wt % of a tetrafunctional polythiol; wherein wt % is based on the total weight of the polyalkenyls and the polythiols in the composition.

A composition can comprise, for example, from 0.35 to 0.65 equivalents of a difunctional urethane/urea-containing polyalkenyl prepolymer and from 0.35 to 0.65 equivalents of a urethane/urea-containing dithiol, from 0.40 to 0.60 equivalents of a difunctional urethane/urea-containing polyalkenyl prepolymer and from 0.40 to 0.60 equivalents of a urethane/urea-containing dithiol, or from 0.45 to 0.55 equivalents of a difunctional urethane/urea-containing polyalkenyl prepolymer and from 0.45 to 0.55 equivalents of a urethane/urea-containing dithiol, wherein equivalents is based on the total alkenyl equivalents or the total thiol equivalents in the composition.

A composition can comprise, for example, from 0.05 to 0.12 equivalents of a hydroxyl/amino-functional dithiol, from 0.06 to 0.11 equivalents of a hydroxyl/amino-functional dithiol, from 0.07 to 0.10 equivalents of a hydroxyl/amino-functional dithiol, or from 0.08 to 0.95 equivalents of a hydroxyl/amino-functional dithiol, wherein equivalents is based on the total thiol equivalents in the composition.

A composition can comprise, for example, from 0.05 to 0.15 equivalents of a trifunctional polyalkenyl, from 0.06 to 0.14 equivalents of a trifunctional polyalkenyl, from 0.07 to 0.13 equivalents of a trifunctional polyalkenyl, from 0.08 to 0.12 equivalents of a trifunctional polyalkenyl, or from 0.09 to 0.11 equivalents of a trifunctional polyalkenyl, wherein equivalents is based on the total alkenyl equivalents in the composition.

A composition can comprise, for example, from 0.35 to 0.65 equivalents of a difunctional urethane/urea-containing polyalkenyl prepolymer, from 0.35 to 0.65 equivalents of a urethane/urea-containing dithiol, and from 0.05 to 0.12 equivalents of a hydroxyl/amino-functional dithiol; from 0.40 to 0.60 equivalents of a difunctional urethane/urea-containing polyalkenyl prepolymer, from 0.40 to 0.60 equivalents of a urethane/urea-containing dithiol, and from 0.07 to 0.10 equivalents of a hydroxyl/amino-functional dithiol; or from 0.45 to 0.55 equivalents of a difunctional urethane/urea-containing polyalkenyl prepolymer, from 0.45 to 0.55 equivalents of a urethane/urea-containing dithiol, and from 0.08 to 0.95 equivalents of a hydroxyl/amino-functional dithiol; wherein equivalents is based on the total alkenyl equivalents or the total thiol equivalents in the composition.

A composition can comprise, for example, from 0.35 to 0.65 equivalents of a difunctional urethane/urea-containing polyalkenyl prepolymer, from 0.35 to 0.65 equivalents of a urethane/urea-containing dithiol, and from 0.05 to 0.15 equivalents of a trifunctional polyalkenyl; from 0.40 to 0.60 equivalents of a difunctional urethane/urea-containing polyalkenyl prepolymer, from 0.40 to 0.60 equivalents of a urethane/urea-containing dithiol, and from 0.08 to 0.12 equivalents of a trifunctional polyalkenyl; or from 0.45 to 0.55 equivalents of a difunctional urethane/urea-containing polyalkenyl prepolymer, from 0.45 to 0.55 equivalents of a urethane/urea-containing dithiol, and from 0.09 to 0.11 equivalents of a trifunctional polyalkenyl; wherein equivalents is based on the total alkenyl equivalents or the total thiol equivalents in the composition.

A composition can comprise, for example, from 0.35 to 0.65 equivalents of a difunctional urethane/urea-containing polyalkenyl prepolymer, from 0.35 to 0.65 equivalents of a urethane/urea-containing dithiol, from 0.05 to 0.12 equivalents of a hydroxyl/amino-functional dithiol, and from 0.05 to 0.15 equivalents of a trifunctional polyalkenyl; from 0.40 to 0.60 equivalents of a difunctional urethane/urea-containing polyalkenyl prepolymer, from 0.40 to 0.60 equivalents of a urethane/urea-containing dithiol, from 0.07 to 0.10 equivalents of a hydroxyl/amino-functional dithiol, and from 0.08 to 0.12 equivalents of a trifunctional polyalkenyl; or from 0.45 to 0.55 equivalents of a difunctional urethane/urea-containing polyalkenyl prepolymer, from 0.45 to 0.55 equivalents of a urethane/urea-containing dithiol, from 0.08 to 0.95 equivalents of a hydroxyl/amino-functional dithiol, and from 0.09 to 0.11 equivalents of a trifunctional polyalkenyl; wherein equivalents is based on the total alkenyl equivalents or the total thiol equivalents in the composition.

A composition can comprise a dithiol such as a polymeric dithiol and a hydroxyl-functional dithiol such as a monomeric hydroxyl/amino-functional dithiol. A composition can comprise from 2 to 6 equivalents of a dithiol to 1 equivalent of a hydroxyl/amino-functional dithiol, from 3 to 6 equivalents of a dithiol to 1 equivalent of a hydroxyl/amino-functional dithiol, from 4 to 6 equivalents of a dithiol to 1 equivalent of a hydroxyl/amino-functional dithiol, from 2 to 5 equivalents of a dithiol to 1 equivalent of a hydroxyl/amino-functional dithiol, or from 2 to 4 equivalents of a dithiol to 1 equivalent of a hydroxyl/amino-functional dithiol.

A composition can comprise a polyalkenyl such as a difunctional urethane/urea-containing polyalkenyl prepolymer and a polyalkenyl having a polyalkenyl functionality from 3 to 6 such as a monomer trifunctional polyalkenyl. A composition can comprise from 2 to 6 equivalents of a difunctional urethane/urea-containing polyalkenyl prepolymer to one equivalent of a polyalkenyl functionality from 3 to 6, from 3 to 6 equivalents of a difunctional urethane/ urea-containing polyalkenyl prepolymer to one equivalent of a polyalkenyl functionality from 3 to 6, from 4 to 6 equivalents of a difunctional urethane/urea-containing polyalkenyl prepolymer to one equivalent of a polyalkenyl functionality from 3 to 6, from 2 to 5 equivalents of a difunctional urethane/urea-containing polyalkenyl prepolymer to one equivalent of a polyalkenyl functionality from 3 to 6, or from 2 to 4 equivalents of a difunctional urethane/urea-containing polyalkenyl prepolymer to one equivalent of a polyalkenyl functionality from 3 to 6.

Compositions provided by the present disclosure can comprise from 45 wt % to 85 wt % of a urethane/urea-containing polyalkenyl prepolymer, such as from 50 wt % to 80 wt %, from 55 wt % to 75 wt % or from 60 wt % to 70 wt %, where wt % is based on the total weight of the composition.

Compositions provided by the present disclosure can comprise from 10 wt % to 30 wt % of a polythiol without urethane groups or urea groups, such as from 12 wt % to 28 wt %, from 14 wt % to 26 wt %, from 16 wt % to 24 wt %, where wt % is based on the total weight of the composition.

Compositions provided by the present disclosure can comprise from 0.5 wt % to 4 wt % of a filler such as fumed silica, such as from 0.75 wt % to 3.5 wt %, or from 1 wt % to 3 wt %, where wt % is based on the total weight of the composition.

Compositions provided by the present disclosure can comprise from 4 wt % to 14 wt % solvent, from 6 wt % to 12 wt %, from 8 wt % to 10 wt % solvent, where wt % is based on the total weight of the composition.

Compositions provided by the present disclosure can comprise, for example, from 45 wt % to 85 wt % of a urethane/urea-containing polyalkenyl prepolymer, and from 10 wt % to 30 wt % of a polythiol without urethane groups or urea groups, where wt % is based on the total weight of the composition. Compositions provided by the present disclosure can comprise, for example, from 50 wt % to 80 wt % of a urethane/urea containing polyalkenyl prepolymer, and from 12 wt % to 28 wt % of a polythiol without urethane groups or urea groups, where wt % is based on the total weight of the composition. Compositions provided by the present disclosure can comprise, for example, from 55 wt % to 75 wt % of a urethane/urea containing polyalkenyl prepolymer, and from 14 wt % to 26 wt % of a polythiol without urethane groups or urea groups, where wt % is based on the total weight of the composition.

Compositions provided by the present disclosure can comprise, for example, from 45 wt % to 85 wt % of a urethane/urea-containing polyalkenyl prepolymer, from 10 wt % to 30 wt % of a polythiol without urethane groups or urea groups, from 10 wt % to 30 wt % of a polythiol without urethane groups or urea groups, and from 4 wt % to 14 wt % solvent, where wt % is based on the total weight of the composition. Compositions provided by the present disclosure can comprise, for example, from 50 wt % to 80 wt % of a urethane/urea-containing polyalkenyl prepolymer, from 12 wt % to 28 wt % of a polythiol without urethane groups or urea groups, from 10 wt % to 30 wt % of a polythiol without urethane groups or urea groups, and from 6 wt % to 12 wt % solvent, where wt % is based on the total weight of the composition. Compositions provided by the present disclosure can comprise, for example, from 55 wt % to 75 wt % of a urethane/urea-containing polyalkenyl prepolymer, from 10 wt % to 30 wt % of a polythiol without urethane groups or urea groups, from 14 wt % to 26 wt % of a polythiol without urethane groups or urea groups, and from 8 wt % to 10 wt % solvent, where wt % is based on the total weight of the composition.

Compositions provided by the present disclosure can comprise, for example, a solids content from 60 wt % to 90 wt %, from 65 wt % to 85 wt %, or from 70 wt % to 75 wt %, where wt % is based on the total weight of the composition.

A composition can comprise, for example, from 60 wt % to 90 wt % of a polyalkenyl, from 65 wt % to 85 wt %, from 70 wt % to 80 wt % of a polyalkenyl, where wt % is based on the total solids weight of the composition. A composition can comprise, for example, from 10 wt % to 30 wt % of a polythiol, from 12 wt % to 28 wt %, from 14 wt % to 26 wt %, from 16 wt % to 24 wt %, or from 18 wt % to 22 wt % of a polythiol, where wt % is based on the total solids weight of the composition. A composition can comprise, for example, from 0.1 wt % to 5 wt % of an inorganic filler, from 0.5 wt % to 4 wt %, from 1 wt % to 3 wt % of an inorganic filler, where wt % is based on the total solids weight of the composition.

A composition can comprise, for example, from 60 wt % to 90 wt % of a polyalkenyl, from 10 wt % to 30 wt % of a polythiol, and from 0.1 wt % to 5 wt % of an inorganic filler; from 65 wt % to 85 wt % of a polyalkenyl, from 12 wt % to 28 wt % of a polythiol, and from 0.5 wt % to 4 wt % of an inorganic filler; or from 70 wt % to 80 wt % of a polyalkenyl, from 14 wt % to 26 wt % of a polythiol, and from 1 wt % to 3 wt % of an inorganic filler, where wt % is based on the total solids weight of the composition.

Composition provided by the present disclosure can further comprise an antioxidant, a UV photoinitiator, a defoamer, an adhesion promoter, and a crosslinking agent.

Compositions provided by the present disclosure can include a UV photoinitiator.

Examples of suitable UV photoinitiators include α-hydroxyketones, benzophenone, α,α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclphosphine oxide.

Other examples of suitable UV photoinitiators include the Irgacure™ products from BASF, for example the products Irgacure™ 184, Irgacure™ 500, Irgacure™ 1173, Irgacure™ 2959, Irgacure™ 745, Irgacure™ 651, Irgacure™ 369, Irgacure™ 907, Irgacure™ 1000, Irgacure™ 1300, Irgacure™ 819, Irgacure™ 819DW, Irgacure™ 2022, Irgacure™ 2100, Irgacure™ 784, Irgacure™ 250; in addition, the Irgacure™ products from BASF can be used, for example the products Irgacure™ MBF, Darocur™ 1173, Darocur™ TPO, Darocur™ 4265.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenyl-phosphineoxide (Darocur® TPO, Ciba Specialty Chemicals), or a combination thereof.

Compositions provided by the present disclosure can comprise from 1 wt % to 5 wt %, from 1.5 wt % to 4.5 wt %, from 2 wt % to 4 wt %, from 2.5 wt % to 3.5 wt % of a UV photoinitiator or combination of UV photoinitiators, where wt % is based on the total weight of the curable composition.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise one or more adhesion promoters. The composition may contain from 0.1 wt % to 15 wt % of an adhesion promoter, less than 5 wt %, less than 2 wt %, or less than 1 wt % of an adhesion promoter, based on the total dry weight of the composition. Examples of adhesion promoters include phenolics, such as Methylon® phenolic resin, and organosilanes, such as epoxy-, mercapto- or amino-functional silanes, including, for example, Silquest® A-187 and Silquest® A-1100. Other useful adhesion promoters are known in the art.

Suitable adhesion promoters include sulfur-containing adhesion promoters such as those disclosed in U.S. Pat. Nos. 8,513,339; 8,952,124; and 9,056,949; and U.S. Application Publication No. 2014/0051789, each of which is incorporated by reference in its entirety.

An adhesion promoter can comprise an isocyanate-functional aliphatic acrylic ester. An example of a suitable isocyanate-functional acrylic ester is Laromer® LR9000, which is a 2-propenoic acid, 2-hydroxyethyl ester polymer with 1,6-diisocyanatohexane, available from BASF.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Examples of electrically non-conductive fillers include materials such as calcium carbonate, mica, polyamide, fumed silica, molecular sieve powder, microspheres, titanium dioxide, chalks, alkaline blacks, cellulose, zinc sulfide, heavy spar, alkaline earth oxides, and alkaline earth hydroxides. A composition can include 5 wt % to 60 wt % of a filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can comprise hydrophobic fumed silica, hydrophilic fumed silica, or a combination thereof.

Compositions provided by the present disclosure can include low density filler particles. Low density particles refers to particles that have a specific gravity of no more than 0.7, no more than 0.25, or no more than 0.1. Suitable lightweight filler particles often fall within two categories: microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 µm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839, which is incorporated by reference in its entirety. Suitable lightweight fillers are also disclosed in U.S. Pat. No. 6,525,168. A light weight filler can comprise polyphenylene sulfide such as disclosed in U.S. application Ser. No. 14/640,044, filed on Jan. 9, 2015, which is incorporated by reference in its entirety.

A composition can comprise less than 2 wt % of lightweight particles, less than 1.5 wt %, less than 1.0 wt %, less than 0.8 wt %, less than 0.75 wt %, less than 0.7 wt %, or less than 0.5 wt % of a composition, where wt % is based on the total dry solids weight of the composition.

A composition provided by the present disclosure can comprise light weight fillers that reduce the specific gravity of the composition. For example, a composition can have a specific gravity from 0.8 to 1, 0.7 to 0.9, from 0.75 to 0.85, from 0.9 to 1.2, from 1.0 to 1.2, or about 0.8 or about 1.1. A composition can have a specific gravity from 1.02 to 1.22, from 1.04 to 1.20, from 1.06 to 1.18, from 1.08 to 1.16, from 1.10 to 1.14, or from 1.11 to 1.13. The specific gravity of a composition can be less than about 1.2, less than about 1.1, less than about 1.0, less than about 0.9, less than about 0.8, less than about 0.75, less than about 0.7, less than about 0.65, less than about 0.6, or less than about 0.55. Specific gravity refers to the ratio of the density of a substance to the density of water at room temperature and pressure. Density can be measured according to ASTM D 792 Method A.

A composition provided by the present disclosure can comprise an electrically conductive filler. Electrical conductivity and EMI/RFI shielding effectiveness can be imparted to a composition by incorporating conductive materials. The conductive elements can include, for example, metal or metal-plated particles, fabrics, meshes, fibers, and combinations thereof. The metal can be in the form of, for example, filaments, particles, flakes, or spheres. Examples of suitable metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Electrically conductive fillers also include high band gap materials such as zinc sulfide and inorganic barium compounds.

Fillers used to impart electrical conductivity and EMI/RFI shielding effectiveness to polymer compositions are well known in the art. Examples of electrically conductive fillers further include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to sealant compositions. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 µm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 µm to 250 µm, from 0.25 µm to 75 µm, or from 0.25 µm to 60 µm. Compositions of the present disclosure can comprise Ketjenblack® EC-600 JD (AkzoNobel, Inc., Chicago, Ill.), an electrically conductive carbon black characterized by an iodine absorption of 1000 mg/g to 11500 mg/g (J0/84-5 test method), and a pore volume of 480 cm$^3$/100 g to 510 cm$^3$/100 g (DBP absorption, KTM 81-3504). An electrically conductive carbon black filler can comprise Black Pearls® 2000 (Cabot Corporation).

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles and/or flakes. The amount and type of electrically conductive filler can be selected to produce a sealant composition which, when cured, exhibits a sheet resistance (four-point resistance) of less than 0.50 Ω/cm$^2$, or a sheet resistance less than 0.15 Ω/cm$^2$. The amount and type of filler can also be selected to provide effective EMI/RFI shielding over a frequency range from 1 MHz to 18 GHz.

Galvanic corrosion of dissimilar metal surfaces and the conductive compositions of the present disclosure can be minimized or prevented by adding corrosion inhibitors to the composition, and/or by selecting appropriate conductive fillers. The non-chromate corrosion inhibitors can increase the corrosion resistance of sealants comprising an electrically conductive filler U.S. Pat. Nos. 5,284,888 and 5,270,364 disclose the use of aromatic triazoles to inhibit corrosion of aluminum and steel surfaces that can also be included in a sealant composition provided by the present disclosure. A sacrificial oxygen scavenger such as Zn can be used as a corrosion inhibitor. A corrosion inhibitor can comprise less than 10% by weight of the total weight of the electrically conductive composition. A corrosion inhibitor can comprise an amount ranging from 2 wt % to 8 wt % of the total weight of the electrically conductive composition. Corrosion between dissimilar metal surfaces can also be minimized or prevented by the selection of the type, amount, and properties of the conductive fillers comprising the composition.

A sealant composition may also include additives such as plasticizers, pigments, surfactants, adhesion promoters, thixotropic agents, fire retardants, masking agents, accelerators (such as amines, including 1,4-diaza-bicyclo[2.2.2] octane, DABCO®), and combinations of any of the foregoing. When used, the additives may be present in a composition in an amount ranging, for example, from about 0 wt % to about 60 wt %, where wt % is based on the total weight of the composition. Additives may be present in a composition in an amount ranging from about 25 wt % to 60 wt %, where wt % is based on the total weight of the composition.

Uncured compositions provided by the present disclosure can be provided as a one-part composition and stored under dark conditions and low temperature. At the time of application, additional solvent can be added to adjust the viscosity as appropriate for the method and apparatus used to apply the composition to a surface.

Uncured compositions provided by the present disclosure can be provided as a two part system comprising a first component and a second component which can be prepared and stored separately, and then combined and mixed at the time of use.

The first component or composition can comprise the polythiol. The second component can comprise the polyalkenyl. A photoinitiator can be included in the first and/or second component.

The first component and the second component can be formulated to be rendered compatible when combined such that the constituents of the base and accelerator components can intermix and be homogeneously dispersed to provide a sealant or coating composition for application to a substrate. Factors affecting the compatibility of the base and accelerator components include, for example, viscosity, pH, density, and temperature. Additional solvent can be combined with the first and second components prior to application.

Accordingly, coating and sealant systems comprising a first component and a second component are provided by the present disclosure. A sealant system can further comprise a solvent.

A first component of a sealant system can comprise a polythiol or combination of polythiols. A first component can comprise, for example, from 50 wt % to 90 wt % of a polythiol, from 55 wt % to 85 wt %, from 60 wt % to 80 wt %, or from 65 wt % to 75 wt % of a polythiol, where wt % is based on the total weight of the first component. A first component can comprise, for example, from 0.1 wt % to 4 wt % of an inorganic filler; and from 1 wt % to 8 wt % of a defoamer. A first part can comprise from 1 wt % to 21 wt % organic solvent, from 4 wt % to 18 wt %, from 7 wt % to 15 wt %, or from 9 wt % to 13 wt % of an organic solvent, where wt % is based on the total weight of the first part.

A first component can comprise, for example, from 90 wt % to 99 wt % of a polythiol, from 92 wt % to 98 wt %, or from 94 wt % to 97 wt % of a polythiol, where wt % is based on the total solids weight of the first component.

A second component of a sealant system can comprise a polyalkenyl or a combination of polyalkenyls. A second component can comprise, for example, from 76 wt % to 96 wt % of a polyalkenyl, from 78 wt % to 94 wt %, from 80 wt % to 92 wt %, or from 82 wt % to 90 wt % of a polyalkenyl, where wt % is based on the total weight of the second component. A second component can comprise, for example, from 0.1 wt % to 5 wt % of an inorganic filler, and from 0.1 wt % to 3 wt % of an adhesion promoter, where wt % is based on the total weight of the second component. A second component can comprise, for example, from 1 wt % to 20 wt % of an organic solvent, from 4 wt % to 16 wt %, for from 6 wt % to 14 wt % of an organic solvent, where wt % is based on the total weight of the second component.

A second component can comprise, for example, from 70 wt % to 90 wt % of a polyalkenyl, from 73 wt % to 87 wt %, or from 76 wt % to 84 wt % of a polythiol, where wt % is based on the total solids weight of the second component.

Curable compositions provided by the present disclosure can be advantageously used as sealants or coatings, and in particular, as sealants or coatings where low temperature flexibility is desired. For example, curable compositions can be used as aviation and aerospace sealants and coatings. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer by any suitable coating process known to those of ordinary skill in the art.

Furthermore, methods are provided for sealing a surface utilizing a composition provided by the present disclosure. These methods comprise, for example, applying a curable composition to at least one surface of a part; and curing the applied composition to provide a sealed part.

For two-part systems, the polyalkenyl-containing component and the polythiol-containing component can be combined and mixed prior to use. The combination and mixing can be performed separately or in conjunction with the application process. For example, the two-parts can be combined in any suitable mixing equipment such as a static mixers and dynamic mixers.

Compositions provided by the present disclosure can be applied to a surface by any suitable method. The viscosity of the composition can be adjusted facilitate applying the composition using the method of application. Examples of methods of application include, spraying, brush coating, direct roller coating, reverse roller coating, float coating, curtain coating vacuum coating, dip coating, and immersion coating, The method and apparatus for applying the composition to the substrate may be determined, at least in part, by the configuration and type of substrate material. Examples of suitable equipment for spray application includes airless sprayers and air-assisted sprayers.

Compositions provided by the present disclosure may be applied to any of a variety of surfaces. Examples of surfaces to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. Compositions provided by the present disclosure may be applied to a coating on a substrate, such as a polyurethane coating or a primer coating. A surface can be a metal surface, a polymer surface, a coating, or other suitable surface. Examples of suitable surfaces include stainless steel AMS 5513, sulfuric acid anodized aluminum AMS 2471, titanium composition C AMS 4911, Alclad 2024 T3 aluminum QQA 250/5, CA8000 polyurethane, abraded CA8000 polyurethane, PR205 epoxy primer, aluminum QQA 250/12, aluminum QQA 250/13, AMS-C-27725 primer, MIL-PRF-23377 epoxy primer, Alodine® 1200, and 1776M Class B surfaces. A curable composition provided by the present disclosure can be applied to these and to other surfaces used in the aerospace industry.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. A composition may be cured upon exposure to actinic radiation, such as ultraviolet radiation. As will also be appreciated, the methods may be used to seal apertures on aerospace vehicles including aircraft and aerospace vehicles.

After the polyalkenyl and polythiol combined the curable composition can cure at room temperature (23° C.) or the rate of cure can be increased at elevated temperature. The rate of cure can be substantially increased by exposing the curable composition to actinic radiation such as electron beam radiation, ultraviolet radiation, or visible radiation. Compositions intended for use with actinic radiation can include an free radial generator such as a photoinitiator. Any suitable UV light source capable of emitting radiation within a range from 200 nm to 400 nm can be used to initiate the curing reaction. Any suitable visible light source capable of emitting radiation within a range from 400 nm to 700 nm can be used to initiate the curing reaction. For example, radiation sources capable of emitting light within a wavelength range from 390 nm to 410 nm can be used to accelerate the thiol-ene curing reaction. Actinic radiation can be applied to the curable composition during application to a surface and/or after being applied to a surface. For example, actinic radiation can be applied to the curable composition as it is being sprayed from a spray applicator or within up to a few hours such as less than 3 hours after the curable composition has been applied to a surface. Both heat and actinic radiation can be used to adjust the rate of the thiol-ene curing reaction.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

Compositions containing a hydroxyl-functional bis(alkenyl) ether-containing prepolymer provided by the present disclosure and an polyepoxide curing agent can cure, for example, in from 0.5 hours to 3 hours, from 1 hour to 2.5 hours, or from 1 hour to 2 hours, where time to cure refers the time after mixing the prepolymer and curing agent to the time at which the composition exhibits a Shore A hardness of 30. The curing time to exhibit a Shore A hardness of 40 can range, for example, from 1 hour to 4 hours, from 1.5 hour to 3.5 hour, or from 2 hours to 3 hours. Shore A hardness can be measured using Type A durometer in accordance with ASTM D2240.

A cured sealant prepared from a composition provided by the present disclosure meets or exceeds the requirements for aerospace sealants as set forth in AMS 3277.

Apertures, surfaces, joints, fillets, fay surfaces, fay surfaces including apertures, fasteners surfaces of aerospace vehicles such as wings, fuselages, and center wing boxes, and aerospace vehicles, sealed with compositions provided by the present disclosure are also disclosed.

Compositions provided by the present disclosure can be provided as one-part compositions in which the polythiols and the polyalkenyls are combined and stored as a mixed composition. Compositions can comprise fumed silica and a defoaming or leveling agent.

Compositions provided by the present disclosure can be sprayable. A sprayable composition can have a viscosity, for example, from 1 poise to 200 poise (0.1 Pa-sec to 20 Pa-sec), from 20 poise to 200 poise (2 Pa-sec to 20 Pa-sec), from 20 poise to 100 poise (2 Pa-sec to 10 Pa-sec), from 20 poise to 80 poise (2 Pa-sec to 8 Pa-sec), or from 30 poise to 60 poise (2 Pa-sec to 6 Pa-sec), or less than 100 poise (10 Pa-sec). Viscosity can be measured using a Brookfield viscometer.

Compositions provided by the present disclosure can comprise a solvent and can have a volatile organic content less than 40 wt %, less than 35 wt %, less than 30 wt %, 25 wt %, less than 20 wt %, less than 15 wt %, or less than 10 wt %, where wt % is based on the total weight of the composition. Compositions provided by the present disclosure can comprise from 10 wt % to 40 wt %, of a solvent, from 15 wt % to 35 wt %, or from 20 wt % to 30 wt % of a solvent, wherein wt % is based on the total weight of the composition.

A solvent can be any suitable organic solvent used in sprayable coatings and sealants such as, methyl isobutyl ketone, methanol, N-methyl-2-pyrrolidone, propylene glycol monomethyl ether acetate, butyl acetate and combinations of nay of the foregoing.

Sprayable compositions provided by the present disclosure can be sprayed onto a surface using any suitable spray equipment.

Compositions including sprayable compositions provided by the present disclosure can be UV curable. Following application, an applied coating can be exposed to UV radiation to cure the composition.

Cured compositions provided by the present disclosure can exhibit one or more of the following: a minimum load of at least 9 lbf (40.03 N); a tensile stress of at least 700 psi (4.83 MPa) at a maximum load; a tensile strain (elongation) of at least 600%; at the maximum load; and a hardness of at least Shore 35A; wherein the load, tensile stress, and tensile strain are determined according to ASTM D412, and the hardness is determined according to ASTM D2240.

Cured compositions provided by the present disclosure may be optically transparent. An optically transparent material is clear and not hazy or opaque. Optical transparency can be assessed by determining the readability of a black line or print through a cured coating from a distance of about 5 feet. A composition provided by the present disclosure, before curing, may be at least partially transmissive to UV radiation. A transparent coating can have some degree of color provided the coating does not render the coating opaque or otherwise impede, to any significant degree, the ability to see the under lying substrate.

Compositions provided by the present disclosure may contain solvent such as, for example, less than 40 wt %, less than 35 wt % solvent, or less than 25 wt % solvent, where wt % is based on the total weight of the composition. A solvent can be used to reduce the viscosity to enhance sprayability. Compositions can be solvent free, can contain substantially no solvent, or contain from 5 wt % to 10 wt % solvent, where wt % is based on the total weight of the composition.

Compositions may also include a plasticizer to control viscosity. A composition may contain less than 25 wt % plasticizer, such as from 5 wt % to 10 wt % plasticizer, where wt % is based on the total weight of the composition. Examples of suitable plasticizers include phthalates and poly-α-methylstyrene.

Compositions can contain a filler such as, for example, fumed silica filler. A composition can comprise less than 15 wt % filler, less than 10 wt % filler, or less than 5 wt % filler, where wt % is based on the total weight of the composition.

During application, a composition may be heated to a temperature such as from 125° F. (52° C.) to 175° F. (79° C.) to enhance the sprayability.

An applied composition can have a thickness, for example, from 0.1 mils to 30 mils (2.54 μm to 762 μm), from 1 mil to 25 mils, (25.4 μm to 635 μm), from 5 mils to 25 mils (127 μm to 635 μm) such as from 10 mils to 20 mils (254 μm to 508 μm).

A cured composition can have a dried thickness, for example, from 0.1 mils to 30 mils (2.54 μm to 762 μm), from 1 mil to 25 mils, (25.4 μm to 635 μm), from 5 mils to 25 mils (127 μm to 635 μm) such as from 10 mils to 20 mils (254 μm to 508 μm).

EXAMPLES

Embodiments provided by the present disclosure are further illustrated by reference to the following examples, which describe the synthesis, properties, and uses of certain urethane/urea-containing polyalkenyls, urethane/urea-containing polythiols, and/or hydroxyl-functional polythiols; compositions comprising certain urethane/urea-containing polyalkenyls, urethane/urea-containing polythiols, and/or hydroxyl-functional polythiols; and uses of such compositions.

It will be apparent to those skilled in the art that many modifications, both to materials, and methods, may be practiced without departing from the scope of the disclosure.

Example 1

Synthesis of Difunctional Urethane-Containing Polyalkenyl Prepolymer

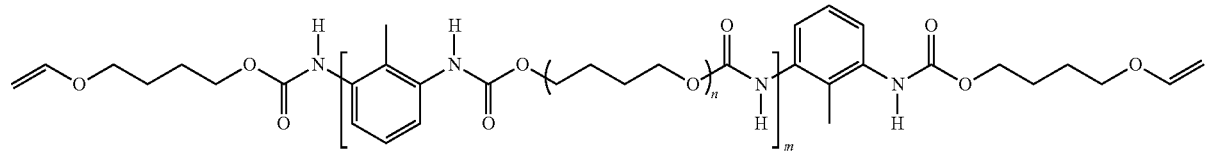

Semi-waxy Adiprene® L-167 (200.28 g, 0.31 equivalent; Chemtura Corporation) was charged into a dry 500-mL, 3-necked round-bottomed flask. The flask was equipped with a mechanical stirrer, a temperature probe and a gas adapter. The contents were flushed with nitrogen. While stirring, 4-hydroxybutyl vinyl ether (HBVE; 35.74 g, 0.31 equiv) was added. The reaction mixture was cloudy at this stage. Heating the mixture to 43° C. resulted in formation of a clear homogeneous liquid. The reaction mixture was cooled to 30° C. and dibutyltin dilaurate catalyst (0.236 g of a 10% solution in methyl ethyl ketone) was added. A mild exotherm developed; the temperature increased to 46° C. during the next 24 min and then started to decrease. The reaction mixture was heated at 70° C. to 72° C. for 2.5 h. The reaction was complete when an infrared spectra on an aliquot of the reaction mixture indicated that the isocyanate peak had disappeared. The reaction mixture was evacuated for 1.5 h (vacuum: 9 mm) to give a liquid product; viscosity: 586 poise; theoretical olefin equivalent: 767.

Example 2

Synthesis of Trifunctional Polyalkenyl

HDI (hexamethylene diisocyanate) trimer Desmodur® N-3390 (100.99 g, 0.527 equiv) and 4-hydroxybutyl vinyl ether (HBVE, 61.19 g; 0.527 equiv) were charged into a dry 250-mL, 3-necked round bottomed flask. The flask was equipped with a mechanical stirrer and a gas adapter. The contents were flushed with nitrogen and the flask was equipped with a temperature probe. While stirring at 200 rpm and at a temperature of 21° ° C., dibutyltin dilaurate catalyst (0.162 g of a 10% solution in methyl ethyl ketone) was added. A mild exotherm was noticed within a minute and the temperature increased to 31° C. within about 2 h. The reaction mixture was heated to a temperature from 68° C. to 70° C. for 3.5 h. The reaction was complete when the infrared spectra on an aliquot of the reaction mixture indicated that the isocyanate peak had disappeared. The reaction mixture was evacuated for about 2.5 h (vacuum: 8 mm) to give a liquid product; viscosity: 505 poise (50.5 Pa-sec); theoretical olefin equivalent: 308. The physical state of the product changed to a solid upon standing at room temperature overnight.

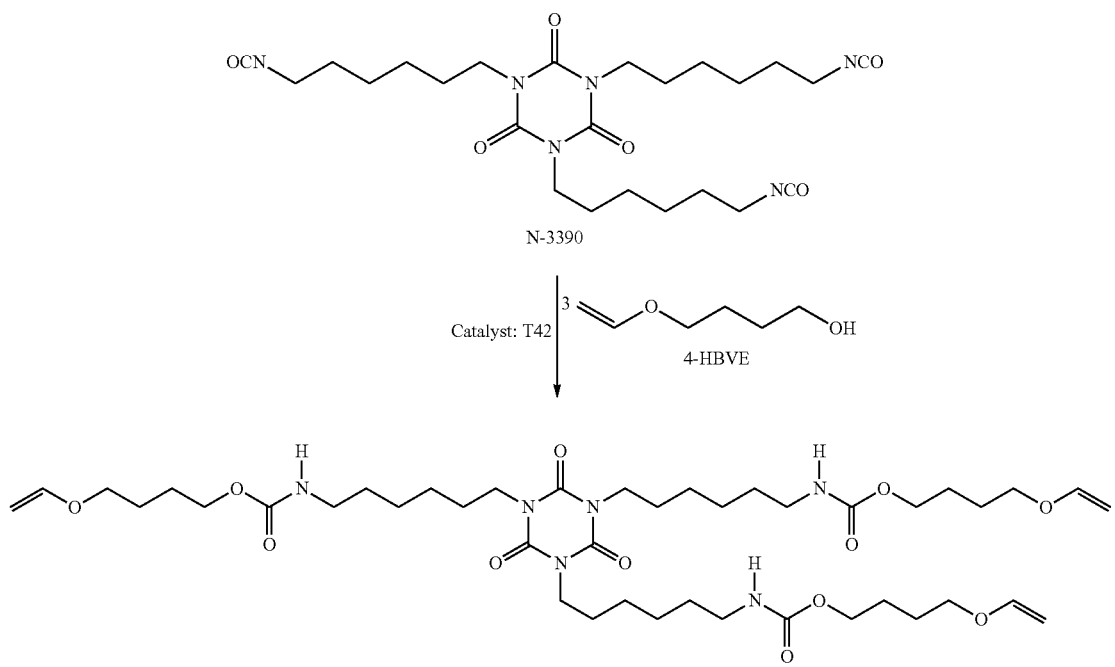

Example 3

Synthesis of Urethane-Containing Dithiol Prepolymer (1)

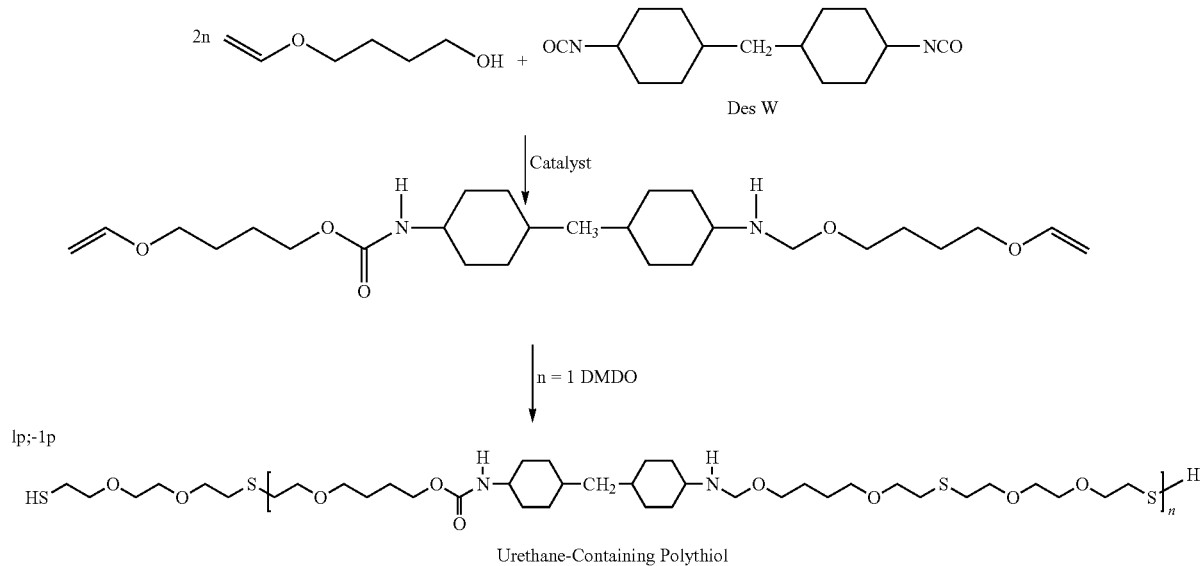

Urethane-Containing Polythiol

4-Hydroxybutyl vinyl ether (HBVE) (23.24 g; 0.2 equiv) was charged into a 100 mL 3-necked round bottomed flask. The flask was equipped with a temperature probe, a mechanical stirrer and a gas adapter. While stirring at 200 rpm the mixture was flushed with nitrogen. Dibutyltin dilaurate catalyst (0.052 g of a 10% solution in methyl ethyl ketone) was added. Desmodur® W ($H_{12}$MDI) (26.30 g; 0.2 equiv) was slowly added over a period of 45 min; no significant exotherm was noticed during this period. After an hour of stirring, the reaction mixture became cloudy. After further stirring for 4 h, the reaction mixture became viscous white paste. The reaction mixture was heated at 70° C. for 3 h. The reaction of the hydroxyl group with the isocyanate was complete when the infrared spectra of an aliquot of the reaction mixture indicated that isocyanate peak had disappeared. The reaction mixture was cooled to 48° C. and 1,8-dimercapto-3,6-dioxaoctane (DMDO, 36.46 g, 0.4 equiv) was added. Heating the reaction mixture to 77° C. produced a clear liquid. Heating was continued at 77° C. and two portions of Vazo® 67 (2,2'-azobis(2-methylbutyronitrile, 0.044 g each) were added at an interval of 2 h to complete the reaction. The product was a clear liquid; equivalent weight: 438.

Example 4

Synthesis of Urethane-Containing Dithiol Prepolymer (2)

4-Hydroxybutyl vinyl ether (HBVE) (41.83 g, 0.36 equiv) was charged into a 250 mL, 3-necked round bottomed flask. The flask was equipped with a temperature probe, a mechanical stirrer and a gas adapter. Stirring was started at 100 rpm and the contents were flushed with nitrogen. Dibutyltin dilaurate catalyst (0.089 g of a 10% solution in methyl ethyl ketone) was added. The stirring rate was increased to 200 rpm. At 22° C., Desmodur® W (47.34 g; 0.36 equiv) was added over a period of 20 min. After stirring for 45 min the reaction mixture became cloudy and the temperature increased to 37° C. After another 45 min, the temperature increased to 47° C. and the reaction mixture was in form of a viscous white paste. The reaction mixture was allowed to cool to 43° C. and then heated at 70° C. to 73° C. for 2 h. The reaction of the hydroxyl with the isocyanate was complete when the infrared spectra on an aliquot of the reaction mixture indicated that the isocyanate peak had disappeared. The reaction mixture was cooled to 63° C. and DMDO (49.22 g, 0.54 equiv) was added. The temperature decreased to 40° C. during the next 35 min. The reaction mixture was then heated to 70° C. and two portions of Vazo® 67 (0.031 g each) were added at an interval of 2 h to complete the reaction. The reaction mixture was evacuated for 5 h (vacuum: 6 mm) to provide a viscous liquid product with an equivalent weight: 805.

Example 5

Synthesis of Hydroxyl-Functional Dithiol

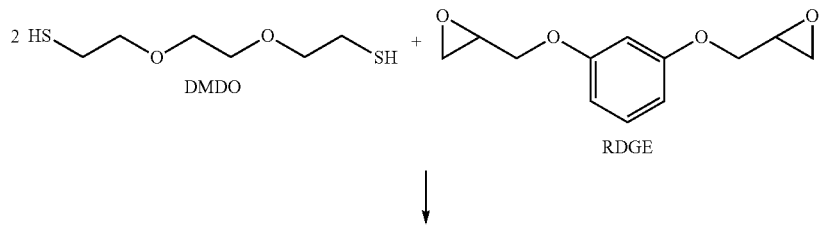

-continued

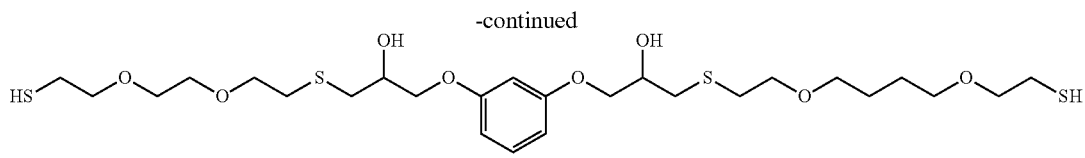

DMDO (40.11 g, 0.44 equiv.) and resorcinol diglycidyl ether (25.74 g, 0.22 equiv) were charged into a 100-mL, 3-necked round bottomed flask. The flask was equipped with a mechanical stirrer, a temperature probe and a gas adapter. The contents were flushed with nitrogen. While stirring at 200 rpm, the heterogeneous mixture was heated to 45° C. to produce a clear solution. The reaction mixture was allowed to cool to 21° C. and a base catalyst DABCO® 33-LV (1,4-diazabicyclo[2.2.]octane solution, 0.26 g; amount: 0.4%) was added. Within 3 min, a slow rise in temperature was noticed. After an additional 7 min, the temperature had reached 50° C. The reaction mixture was allowed to cool to 28° C. and then heated at 70° C. to 72° C. for 4 h to provide a liquid dithiol with an equivalent weight and viscosity of 293 and 44 poise (4.4 Pa-sec), respectively.

Example 6

Sealant Formulation (1)

The urethane-containing dithiol prepolymer (1) of Example 3 (10.99 g, 0.0251 equiv) and the urethane-containing dialkenyl prepolymer of Example 1 (19.25 g, 0.0251 equiv) were charged into a Hauschild mixing cup (size: 60 g) and mixed in a Hauschild mixer for 4 min. The contents were hand-mixed and mixed further in a Hauschild mixer for 4 min until the contents became clear. UV catalyst (0.9 g of a 10% solution of 4:1 weight-mix of Irgacure® 651 (2,2-dimethoxy-1,2-diphenylethan-1-one) and Darocur® TPO (2,4,6-trimethylbenzoyl-diphenyl-phosphine oxide) in ethyl acetate) was added into the clear mix. The contents were hand-mixed and mixed further in a Hauschild mixer for 4 min. A flow-out was made by pouring the mixture inside a 6.1-in×2-in×0.13-in metal-grid and cured by exposing to UV (cure condition: 2×1 min @ 7-inch (17.8 cm) height). The cured specimen had a hardness of Shore 38A, a tensile strength of 639 psi (4.4 MPa), and an elongation of 699%.

Example 7

Sealant Formulation (2)

The urethane-containing dithiol prepolymer (2) of Example 4 (9.66 g, 0.012 equiv) and the urethane-containing dialkenyl prepolymer of Example 1 (9.20 g, 0.012 equiv) were charged into a Hauschild mixing cup (size: 60 g) and mixed in a Hauschild mixer for 4 min. The contents were hand-mixed and mixed further in a Hauschild mixer for 4 min. UV catalyst (0.56 g of a 10% solution of 4:1 weight-mix of Irgacure® 651 and Darocur® TPO in ethyl acetate) was added into the clear mixture. The contents were hand-mixed and mixed further in a Hauschild mixer for 4 min. A flow-out was made by pouring the mixture inside a 6.1-in×2-in×0.13-in metal-grid and cured by exposing to UV (cure condition: 2×1 min at 7-inch (17.8 cm) height, 395 nm, 4 W UV LED lamp for 30 sec to 45 sec). The cured specimen had a hardness of Shore 38A, a tensile strength of 782 psi (5.39 MPa), and an elongation of 916%.

Example 8

Sealant Formulation (3)

The urethane-containing dialkenyl prepolymer of Example 1 (9.97 g, 0.013 equiv), urethane-containing dithiol prepolymer of Example 4 (8.37 g, 0.0104 equiv) and the hydroxyl-functional dithiol of Example 5 (0.70 g, 0.0024 equiv) were charged into a Hauschild mixing cup (size: 60 g) and mixed in a Hauschild mixer for 4 min. The contents were hand-mixed and mixed further in Hauschild mixer for 4 min until the contents became clear. Catalyst (0.56 g of a 10% solution of 4:1 mix of Irgacure® 651 and Darocur® TPO in ethyl acetate) was added and the contents were hand-mixed, and mixed further in a Hauschild mixer for 4 min. A flow-out was made by pouring the mix inside a 6.1-in×2-in×0.13-in metal-grid and cured by exposing to UV (cure condition: 2×1 min at 7-inch height, 395 nm, 4 W UV LED lamp for 30 sec to 45 sec). The cured specimen had a hardness of Shore 40A, a tensile strength of 808 psi (5.57 MPa), and an elongation of 849%.

Example 9

Sealant Formulation (4)

The urethane-containing dialkenyl prepolymer of Example 1 (9.97 g, 0.013 equiv), the urethane-containing dithiol prepolymer (2) of Example 4 (8.37 g, 0.0104 equiv) and the hydroxyl-functional dithiol of Example 5 (0.70 g, 0.0024 equiv) were charged into a Hauschild mixing cup (size: 60 g) and mixed in Hauschild mixer 4 min. The contents were hand-mixed and mixed further in Hauschild mixer for 4 min until the contents became clear. Filler, Gasil® IJ35 (silica gel/synthetic amorphous silica, 0.020 g, amount: 1 wt %) was added, and the contents were mixed in a Hauschild mixer for 30 sec. The contents were hand-mixed and mixed further in a Hauschild mixer for 4 min. The contents were almost clear. UV catalyst (0.6 g of a 10% solution of 4:1 mix of Irgacure® 651 and Darocur® TPO in ethyl acetate) was added and the contents were hand-mixed and mixed further in a Hauschild mixer for 4 min. The contents were clear. A flow-out was made by pouring the mix inside a 6.1-in×2-in×0.13-in metal-grid and cured by exposing to UV (cure condition: 2×1 min at 7-in (17.8 cm) height, 395 nm, 4 W UV LED lamp for 30 sec to 45 sec). The cured specimen had a hardness of Shore 38A, a tensile strength of 997 psi (6.87 MPa), and an elongation of 949%.

Example 10

Sealant Formulation (5)

The urethane-containing dialkenyl prepolymer of Example 1 (9.20 g, 0.012 equiv) and the solid trifunctional polyalkenyl of Example 2 (0.93 g, 0.003 equiv) were charged into a Hauschild mixing cup (size: 60 g) and mixed in a Hauschild mixer for 30 sec and then for 4 min. The mixture was homogeneous and clear. The contents were mixed in a Hauschild mixer for another cycle of 4 min. The urethane-containing dithiol prepolymer (2) of Example 4 (9.66 g, 0.012 equiv) and the hydroxyl-functional dithiol of Example 5 (0.7 g, 0.0024 equiv) were added and mixed in a Hauschild mixer 4 min. The contents were hand-mixed and mixed further in a Hauschild mixer for 4 min. The contents remained clear. UV catalyst (0.61 g of a 10% solution of 4:1 mix of Irgacure® 651 and Darocur® TPO in ethyl acetate) was added and the contents were hand-mixed and mixed further in a Hauschild mixer for 4 min. The contents remained clear. A flow-out was made by pouring the mix inside a 6.1-in×2-in×0.13-in metal-grid and cured by exposing to UV (cure condition: 2×1 min at 7-inch (17.8 cm) height). The cured specimen had a hardness of Shore 48A, a tensile strength of 996 psi (6.87 MPa), and an elongation of 672%.

Example 11

Sealant Formulation (6)

The urethane-containing dialkenyl prepolymer of Example 1 (9.20 g, 0.012 equiv) and the solid trifunctional polyalkenyl of Example 2 (0.93 g, 0.003 equiv) were charged into a Hauschild mixing cup (size: 60 g) and mixed in a Hauschild mixer for two cycles of 4 min each. The mixture was homogeneous and clear. The urethane-containing dithiol prepolymer (2) of Example 4 (9.66 g, 0.012 equiv.) and the hydroxyl-functional dithiol of Example 5 (0.7 g, 0.0024 equiv) were added and mixed in Hauschild mixer 4 min. The contents were hand-mixed and mixed further in a Hauschild mixer for 4 min. The contents remained clear. Cab-O-Sil® M5 (fumed silica, 1.02 g, amount: 5 wt %) was added and mixed in a Hauschild mixer for 30 sec at which time the contents were milky. The contents were hand-mixed and mixed further in a Hauschild mixer for 4 min. The contents became clear. UV catalyst (0.61 g of a 10% solution of 4:1 mix of Irgacure® 651 and Darocur® TPO in ethyl acetate) was added and the contents were hand-mixed, mixed further in a Hauschild mixer for 4 min. The contents remained clear. A flow-out was made by pouring the mixture inside a 6.1-in×2-in×0.13-in metal-grid and cured by exposing to UV (cure condition: 2×1 min at 7-inch (17.8 cm) height, 395 nm, 4 W UV LED lamp for 30 sec to 45 sec). The cured specimen had a hardness of Shore 52A, a tensile strength of 1,565 psi (10.79 MPa), and an elongation of 665%.

The compositions and properties for the cured sealants of Examples 6-11 are summarized in Table 1.

TABLE 1

Properties of cured sealants.

| Sealant | Urethane-containing Difunctional Polyalkenyl Prepolymer (Example) | Urethane-containing Trifunctional Polyalkenyl (Example) | Urethane-containing Dithiol Prepolymer (Example) | Hydroxyl-functional Dithiol (Example) | Hardness (Shore A) | Tensile Strength (psi) | Elongation (%) |
|---|---|---|---|---|---|---|---|
| Ex. 6 | 1 | — | 3 | — | 36 | 639 | 916 |
| Ex. 7 | 1 | — | 4 | — | 38 | 782 | 916 |
| Ex. 8 | 1 | — | 4 | 5 | 40 | 808 | 849 |
| Ex. 9* | 1 | — | 4 | 5 | 38 | 997 | 949 |
| Ex. 10 | 1 | 2 | 4 | 5 | 48 | 996 | 672 |
| Ex. 11** | 1 | 2 | 4 | 5 | 52 | 1,565 | 665 |
| Target | | | | | >35 | >600§ | >600 |

*Sealant 9 included 1 wt % silica gel/synthetic amorphous silica.
**Sealant 11 included 5 wt % untreated fumed silica filler.
§Preferred target tensile strength >700 psi.

A list of the instruments used in the examples is provided in Table 2.

TABLE 2

Equipment used.

| Measurement | Model/Manufacturer |
|---|---|
| Viscosity | Brookfield Cap 2000 |
| Hauschild Speed Mixer | Speed Mixer DAC 600 FVZ |
| Hardness Gauge | Model 1700 |
| | (Rex Gauge Co.) |
| Tensile Machine | Instron 3369 |
| Extensometer | Instron 3369 |
| UV Source | 395 nm, 4 W UV LED lamp |

Example 12

Sprayable Sealant Composition

A sprayable sealant was prepared by combing Parts A and B.

The composition of Part B is provided in Table 3.

TABLE 3

Part B components.

| Component | Product | Amount (wt %) |
|---|---|---|
| Prepolymer | Adiprene ® L-167 terminated with HBVE (Example 1) | 86.39 |
| Hydrophobic fumed silica | Aerosil ® R202 | 1.19 |
| Hydrophilic fumed silica | Cab-O-sil ® M5 | 1.42 |
| Solvent | Methyl ethyl ketone | 10.27 |
| Adhesion promoter | Laromer ® LR9000 | 0.72 |

TABLE 4

Part A components.

| Component | Product | Amount (wt %) |
|---|---|---|
| Polythiol | Thiocure ® TEMPIC | 76.07 |
| Hydrophilic fumed silica | Cab-O-sil ® M5 | 1.44 |
| Solvent | Methyl ethyl ketone | 3.09 |
| Surfactant, defoamer | BYK ®-1794 | 4.75 |
| Antioxidant | Agerite ® Superlite ® | 8.14 |
| UV Photoinitiator | Irgacure ® TPO | 6.51 |

To prepare Part B, 13,860 g of the urethane-containing polyalkenyl prepolymer of Example 1 was charged to a Myers 5 gallon (18.9 L) mixer and stirred at 50 rpm for 10 min. Aerosil® R202 hydrophobic fumed silica (190.8 g, Evonik Corp.) was added and combined with a sweeping blade at 20 rpm and a shearing blade at 800 rpm for 5 min. Cab-O-sil® M5 hydrophilic fumed silica (228.6 g, Cabot Corp.) was added and combined with a sweeping blade at 20 rpm, and a shearing blade at 800 rpm for 5 min. The mixture was then mixed with a sweeping blade at 50 rpm and the shearing blade at 1,000 rpm for 15 min, and the process was repeated until the grind was less than 8+ Hegman units. Methyl ethyl ketone (MEK, 1,648 g) which had been dried with molecular sieves was then added and combined with a sweeping blade at 20 rpm for 1 h while cooling until the temperature was below 32° C. (90° F.). Laromer® LR9000 (115.2 g, BASF) was added and combined with the sweeping blade at 20 rpm for 10 min while cooling. The amount of MEK was adjusted to 8.6 wt % either by mixing under a vacuum or by adding MEK until the volatile organic content (VOC) was 8.6±0.2%.

Part A was prepared by charging 12,105 g of Thiocure® TEMPIC (tris[2-(3-mercaptoproionyloxy)ethyl]isocyanurate) to a Myers 5 gallon (18.9 L) mixer and stirred with a sweeping blade at 50 rpm for 10 min. Cab-O-sil® M5 (228.6 g, Cabot Corp.) was combined with the polythiol in 10 increments with mixing with the sweeping blade at 20 rpm and the shearing blade at 800 rpm for 5 min. The mixture was mixed with a sweeping blade at 50 rpm and the shearing blade at 1,000 rpm for 15 min, and the process was repeated until the grind was less than 8+ Hegman units. Twenty-five (25) weight percent of the total dried MEK (492 g total) was combined with the sweeping blade at 20 rpm for 1 h while cooling until the temperature of the mixture was below 32° C. (90° F.). BYK®-1794 (756 g, Palmer Holland) was added and combined with the sweeping blade at 50 rpm for 5 min while cooling. Agerite® Superlite® antioxidant (1,296 g, liquid, polybutylated bisphenol A on an inert carrier, Vanderbilt Chemicals, LLC) was added and combined with the sweeping blade at 50 rpm for 5 min while cooling. Irgacure® TPO (1,036 g in a 1:1 by weight solution in dried MEK) was added and combined with the sweeping blade at 50 rpm for 5 min while cooling. The remaining MEK (687 g) was added and combined while cooling. The VOC was adjusted to 10.9±0.2 wt %.

To prepare sealant, 50 g of Part B was added to a 200 g dark Hauschild cup. Part A (15.4 g), was added to the Hauschild cup and hand mixed. MEK (12.32 g) was added and hand mixed until evenly combined. The mixture was blended using the Hauschild mixer for 2 mixing cycles at 1,000 rpm for 30 sec/1,500 rpm for 30 sec/2,000 rpm for 30 sec, each.

Test specimens were prepared by spraying or brushing the sealant to a thickness of 15 mils to 20 mils (0.38 mm to 0.51 mm) on a substrate. For draw-down samples, the material was poured from the cup onto a polyethylene sheet with an applied mold release and spread evenly using draw bar to provide a sheet thickness of 15 mils to 20 mils (0.38 mm to 0.51 mm). Samples were cured using a 395 nm, 4 W UV LED lamp at a distance of 3 inches (7.62 cm) for 30 sec to 45 sec. The sealant a viscosity of 20 poise (2 Pa-sec).

Adhesion was evaluated by manually peeling from the substrate. There was no adhesive failure to substrates coated with an epoxy primer and to 1776M Class B substrates. There was also no loss of adhesion to these surfaces following immersion of the samples in JRF Type III for 168 h at 120° F. (49° C.) (ASTM D471) or in distilled water for 168 h at 120° F. (49° C.).

Tensile strength and elongation of the samples 20 hours post-cure were determined according to ASTM D412 and the results are presented in Table 4.

TABLE 4

Tensile strength and elongation of cured sealant.

| | Tensile Strength psi | Elongation % |
|---|---|---|
| Initial | 2,857 | 554 |
| 168 h at 200° F. (93° C.) | 1,706 | 427 |
| 24 h at 200° F. (93° C.) | 1,952 | 452 |

Aspects of the Invention

According to an aspect of the present invention, compositions comprise (a) a polythiol; and (b) a polyalkenyl, wherein the polyalkenyl comprises: a urethane-containing polyalkenyl prepolymer; a urea-containing polyalkenyl prepolymer; or a combination thereof.

According to any of the preceding aspects, the polythiol comprises: a urethane-containing polythiol; a urea-containing polythiol; a polythiol that does not contain a urethane or urea group; or a combination of any of the foregoing.

According to any of the preceding aspects, the polythiol comprises a dithiol.

According to any of the preceding aspects, the polythiol comprises: a urethane-containing dithiol; a urea-containing dithiol; a dithiol that does not contain a urethane or urea group; or a combination of any of the foregoing.

According to any of the preceding aspects, the polythiol comprises a polythiol having a thiol functionality from 3 to 6.

According to any of the preceding aspects, the polythiol comprises: a urethane-containing polythiol having a thiol functionality from 3 to 6; a urea-containing polythiol having a thiol functionality from 3 to 6; a polythiol having a thiol functionality from 3 to 6 that does not contain a urethane or urea group; or a combination of any of the foregoing.

According to any of the preceding aspects, the polythiol comprises a dithiol; and a polythiol having a thiol functionality from 3 to 6.

According to any of the preceding aspects, the polythiol comprises a dithiol, wherein the dithiol comprises: a urethane-containing dithiol; a urea-containing dithiol; a dithiol that does not contain a urethane or urea group; or a combination of any of the foregoing; and a polythiol having a thiol functionality from 3 to 6, wherein the polythiol having a thiol functionality from 3 to 6 comprises: a urethane-containing polythiol having a thiol functionality from 3 to 6; a urea-containing polythiol having a thiol functionality from 3 to 6; a polythiol having a thiol functionality from 3 to 6 that does not contain a urethane or urea group; or a combination of any of the foregoing.

According to any of the preceding aspects, the polythiol comprises a hydroxyl-containing polythiol.

According to any of the preceding aspects, the polythiol comprises a hydroxyl-containing dithiol; a hydroxyl-containing polythiol having a thiol functionality from 3 to 6; or a combination thereof.

According to any of the preceding aspects, the polythiol comprises a hydroxyl-containing polythiol having the structure of Formula (5a), a hydroxyl-containing polythiol having the structure of Formula (5b), or a combination thereof:

wherein,
$R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $-[-(CHR^3)_p-X-]_q-(CHR^3)_r-$; wherein,
each $R^3$ independently comprises hydrogen and methyl;
each X independently comprises $-O-$, $-S-$, $-NH-$, or $-N(-CH_3)-$;
p is an integer from 2 to 6;
q is an integer from 1 to 5; and
r is an integer from 2 to 10;
$R^4$ comprises substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl, wherein $R^4$ comprises at least one hydroxyl group;
B represents a core of a z-valent, polyfunctionalizing agent $B(-V)_z$ wherein,
z is an integer from 3 to 6; and
each V is a moiety comprising a terminal group reactive with a thiol group; and
each $-V'-$ is derived from the reaction of $-V$ with a thiol and comprises at least one hydroxyl group.

According to any of the preceding aspects, $R^1$ is $-(CH_2)_2-O-(CH_2)_2-O-(CH_2)_2-$; and $R^4$ is

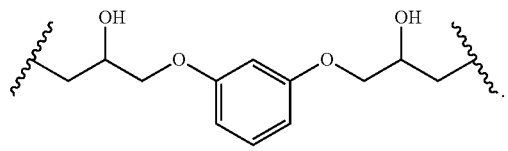 [SMILES: *CC(O)COc1cccc(OCC(O)C*)c1]

According to any of the preceding aspects, the polythiol comprises a dithiol and a hydroxyl-containing dithiol; and the composition comprises from 2 equivalents to 6 equivalents of the dithiol to one equivalents of the hydroxyl-containing dithiol.

According to any of the preceding aspects, the polythiol comprises a dithiol and a hydroxyl-containing dithiol; the composition comprises from 2 equivalents to 6 equivalents of the dithiol to one equivalents of the hydroxyl-containing dithiol; the polyalkenyl comprises a difunctional urethane/urea-containing polyalkenyl prepolymer and a polyalkenyl having an alkenyl functionality from 3 to 6; and the composition comprises from 2 equivalents to 6 equivalents of the difunctional urethane/urea-containing polyalkenyl prepolymer to one equivalents of the polyalkenyl having an alkenyl functionality from 3 to 6.

According to any of the preceding aspects, the urethane-containing polyalkenyl prepolymer comprises a difunctional urethane-containing polyalkenyl prepolymer; a difunctional urea-containing polyalkenyl prepolymer; or a combination thereof.

According to any of the preceding aspects, the polyalkenyl comprises a urethane-containing polyalkenyl having an alkenyl functionality from 3 to 6; a urea-containing polyalkenyl having an alkenyl functionality from 3 to 6; or a combination thereof.

According to any of the preceding aspects, the polyalkenyl comprises a difunctional urethane-containing polyalkenyl prepolymer; a difunctional urea-containing polyalkenyl prepolymer; a urethane-containing polyalkenyl having an alkenyl functionality from 3 to 6; a urea-containing polyalkenyl having an alkenyl functionality from 3 to 6; or a combination t of any of the foregoing.

According to any of the preceding aspects, the polythiol and the urethane/urea-containing polyalkenyl prepolymer are characterized by a molecular weight from 800 Daltons to 3,000 Daltons.

According to any of the preceding aspects, the polyalkenyl comprises a difunctional polyalkenyl prepolymer comprising a difunctional urethane-containing polyalkenyl prepolymer, a difunctional urea-containing polyalkenyl prepolymer, or a combination thereof; and a trifunctional polyalkenyl comprising a trifunctional urethane-containing polyalkenyl, a trifunctional urea-containing polyalkenyl, or a combination thereof; wherein the composition comprises from 2 equivalents to 6 equivalents of the difunctional urethane/urea-containing polyalkenyl prepolymer to one equivalents of the trifunctional polyalkenyl.

According to any of the preceding aspects, the polyalkenyl comprises: a difunctional polyalkenyl prepolymer comprising a difunctional urethane-containing polyalkenyl prepolymer, a difunctional urea-containing polyalkenyl prepolymer, or a combination thereof, and a tetrafunctional polyalkenyl comprising a tetrafunctional urethane-containing polyalkenyl, a tetrafunctional urea-containing polyalkenyl, or a combination thereof, wherein the composition comprises from 2 equivalents to 6 equivalents of the difunctional urethane/urea-containing alkenyl-terminated prepolymer to one equivalents of the tetrafunctional alkenyl-terminated.

According to any of the preceding aspects, the difunctional urethane/urea-containing polyalkenyl prepolymer comprises a difunctional urethane-containing prepolymer having the structure of Formula (6a), a difunctional urea-containing prepolymer having the structure of Formula (6b) or a combination thereof:

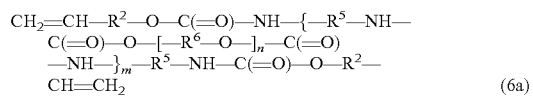

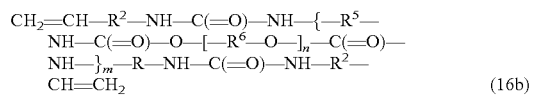

wherein,
m is an integer from 1 to 1 to 20;
n is an integer from 1 to 1 to 20;
each $R^2$ is independently comprises $C_{2-10}$ alkanediyl, substituted $C_{2-10}$ alkanediyl, $C_{2-10}$ heteroalkanediyl, or substituted $C_{2-10}$ heteroalkanediyl;
each $R^5$ comprises substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl; and each $R^6$ independently comprises $C_{2-10}$ alkanediyl, substituted $C_{2-10}$ alkanediyl, $C_{2-10}$ heteroalkanediyl, or substituted $C_{2-10}$ heteroalkanediyl.

According to any of the preceding aspects, n is an integer from 1 to 5; m is an integer from 1 to 5; $R^2$ is —$(CH_2)_4$—O—$(CH_2)_2$—;

$R^5$ is

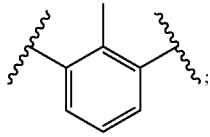 [SMILES: *c1cccc(*)c1C]

and $R^6$ comprises —$(CH_2)_4$—O—, —[—$(CH_2)_4$—]$_{0.6}$—[—$CH_2$—$CH(—CH_2—CH_3)]_{0.2}$—[—$(CH_2)_4$—]$_{0.2}$—, or —$(CH_2)_5$—$CH(—OH)$—.

According to any of the preceding aspects, the polythiol comprises a dithiol having the structure of Formula (2a), a dithiol having the structure of Formula (2b), or a combination thereof:

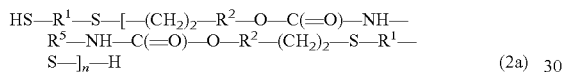 (2a)

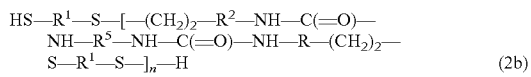 (2b)

wherein, n is an integer from 1 to 1 to 20;

$R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or —[—$(CHR^3)_p$—X—]$_q$—$(CHR^3)_r$—; wherein, each $R^3$ independently comprises hydrogen or methyl;

each X independently comprises —O—, —S—, —NH—, or —N(—$CH_3$)—;

p is an integer from 2 to 6;

q is an integer from 1 to 5; and r is an integer from 2 to 10;

each $R^2$ independently comprises $C_{3-10}$ alkanediyl, substituted $C_{3-10}$ alkanediyl, $C_{3-10}$ heteroalkanediyl, or substituted $C_{3-10}$ heteroalkanediyl; and each $R^5$ independently comprises substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl.

According to any of the preceding aspects, n is an integer from 1 to 5; $R^1$ is —$(CH_2)_2$—O—$(CH_2)_2$—O—$(CH_2)_2$—; $R^2$ is —$(CH_2)_4$—O—$(CH_2)_2$—; and $R^3$ comprises:

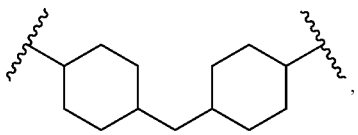

-continued

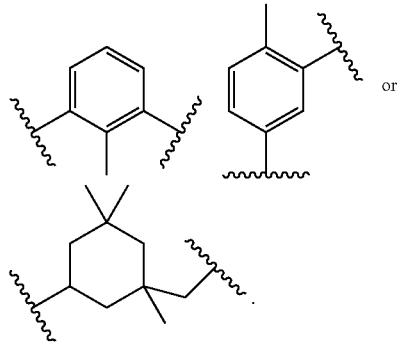

According to any of the preceding aspects, the polyalkenyl comprises a urethane-containing polyalkenyl having the structure of Formula (8a), a urea-containing polyalkenyl having the structure of Formula (8b), or a combination thereof:

B{—$R^7$—NH—C(=O)—O—$R^2$—CH=$CH_2$}$_z$ (8a)

B{—$R^7$—NH—C(=O)—NH—$R^2$—CH=$CH_2$}$_z$ (8b)

wherein, $R^2$ comprises $C_{2-10}$ alkanediyl, substituted $C_{2-10}$ alkanediyl, $C_{2-10}$ heteroalkanediyl, or substituted $C_{2-10}$ heteroalkanediyl;

$R^7$ comprises $C_{2-10}$ alkanediyl, substituted $C_{2-10}$ alkanediyl, $C_{2-10}$ heteroalkanediyl, or substituted $C_{2-10}$ heteroalkanediyl; and B represents a core of a z-valent, polyfunctionalizing agent B(—V)$_z$ wherein, z is an integer from 3 to 6; and each —V comprises —$R^7$—N=C=O.

According to any of the preceding aspects, z is 3; $R^2$ is —$(CH_2)_4$—O—; $R^7$ is —$(CH_2)_6$—; and B is

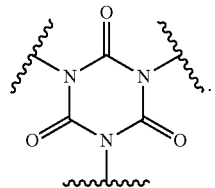 [SMILES: *n1c(=O)n(*)c(=O)n(*)c1=O]

According to any of the preceding aspects, the polythiol comprises a polythiol having the structure of Formula (4a), a polythiol having the structure of Formula (4b), or a combination thereof:

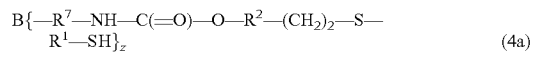 (4a)

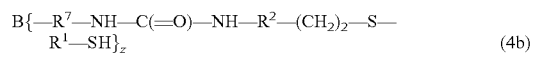 (4b)

wherein, $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or —[—$(CHR^3)_p$—X—]$_q$—$(CHR^3)_r$—; wherein, each $R^3$ independently comprises hydrogen or methyl;

each X is independently comprises —O—, —S—, —NH—, or —N(—$CH_3$)—;

p is an integer from 2 to 6;

q is an integer from 1 to 5; and r is an integer from 2 to 10;

$R^2$ independently comprises $C_{2-10}$ alkanediyl, substituted $C_{2-10}$ alkanediyl, $C_{2-10}$ heteroalkanediyl, or substituted $C_{2-10}$ heteroalkanediyl;

$R^7$ comprises $C_{2-10}$ alkanediyl, substituted $C_{2-10}$ alkanediyl, $C_{2-10}$ heteroalkanediyl, or substituted $C_{2-10}$ heteroalkanediyl; and B represents a core of a z-valent, polyfunctionalizing agent $B(\text{—V})_z$ wherein, z is an integer from 3 to 6; and each —V comprises —$R^7$—N═C═O.

According to any of the preceding aspects, the polythiol comprises a dithiol having the structure of Formula (1a), a polythiol having the structure of Formula (1b), or a combination thereof:

HS—$R^1$—SH  (1a)

B{—V'—S—$R^1$—SH}$_z$  (1b)

wherein, $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or —[—(CHR$^3$)$_p$—X—]$_q$—(CHR$^3$)$_r$—; wherein, each $R^3$ independently comprises hydrogen or methyl;

each X independently comprises —O—, —S—, —NH—, or —N(—CH$_3$)—;

p is an integer from 2 to 6;

q is an integer from 1 to 5; and r is an integer from 2 to 10;

B represents a core of a z-valent, polyfunctionalizing agent $B(\text{—V})_z$ wherein, z is an integer from 3 to 6; and each —V is a moiety comprising a terminal group reactive with a thiol group; and each —V'— is derived from the reaction of —V with a thiol.

According to any of the preceding aspects, $R^1$ is —(CH$_2$)$_2$—O—(CH$_2$)$_2$—O—(CH$_2$)$_2$—.

According to any of the preceding aspects, the polythiol comprises tris[2-(3-mercaptopropionyloxy)ethyl] (TEMPIC).

According to any of the preceding aspects, the composition comprises a pigment.

According to any of the preceding aspects, the composition further comprises a UV photoinitiator.

According to any of the preceding aspects, the composition is formulated as a sealant.

According to any of the preceding aspects, the composition is sprayable.

According to any of the preceding aspects, the composition exhibits a viscosity from 10 poise to 200 poise, determined using a Brookfield viscometer.

According to any of the preceding aspects, the composition is substantially solvent free.

In an aspect of the invention, cured compositions prepared from a composition according to any of the preceding aspects are provided.

According to any of the preceding aspects, the cured composition exhibits one or more of the following: a minimum load of at least 9 lbf; a tensile stress of at least 700 psi at a maximum load; a tensile strain of at least 600%; at the maximum load; and a hardness of at least 35 Shore; wherein the load, tensile stress, and tensile strain are determined according to ASTM D412, and the hardness is determined according to ASTM D2240.

According to any of the preceding aspects, the cured composition is optically transparent.

According to an aspect of the present invention, a difunctional polythiol comprises a urethane-containing dithiol having the structure of Formula (2a), a urea-containing dithiol of Formula (2b), or a combination thereof:

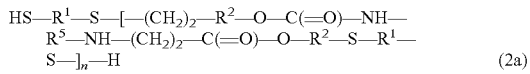
HS—$R^1$—S—[—(CH$_2$)$_2$—$R^2$—O—C(═O)—NH—$R^5$—NH—(CH$_2$)$_2$—C(═O)—O—$R^2$—S—$R^1$—S—]$_n$—H  (2a)

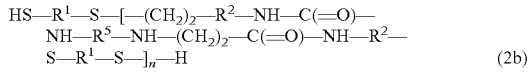
HS—$R^1$—S—[—(CH$_2$)$_2$—$R^2$—NH—C(═O)—NH—$R^5$—NH—(CH$_2$)$_2$—C(═O)—NH—$R^2$—S—$R^1$—S—]$_n$—H  (2b)

wherein, n is an integer from 1 to 20;

$R^1$ comprises $C_{2-10}$ alkanediyl, $C_{6-8}$ cycloalkanediyl, $C_{6-10}$ alkanecycloalkanediyl, $C_{5-8}$ heterocycloalkanediyl, or —[—(CHR$^3$)$_p$—X—]$_q$—(CHR$^3$)$_r$—;

wherein, each $R^3$ independently comprises hydrogen or methyl;

each X independently comprises —O—, —S—, —NH—, or —N(—CH$_3$)—;

p is an integer from 2 to 6;

q is an integer from 1 to 5; and r is an integer from 2 to 10;

each $R^2$ independently comprises $C_{3-10}$ alkanediyl, substituted $C_{3-10}$ alkanediyl, $C_{3-10}$ heteroalkanediyl, or substituted $C_{3-10}$ heteroalkanediyl; and each $R^5$ independently comprises substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl.

According to an aspect of the present invention, a urethane/urea-containing polythiol comprises a urethane-containing polythiol having the structure of Formula (4a), a urea-containing polythiol having the structure of Formula (4b), or a combination thereof:

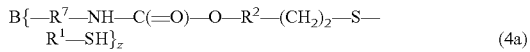
B{—$R^7$—NH—C(═O)—O—$R^2$—(CH$_2$)$_2$—S—$R^1$—SH}$_z$  (4a)

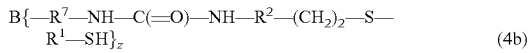
B{—$R^7$—NH—C(═O)—NH—$R^2$—(CH$_2$)$_2$—S—$R^1$—SH}$_z$  (4b)

wherein, $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or —[—(CHR$^3$)$_p$—X—]$_q$—(CHR$^3$)$_r$—; wherein, each $R^3$ independently comprises hydrogen or methyl;

each X independently comprises —O—, —S—, —NH—, or —N(—CH$_3$)—;

p is an integer from 2 to 6;

q is an integer from 1 to 5; and r is an integer from 2 to 10;

$R^2$ independently comprises $C_{2-10}$ alkanediyl, substituted $C_{2-10}$ alkanediyl, $C_{2-10}$ heteroalkanediyl, or substituted $C_{2-10}$ heteroalkanediyl;

B represents a core of a z-valent, polyfunctionalizing agent $B(\text{—V})_z$ wherein, z is an integer from 3 to 6;

each —V comprises —$R^7$—N═C═O; and $R^7$ comprises $C_{2-10}$ alkanediyl, substituted $C_{2-10}$ alkanediyl, $C_{2-10}$ heteroalkanediyl, or substituted $C_{2-10}$ heteroalkanediyl; and each —V'— is derived from the reaction of —V with a hydroxyl group or an amino group.

According to an aspect of the present invention, a urethane/urea-containing polythiol comprises a urethane/urea-containing polythiol having the structure of Formula (4c), a urea-containing polythiol having the structure of Formula (4d), or a combination thereof:

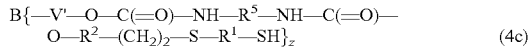
$$B\{-V'-O-C(=O)-NH-R^5-NH-C(=O)-O-R^2-(CH_2)_2-S-R^1-SH\}_z \quad (4c)$$

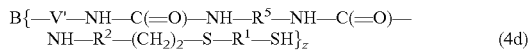
$$B\{-V'-NH-C(=O)-NH-R^5-NH-C(=O)-NH-R^2-(CH_2)_2-S-R^1-SH\}_z \quad (4d)$$

wherein, $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $-[-(CHR^3)_p-X-]_q-(CHR^3)_r-$; wherein, each $R^3$ independently comprises hydrogen or methyl;

each X independently comprises $-O-$, $-S-$, $-NH-$, or $-N(-CH_3)-$;

p is an integer from 2 to 6;

q is an integer from 1 to 5; and r is an integer from 2 to 10;

$R^2$ independently comprises $C_{2-10}$ alkanediyl, substituted $C_{2-10}$ alkanediyl, $C_{2-10}$ heteroalkanediyl, or substituted $C_{2-10}$ heteroalkanediyl;

each $R^5$ independently comprises substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl;

B represents a core of a z-valent, polyfunctionalizing agent $B(-V)_z$ wherein, z is an integer from 3 to 6; and each $-V$ is a moiety comprising a terminal group reactive with an isocyanate group; and each $-V'-$ is derived from the reaction of $-V$ with a terminal group reactive with an isocyanate group.

According to an aspect of the present invention, a hydroxyl-containing polythiol comprises a hydroxyl-containing polythiol having the structure of Formula (5a), a hydroxyl-containing polythiol having the structure of Formula (5b), a hydroxyl-containing polythiol having the structure of Formula (5c), or a combination of any of the foregoing:

$$HS-R^1-S-R^4-S-R^1-SH \quad (5a)$$

$$B\{-V'-S-R^1-SH\}_z \quad (5b)$$

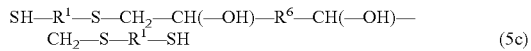
$$SH-R^1-S-CH_2-CH(-OH)-R^6-CH(-OH)-CH_2-S-R^1-SH \quad (5c)$$

wherein, $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $-[-(CHR^3)_p-X-]_q-(CHR^3)_r-$; wherein, each $R^3$ independently comprises hydrogen and methyl;

each X independently comprises $-O-$, $-S-$, $-NH-$, or $-N(-CH_3)-$;

p is an integer from 2 to 6;

q is an integer from 1 to 5; and r is an integer from 2 to 10;

$R^4$ can comprise substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, $C_{7-20}$ alkanearenediyl, or substituted $C_{7-20}$ heteroalkanearenediyl, wherein $R^4$ comprises at least one hydroxyl group;

$R^6$ can comprise substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, $C_{7-20}$ alkanearenediyl, or substituted $C_{7-20}$ heteroalkanearenediyl, B represents a core of a z-valent, polyfunctionalizing agent $B(-V)_z$ wherein, z is an integer from 3 to 6; and each V is a moiety comprising a terminal group reactive with a thiol group; and each $-V'-$ is derived from the reaction of $-V$ with a thiol and comprises at least one hydroxyl group.

According to an aspect of the present invention, a difunctional urethane/urea-containing polyalkenyl prepolymer comprises a urethane-containing polyalkenyl prepolymer having the structure of Formula (6a), a urethane-containing polyalkenyl prepolymer having the structure of Formula (6b) or a combination thereof:

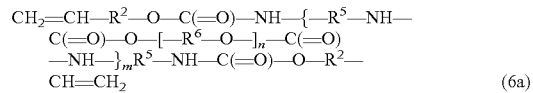
$$CH_2=CH-R^2-O-C(=O)-NH-\{-R^5-NH-C(=O)-O-[-R^6-O-]_n-C(=O)-NH-\}_m R^5-NH-C(=O)-O-R^2-CH=CH_2 \quad (6a)$$

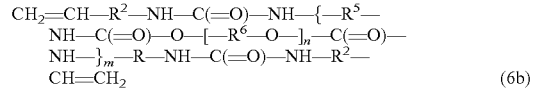
$$CH_2=CH-R^2-NH-C(=O)-NH-\{-R^5-NH-C(=O)-O-[-R^6-O-]_n-C(=O)-NH-\}_m-R-NH-C(=O)-NH-R^2-CH=CH_2 \quad (6b)$$

wherein, m is an integer from 1 to 1 to 20;

n is an integer from 1 to 1 to 20;

each $R^2$ independently comprises $C_{2-10}$ alkanediyl, substituted $C_{2-10}$ alkanediyl, $C_{2-10}$ heteroalkanediyl, or substituted $C_{2-10}$ heteroalkanediyl;

each $R^5$ comprises substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, or substituted $C_{6-20}$ heteroalkanecycloalkanediyl; and each $R^6$ independently comprises $C_{2-10}$ alkanediyl, substituted $C_{2-10}$ alkanediyl, $C_{2-10}$ heteroalkanediyl, or substituted $C_{2-10}$ heteroalkanediyl.

According to an aspect of the present invention, a urethane/urea-containing polyalkenyl adduct comprises a urethane-containing polyalkenyl adduct having the structure of Formula (8a), urea-containing polyalkenyl adduct having the structure of Formula (8b), or a combination thereof:

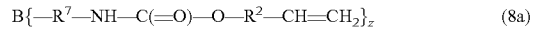
$$B\{-R^7-NH-C(=O)-O-R^2-CH=CH_2\}_z \quad (8a)$$

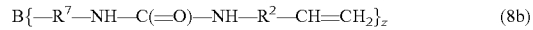
$$B\{-R^7-NH-C(=O)-NH-R^2-CH=CH_2\}_z \quad (8b)$$

wherein, $R^2$ comprises $C_{2-10}$ alkanediyl, substituted $C_{2-10}$ alkanediyl, $C_{2-10}$ heteroalkanediyl, or substituted $C_{2-10}$ heteroalkanediyl;

$R^7$ comprises $C_{2-10}$ alkanediyl, substituted $C_{2-10}$ alkanediyl, $C_{2-10}$ heteroalkanediyl, or substituted $C_{2-10}$ heteroalkanediyl; and B represents a core of a z-valent, polyfunctionalizing agent $B(-R^7-N=C=O)_z$ wherein z is an integer from 3 to 6.

According to an aspect of the present invention, a urethane/urea-containing polyalkenyl adduct comprises a urethane-containing polyalkenyl adduct having the structure of Formula (8c), a urea-containing polyalkenyl adduct having the structure of Formula (8d), or a combination thereof:

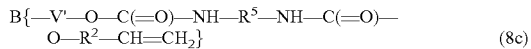  (8c)

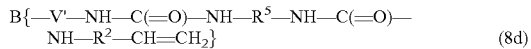  (8d)

wherein,

R² comprises $C_{2-10}$ alkanediyl, substituted $C_{2-10}$ alkanediyl, $C_{2-10}$ heteroalkanediyl, or substituted $C_{2-10}$ heteroalkanediyl;

R⁵ comprises $C_{2-10}$ alkanediyl, substituted $C_{2-10}$ alkanediyl, $C_{2-10}$ heteroalkanediyl, or substituted $C_{2-10}$ heteroalkanediyl; and B represents a core of a z-valent, polyfunctionalizing agent $B(-V)_z$ wherein, z is an integer from 3 to 6; and each —V comprises a moiety comprising a terminal group reactive with an isocyanate group; and —V'— is a moiety derived from the reaction of —V with an isocyanate group.

Aspect 1. A composition comprising a polythiol; and a polyalkenyl, wherein the polyalkenyl comprises a urethane-containing polyalkenyl prepolymer; a urea-containing polyalkenyl prepolymer; or a combination thereof.

Aspect 2. The composition of aspect 1, wherein the polythiol comprises: a urethane-containing polythiol; a urea-containing polythiol; a polythiol that does not contain a urethane group or urea group; or a combination of any of the foregoing.

Aspect 3. The composition of any one of aspects 1 to 2, wherein the polythiol comprises a dithiol.

Aspect 4. The composition of any one of aspects 1 to 2, wherein the polythiol comprises: a urethane-containing dithiol; a urea-containing dithiol; a dithiol that does not contain a urethane group or urea group; or a combination of any of the foregoing.

Aspect 5. The composition of any one of aspects 1 to 2, wherein the polythiol comprises a polythiol having a thiol functionality from 3 to 6.

Aspect 6. The composition of aspect 1, wherein the polythiol comprises: a urethane-containing polythiol having a thiol functionality from 3 to 6; a urea-containing polythiol having a thiol functionality from 3 to 6; a polythiol having a thiol functionality from 3 to 6 that does not contain a urethane group or urea group; or a combination of any of the foregoing.

Aspect 7. The composition of any one of aspects 1 to 6, wherein the polythiol comprises: a dithiol; and a polythiol having a thiol functionality from 3 to 6.

Aspect 8. The composition of aspect 7, wherein the polythiol comprises: a dithiol, wherein the dithiol comprises: a urethane-containing dithiol; a urea-containing dithiol; a dithiol that does not contain a urethane group or urea group; or a combination of any of the foregoing; and a polythiol having a thiol functionality from 3 to 6, wherein the polythiol having a thiol functionality from 3 to 6 comprises: a urethane-containing polythiol having a thiol functionality from 3 to 6; a urea-containing polythiol having a thiol functionality from 3 to 6; a polythiol having a thiol functionality from 3 to 6 that does not contain a urethane group or urea group; or a combination of any of the foregoing.

Aspect 9. The composition of any one of aspects 1 to 8, wherein the polythiol comprises a hydroxyl-functional polythiol.

Aspect 10. The composition of any one of aspects 1 to 9, wherein the polythiol comprises: a hydroxyl-functional dithiol; a hydroxyl-functional polythiol having a thiol functionality from 3 to 6; or a combination thereof.

Aspect 11. The composition of any one of aspects 1 to 10, wherein the polythiol comprises a hydroxyl-functional dithiol of Formula (5a), a hydroxyl-functional polythiol of Formula (5b), or a combination thereof:

  (5a)

  (5b)

wherein,

R¹ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;

wherein, each R³ is independently selected from hydrogen and methyl;

each X is independently selected from —O—, —S—, —NH—, and —N(—CH₃)—;

p is an integer from 2 to 6;

q is an integer from 1 to 5; and r is an integer from 2 to 10;

R⁴ is selected from substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, wherein R⁴ comprises at least one hydroxyl group;

B represents a core of a z-valent, polyfunctionalizing agent $B(-V)_z$ wherein, z is an integer from 3 to 6; and each V is a moiety comprising a terminal group reactive with a thiol group; and each —V'— is derived from the reaction of —V with a thiol and comprises at least one hydroxyl group.

Aspect 12. The composition of aspect 11, wherein,

R¹ is —(CH₂)₂—O—(CH₂)₂—O—(CH₂)₂—; and

R⁴ is

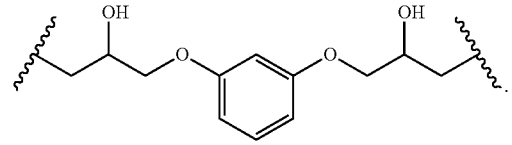 [SMILES: *CC(O)COc1cccc(OCC(O)C*)c1]

Aspect 13. The composition of any one of aspects 1 to 12, wherein the polythiol comprises a dithiol without a pendent hydroxyl group, and a hydroxyl-functional dithiol; and the composition comprises from 2 equivalents to 6 equivalents of the dithiol to one equivalents of the hydroxyl-functional dithiol.

Aspect 14. The composition of any one of aspects 1 to 13, wherein the polythiol comprises a dithiol without a pendent hydroxyl group, and a hydroxyl-functional dithiol; and the polyalkenyl comprises a difunctional urethane/urea-containing polyalkenyl prepolymer and a polyalkenyl having an alkenyl functionality from 3 to 6; and wherein the composition comprises from 2 equivalents to 6 equivalents of the difunctional urethane/urea-containing polyalkenyl prepolymer to one equivalents of the polyalkenyl having an alkenyl functionality from 3 to 6.

Aspect 15. The composition of aspect 14, wherein the composition comprises from 2 equivalents to 6 equivalents of the dithiol without a pendent hydroxyl group, to one equivalents of the hydroxyl-functional dithiol; and the composition comprises from 2 equivalents to 6 equivalents of the difunctional urethane/urea-containing polyalkenyl prepolymer to one equivalents of the polyalkenyl having an alkenyl functionality from 3 to 6.

Aspect 16. The composition of any one of aspects 1 to 15, wherein, the polyalkenyl comprises: a difunctional urethane-containing polyalkenyl prepolymer; a difunctional urea-containing polyalkenyl prepolymer; or a combination thereof.

Aspect 17. The composition of any one of aspects 1 to 16, wherein the polyalkenyl comprises: a urethane-containing polyalkenyl having an alkenyl functionality from 3 to 6; a urea-containing polyalkenyl having an alkenyl functionality from 3 to 6; or a combination thereof.

Aspect 18. The composition of any one of aspects 1 to 17, wherein the polyalkenyl comprises: a difunctional urethane-containing polyalkenyl prepolymer; a difunctional urea-containing polyalkenyl prepolymer; a urethane-containing polyalkenyl having an alkenyl functionality from 3 to 6; a urea-containing polyalkenyl having an alkenyl functionality from 3 to 6; or a combination of any of the foregoing.

Aspect 19. The composition of any one of aspects 1 to 18, wherein each of the polythiol and the urethane/urea-containing polyalkenyl prepolymer is characterized by a molecular weight from 800 Daltons to 3,000 Daltons.

Aspect 20. The composition of any one of aspects 1 to 19, wherein the polyalkenyl comprises: a difunctional polyalkenyl prepolymer comprising a difunctional urethane-containing polyalkenyl prepolymer, a difunctional urea-containing polyalkenyl prepolymer, or a combination thereof; and a trifunctional polyalkenyl comprising a trifunctional urethane-containing polyalkenyl, a trifunctional urea-containing polyalkenyl, or a combination thereof.

Aspect 21. The composition of aspect 20, wherein the composition comprises from 2 equivalents to 6 equivalents of the difunctional urethane/urea-containing polyalkenyl prepolymer to one equivalent of the trifunctional polyalkenyl.

Aspect 22. The composition of any one of aspects 1 to 22, wherein the polyalkenyl comprises: a difunctional polyalkenyl prepolymer comprising a difunctional urethane-containing polyalkenyl prepolymer, a difunctional urea-containing polyalkenyl prepolymer, or a combination thereof; and a tetrafunctional polyalkenyl comprising a tetrafunctional urethane-containing polyalkenyl, a tetrafunctional urea-containing polyalkenyl, or a combination thereof; wherein the composition comprises from 2 equivalents to 6 equivalents of the difunctional urethane/urea-containing polyalkenyl prepolymer to one equivalents of the tetrafunctional urethane/urea-containing polyalkenyl.

Aspect 23. The composition of any one of aspects 1 to 22, wherein the polyalkenyl comprises a difunctional urethane-containing polyalkenyl prepolymer of Formula (6a), a difunctional urea-containing polyalkenyl prepolymer of Formula (6b), or a combination thereof:

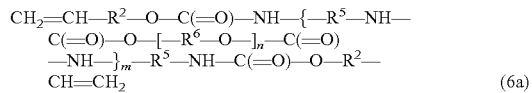

(6a)

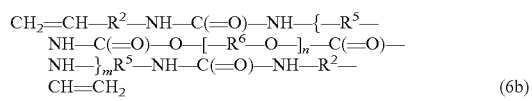

(6b)

wherein,
m is an integer from 1 to 20;
n is an integer from 1 to 20;
each $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;
each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl. substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and
each $R^6$ independently comprises $C_{2-10}$ alkanediyl, substituted $C_{2-10}$ alkanediyl, $C_{2-10}$ heteroalkanediyl, or substituted $C_{2-10}$ heteroalkanediyl.

Aspect 24. The composition of aspect 23, wherein,
n is an integer from 1 to 5;
m is an integer from 1 to 5;
$R^2$ is —(CH$_2$)$_4$—O—(CH$_2$)$_2$—;
$R^5$ is

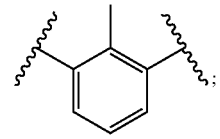

and
$R^6$ is selected from —(CH$_2$)$_4$—O—, —[—(CH$_2$)$_4$—]$_{0.6}$—[—CH$_2$—CH(—CH$_2$—CH$_3$]$_{0.2}$—[—(CH$_2$)$_4$—]$_{0.2}$—, and —(CH$_2$)$_5$—CH(—OH)—.

Aspect 25. The composition of any one of aspects 1 to 24, wherein the polythiol comprises a dithiol of Formula (2a), a dithiol of Formula (2b), or a combination thereof:

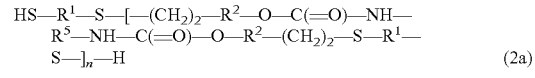

(2a)

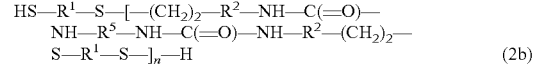

(2b)

wherein,
n is an integer from 1 to 20;
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_p$—X—]$_q$—(CHR$^3$)$_r$—;
wherein,
each $R^3$ is independently selected from hydrogen and methyl;
each X is independently selected from —O—, —S—, —NH—, and —N(—CH$_3$)—;
p is an integer from 2 to 6;
q is an integer from 1 to 5; and
r is an integer from 2 to 10;
each $R^2$ is independently selected from $C_{3-10}$ alkanediyl, substituted $C_{3-10}$ alkanediyl, $C_{3-10}$ heteroalkanediyl, and substituted $C_{3-10}$ heteroalkanediyl; and
each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl.

Aspect 26. The sealant composition of aspect 25, wherein, n is an integer from 1 to 5;

$R^1$ is —$(CH_2)_2$—O—$(CH_2)_2$—O—$(CH_2)_2$—;

$R^2$ is —$(CH_2)_4$—O—$(CH_2)_2$—; and $R^5$ is selected from:

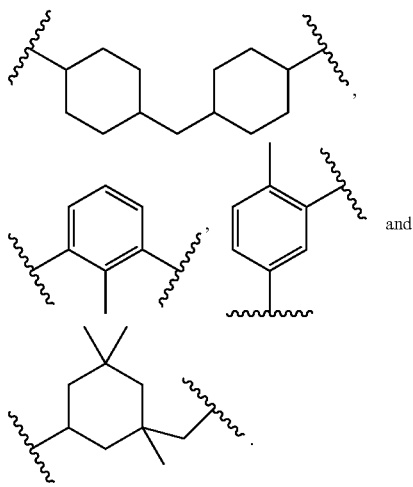

Aspect 27. The composition of any one of aspects 1 to 26, wherein the polyalkenyl comprises a urethane-containing polyalkenyl of Formula (8a), a urea-containing polyalkenyl of Formula (8b), or a combination thereof:

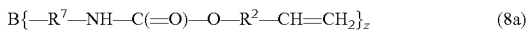  (8a)

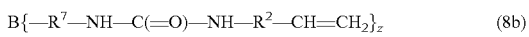  (8b)

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

$R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and B represents a core of a z-valent, polyfunctionalizing agent B(—V)$_z$ wherein, z is an integer from 3 to 6; and each —V comprises —$R^7$—N=C=O.

Aspect 28. The composition of aspect 27, wherein, z is 3;

$R^2$ is —$(CH_2)_4$—O—;

$R^7$ is —$(CH_2)_6$—; and

B is

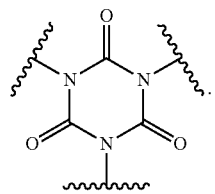 [SMILES: *n1c(=O)n(*)c(=O)n(*)c1=O]

Aspect 29. The composition of any one of aspects 1 to 28, wherein the polythiol comprises a urethane-containing polythiol of Formula (4a), a urea-containing polythiol of Formula (4b), or a combination thereof:

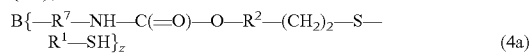  (4a)

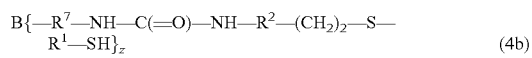  (4b)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^3)_p$—X—]$_q$—$(CHR^3)_r$—;

wherein, each $R^3$ is independently selected from hydrogen and methyl;

each X is independently selected from —O—, —S—, —NH—, and —N(—$CH_3$)—;

p is an integer from 2 to 6;

q is an integer from 1 to 5; and r is an integer from 2 to 10;

$R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

$R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and B represents a core of a z-valent, polyfunctionalizing agent B(—V)$_z$ wherein, z is an integer from 3 to 6; and each —V comprises —$R^7$—N=C=O.

Aspect 30. The composition of any one of aspects 1 to 29, wherein the polythiol comprises a dithiol of Formula (1a), a polythiol of Formula (1b), or a combination thereof:

  (1a)

  (1b)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^3)_p$—X—]$_q$—$(CHR^3)_r$—;

wherein, each $R^3$ is independently selected from hydrogen and methyl;

each X is independently selected from —O—, —S—, —NH—, and —N(—$CH_3$)—;

p is an integer from 2 to 6;

q is an integer from 1 to 5; and r is an integer from 2 to 10;

B represents a core of a z-valent, polyfunctionalizing agent B(—V)$_z$ wherein, z is an integer from 3 to 6; and each —V is a moiety comprising a terminal group reactive with a thiol group; and each —V'— is derived from the reaction of —V with a thiol.

Aspect 31. The composition of aspect 30, wherein $R^1$ is —$(CH_2)_2$—O—$(CH_2)_2$—O—$(CH_2)_2$—.

Aspect 32. The composition of any one of aspects 1 to 31, wherein the polythiol comprises trimethylolpropane tri(3-mercaptopropionate) (TMPMP), pentaerythritol tetra(3-mercaptopropionate) (PETMP), dipentaerythritol hexa(3-mercaptopropionate), ethoxylated trimethylolpropane tri(3-mercaptopropionate), ethoxylated trimethylolpropane tri(3-mercaptopropionate), tris[2-(3-mercaptopropionyloxy) ethyl] isocyanurate (TEMPIC), or combinations of any of the foregoing.

Aspect 33. The composition of any one of aspects 1 to 32, wherein the composition comprises from 35 wt % to 75 wt % of a urethane/urea-containing polyalkenyl prepolymer, wherein wt % is based on the total weight of the composition.

Aspect 34. The composition of any one of aspects 1 to 33, wherein the composition comprises from 5 wt % to 25 wt % of a polythiol without urethane groups or urea groups, wherein wt % is based on the total weight of the composition.

Aspect 35. The composition of any one of aspects 1 to 34, wherein the composition comprises from 0.5 wt % to 4 wt % of an inorganic filler, wherein wt % is based on the total weight of the composition.

Aspect 36. The composition of any one of aspects 1 to 35, wherein the composition comprises from 15 wt % to 35 wt % solvent, wherein wt % is based on the total weight of the composition.

Aspect 37. The composition of any one of aspects 1 to 36, wherein the composition comprises from 35 wt % to 75 wt % of a urethane/urea-containing polyalkenyl prepolymer and from 5 wt % to 25 wt % of a polythiol without urethane groups or urea groups.

Aspect 38. The composition of any one of aspects 1 to 37, wherein the composition comprises from 45 wt % to 85 wt % of a urethane/urea-containing polyalkenyl prepolymer, from 10 wt % to 30 wt % of a polythiol without urethane groups or urea groups, and from 4 wt % to 14 wt % solvent, where wt % is based on the total weight of the composition.

Aspect 39. The composition of any one of aspects 1 to 38, wherein the composition comprises a pigment.

Aspect 40. The composition of any one of aspects 1 to 39, wherein the composition comprises a UV photoinitiator.

Aspect 41. The composition of any one of aspects 1 to 40, formulated as a sealant.

Aspect 42. The composition of aspect 41, wherein the composition is sprayable.

Aspect 43. The composition of any one of aspects 41 to 42, wherein the composition exhibits a viscosity from 10 poise to 200 poise (10 Pa-sec to 20 Pa-sec), using a Brookfield CAP 2000 viscometer, with a No. 6 spindle, at speed of 300 rpm, and a temperature of 25° C.

Aspect 44. The composition of any one of aspects 1 to 43, wherein the composition has a volatile organic content of less than 40 wt %, wherein wt % is based on the total weight of the composition.

Aspect 45. A cured composition prepared from the composition of any one of aspects 41 to 44.

Aspect 46. The cured composition of aspect 45, wherein the cured composition exhibits one or more of the following: a minimum load of at least 9 lbf; a tensile stress of at least 700 psi at a maximum load; a tensile strain of at least 600% at the maximum load; and a hardness of at least Shore 35A; wherein the load, tensile stress, and tensile strain are determined according to ASTM D412, and the hardness is determined according to ASTM D2240.

Aspect 47. The cured composition of any one of aspects 45 to 46, wherein the cured composition is optically transparent.

Aspect 48. A method of sealing a part, comprising: applying the composition of any one of aspects 41 to 45 to a surface of a part; exposing the applied composition to ultraviolet radiation; and allowing the irradiated composition to cure to seal the part.

Aspect 49. The method of aspect 48, wherein applying the composition comprises spraying the composition onto the surface of the part.

Aspect 50. A part comprising the cured composition of any one of aspects 45 to 47.

Aspect 51. The part of aspect 50, wherein the part comprises an aperture, a surface, a joints, a fillets, a fay surface, or a fastener.

Aspect 52. The part of any one of aspects 50 to 51, wherein the part comprises a surface of an aerospace vehicle.

Aspect 53. A difunctional polythiol, wherein the difunctional polythiol comprises a urethane-containing dithiol of Formula (2a), a urea-containing dithiol of Formula (2b), or a combination thereof:

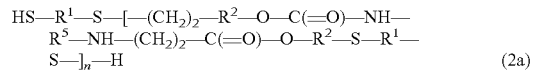

$$HS—R^1—S—[—(CH_2)_2—R^2—O—C(=O)—NH—R^5—NH—(CH_2)_2—C(=O)—O—R^2—S—R^1—S—]_n—H \quad (2a)$$

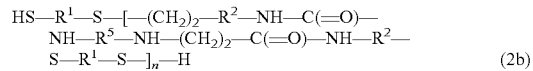

$$HS—R^1—S—[—(CH_2)_2—R^2—NH—C(=O)—NH—R^5—NH—(CH_2)_2—C(=O)—NH—R^2—S—R^1—S—]_n—H \quad (2b)$$

wherein, n is an integer from 1 to 20;

$R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and —[—$(CHR^3)_p$—X—$]_q$—$(CHR^3)_r$—; wherein, each $R^3$ is independently selected from hydrogen and methyl;

each X is independently selected from —O—, —S—, —NH—, and —N(—$CH_3$)—;

p is an integer from 2 to 6;

q is an integer from 1 to 5; and r is an integer from 2 to 10;

each $R^2$ is independently selected from $C_{3-10}$ alkanediyl, substituted $C_{3-10}$ alkanediyl, $C_{3-10}$ heteroalkanediyl, and substituted $C_{3-10}$ heteroalkanediyl; and each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl.

Aspect 54. A urethane/urea-containing polythiol, wherein the urethane/urea-containing polythiol comprises a urethane-containing polythiol of Formula (4a), a urea-containing polythiol of Formula (4b), or a combination thereof:

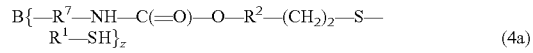

$$B\{—R^7—NH—C(=O)—O—R^2—(CH_2)_2—S—R^1—SH\}_z \quad (4a)$$

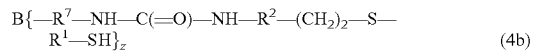

$$B\{—R^7—NH—C(=O)—NH—R^2—(CH_2)_2—S—R^1—SH\}_z \quad (4b)$$

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;

wherein, each $R^3$ is independently selected from hydrogen and methyl;

each X is independently selected from $-O-$, $-S-$, $-NH-$, and $-N(-CH_3)-$;

p is an integer from 2 to 6;

q is an integer from 1 to 5; and r is an integer from 2 to 10;

$R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

B represents a core of a z-valent, polyfunctionalizing agent $B(-V)_z$ wherein, z is an integer from 3 to 6;

each $-V$ comprises $-R^7-N=C=O$; and $R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and each $-V'-$ is derived from the reaction of $-V$ with a hydroxyl group or an amino group.

Aspect 55. A urethane/urea-containing polythiol, wherein the urethane/urea-containing polythiol comprises a urethane/urea-containing polythiol of Formula (4c), a urea-containing polythiol of Formula (4d), or a combination thereof:

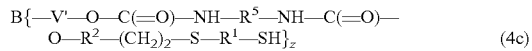

B{—V'—O—C(=O)—NH—R⁵—NH—C(=O)—O—R²—(CH₂)₂—S—R¹—SH}_z     (4c)

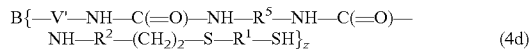

B{—V'—NH—C(=O)—NH—R⁵—NH—C(=O)—NH—R²—(CH₂)₂—S—R¹—SH}_z     (4d)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;

wherein, each $R^3$ is independently selected from hydrogen and methyl;

each X is independently selected from $-O-$, $-S-$, $-NH-$, and $-N(-CH_3)-$;

p is an integer from 2 to 6;

q is an integer from 1 to 5; and r is an integer from 2 to 10;

$R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$ heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl;

B represents a core of a z-valent, polyfunctionalizing agent $B(-V)_z$ wherein, z is an integer from 3 to 6; and each $-V$ is a moiety comprising a terminal group reactive with an isocyanate group; and each $-V'-$ is derived from the reaction of $-V$ with a terminal group reactive with an isocyanate group.

Aspect 56. A hydroxyl-functional polythiol, wherein the hydroxyl-functional polythiol comprises a hydroxyl-functional polythiol 5 of Formula (5a), a hydroxyl-functional polythiol 5 of Formula (5b), a hydroxyl-functional polythiol of Formula (5c), or a combination of any of the foregoing:

HS—R¹—S—R⁴—S—R¹—SH     (5a)

B{—V'—S—R¹—SH}_z     (5b)

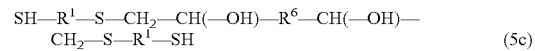

SH—R¹—S—CH₂—CH(—OH)—R⁶—CH(—OH)—CH₂—S—R¹—SH     (5c)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;

wherein, each $R^3$ is independently selected from hydrogen and methyl;

each X is independently selected from $-O-$, $-S-$, $-NH-$, and $-N(-CH_3)-$;

p is an integer from 2 to 6;

q is an integer from 1 to 5; and r is an integer from 2 to 10;

$R^4$ is selected from substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, $C_{7-20}$ alkanearenediyl, and substituted $C_{7-20}$ heteroalkanearenediyl, wherein $R^4$ comprises at least one hydroxyl group;

$R^6$ is selected from $C_{2-10}$ alkanediyl, $C_{2-10}$ heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, and $C_{7-20}$ heteroalkanearenediyl, B represents a core of a z-valent, polyfunctionalizing agent $B(-V)_z$ wherein, z is an integer from 3 to 6; and each V is a moiety comprising a terminal group reactive with a thiol group; and each $-V'-$ is derived from the reaction of $-V$ with a thiol and comprises at least one hydroxyl group.

Aspect 57. A difunctional urethane/urea-containing polyalkenyl prepolymer, wherein the difunctional urethane/urea-containing polyalkenyl prepolymer comprises a urethane-containing polyalkenyl prepolymer of Formula (6a), a urethane-containing polyalkenyl prepolymer of Formula (6b) or a combination thereof:

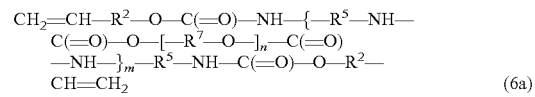

CH₂=CH—R²—O—C(=O)—NH—{—R⁵—NH—C(=O)—O—[—R⁷—O—]_n—C(=O)—NH—}_m—R⁵—NH—C(=O)—O—R²—CH=CH₂     (6a)

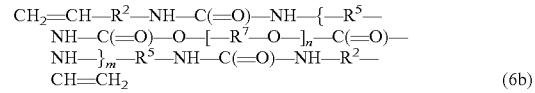

CH₂=CH—R²—NH—C(=O)—NH—{—R⁵—NH—C(=O)—O—[—R⁷—O—]_n—C(=O)—NH—}_m—R⁵—NH—C(=O)—NH—R²—CH=CH₂     (6b)

wherein, m is an integer from 1 to 20;

n is an integer from 1 to 20;

each $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and each $R^7$ independently selected from $C_{2-10}$ alkanediyl, substituted $C_{2-10}$ alkanediyl, $C_{2-10}$ heteroalkanediyl, and substituted $C_{2-10}$ heteroalkanediyl.

Aspect 58. A urethane/urea-containing polyalkenyl adduct, the urethane/urea-containing polyalkenyl adduct comprises a urethane-containing polyalkenyl adduct of Formula (8a), urea-containing polyalkenyl adduct of Formula (8b), or a combination thereof:

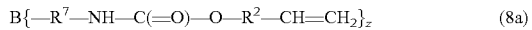

$$B\{-R^7-NH-C(=O)-O-R^2-CH=CH_2\}_z \quad (8a)$$

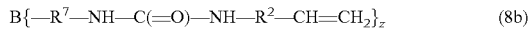

$$B\{-R^7-NH-C(=O)-NH-R^2-CH=CH_2\}_z \quad (8b)$$

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

$R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and B represents a core of a z-valent, polyfunctionalizing agent $B(-R^7-N=C=O)_z$ wherein z is an integer from 3 to 6.

Aspect 59. A urethane/urea-containing polyalkenyl, wherein the urethane/urea-containing polyalkenyl comprises a urethane-containing polyalkenyl of Formula (8c), a urea-containing polyalkenyl of Formula (8d), or a combination thereof:

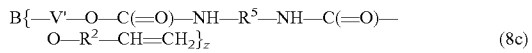

$$B\{-V'-O-C(=O)-NH-R^5-NH-C(=O)-O-R^2-CH=CH_2\}_z \quad (8c)$$

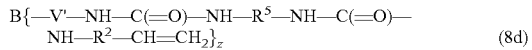

$$B\{-V'-NH-C(=O)-NH-R^5-NH-C(=O)-NH-R^2-CH=CH_2\}_z \quad (8d)$$

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl. substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl;

B represents a core of a z-valent, polyfunctionalizing agent $B(-V)_z$ wherein, z is an integer from 3 to 6; and each —V comprises a moiety comprising a terminal group reactive with an isocyanate group; and —V'— is a moiety derived from the reaction of —V with an isocyanate group.

Aspect 60. A urethane/urea-containing polyalkenyl, wherein the urethane/urea-containing polyalkenyl comprises a urethane-containing polyalkenyl of Formula (8c), a urea-containing polyalkenyl of Formula (8d), or a combination thereof:

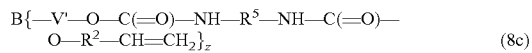

$$B\{-V'-O-C(=O)-NH-R^5-NH-C(=O)-O-R^2-CH=CH_2\}_z \quad (8c)$$

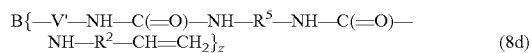

$$B\{-V'-NH-C(=O)-NH-R^5-NH-C(=O)-NH-R^2-CH=CH_2\}_z \quad (8d)$$

wherein, $R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;

each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl. substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl;

B represents a core of a z-valent, polyfunctionalizing agent $B(-V)_z$ wherein, z is an integer from 3 to 6; and each —V comprises a moiety comprising a terminal group reactive with an isocyanate group; and —V'— is a moiety derived from the reaction of —V with an isocyanate group.

Aspect 61. A sealant system comprising: a first part, wherein the first part comprises a polythiol; and a second part, wherein the second part comprises a polyalkenyl, wherein the polyalkenyl comprises: a urethane-containing polyalkenyl prepolymer; a urea-containing polyalkenyl prepolymer; or a combination thereof.

Aspect 62. The sealant system of aspect 61, wherein the polyalkenyl comprises the polyalkenyl of any one of aspects 2 to 32.

Aspect 63. The sealant system of any one of aspects 61 to 62, wherein the polythiol comprises the polythiol of any one of aspects 2 to 32.

Aspect 64. The sealant system of any one of aspects 61 to 63, wherein the first part comprises from 50 wt % to 90 wt % of the polythiol, and the second part comprises from 76 wt % to 96 wt % of the polyalk3enyl Aspect 65. The sealant system of any one of aspects 61 to 64, comprising a combination of the first part, the second part, and a solvent.

Aspect 66. A method of sealing a part, comprising: combining the first part of the sealant system of any one of aspects 61 to 64 and the second part of the sealant system of any one of aspects 61 to 64 to provide a sealant composition; applying the sealant composition to a surface of a part; exposing the applied composition to actinic radiation; and allowing the irradiated composition to cure to seal the part.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A composition comprising
(a) a polythiol, wherein the polythiol comprises a thiol-terminated polythioether urethane-containing prepolymer of Formula (2a), a thiol-terminated urea-containing polythioether prepolymer of Formula (2b), or a combination thereof:

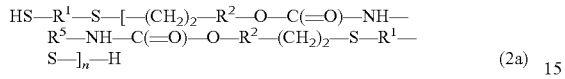  (2a)

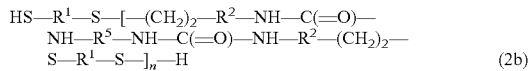  (2b)

wherein,
n is an integer from 1 to 20;
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q(CHR^3)_r-$; wherein,
each $R^3$ is independently selected from hydrogen and methyl;
each X is independently selected from $-O-$, $-S-$, $-NH-$, and $-N(-CH_3)-$;
p is an integer from 2 to 6;
q is an integer from 1 to 5; and
r is an integer from 2 to 10;
each $R^2$ is independently selected from $C_{3-10}$ alkanediyl, substituted $C_{3-10}$ alkanediyl, $C_{3-10}$ heteroalkanediyl, and substituted $C_{3-10}$ heteroalkanediyl; and
each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{720}$ heteroalkanearenediyl, substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and
(b) a polyalkenyl, wherein the polyalkenyl comprises a polyalkenyl-terminated urethane-containing prepolymer; a polyalkenyl-terminated urea-containing prepolymer; or a combination thereof.

2. The composition of claim 1, wherein the polythiol comprises:
a polythiol that does not contain a urethane group or a urea group.

3. The composition of claim 1, wherein the polythiol comprises a monomeric polythiol having a thiol functionality from 3 to 6.

4. The composition of claim 1, wherein the polythiol comprises a hydroxyl-functional polythiol.

5. The composition of claim 1, wherein,
the polyalkenyl-terminated urethane-containing-prepolymer comprises a difunctional alkenyl-terminated urethane-containing prepolymer;

the polyalkenyl-terminated urea-containing-prepolymer comprises a difunctional alkenyl-terminated urea-containing prepolymer; or
a combination thereof.

6. The composition of claim 1, wherein the polyalkenyl comprises:
a difunctional polyalkenyl-terminated urethane-containing prepolymer of Formula (6a);
a difunctional polyalkenyl-terminated urea-containing prepolymer of Formula (6b);
or a combination thereof:

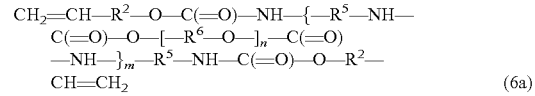  (6a)

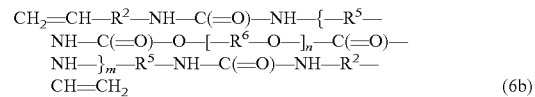  (6b)

wherein,
m is an integer from 1 to 20;
n is an integer from 1 to 20;
each $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;
each $R^5$ is independently selected from $C_{2-10}$ alkanediyl, $C_{2-10}$, heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl substituted $C_{2-10}$ alkanediyl, substituted $C_{2-10}$, heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and
each $R^6$ is independently selected from $C_{2-10}$ alkanediyl, substituted $C_{2-10}$ alkanediyl, $C_{2-10}$ heteroalkanediyl, and substituted $C_{2-10}$ heteroalkanediyl.

7. The composition of claim 1, wherein the polyalkenyl comprises a urethane-containing polyalkenyl of Formula (8a), a urea-containing polyalkenyl of Formula (8b), or a combination thereof:

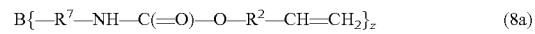  (8a)

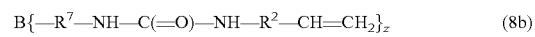  (8b)

wherein,
$R^2$ is selected from $C_{2-10}$ alkanediyl, substituted $C_{2-10}$ alkanediyl, $C_{2-10}$ heteroalkanediyl, and substituted $C_{2-10}$ heteroalkanediyl;
$R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and
B represents a core of a z-valent, polyfunctionalizing agent $B(-V)_z$ wherein,
z is an integer from 3 to 6; and
each $-V$ comprises $-R^7-N=C=O$.

8. The composition of claim 1, wherein the polythiol comprises a urethane-containing polythiol of Formula (4a), a urea-containing polythiol of Formula (4b), or a combination thereof:

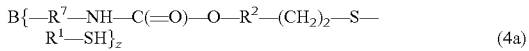
(4a)

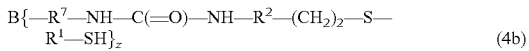
(4b)

wherein,
- $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_p$—X—]$_q$—(CHR$^3$)$_r$—; wherein,
  - each $R^3$ is independently selected from hydrogen and methyl;
  - each X is independently selected from —O—, —S—, —NH—, and —N(—CH$_3$)—;
  - p is an integer from 2 to 6;
  - q is an integer from 1 to 5; and
  - r is an integer from 2 to 10;
- $R^2$ is independently selected from $C_{2-10}$ alkanediyl, substituted $C_{2-10}$ alkanediyl, $C_{2-10}$ heteroalkanediyl, and substituted $C_{2-10}$ heteroalkanediyl;
- $R^7$ is selected from $C_{2-10}$ alkanediyl, substituted $C_{2-10}$ alkanediyl, $C_{2-10}$ heteroalkanediyl, and substituted $C_{2-10}$ heteroalkanediyl; and
- B represents a core of a z-valent, polyfunctionalizing agent B(—V)$_z$ wherein,
  - z is an integer from 3 to 6; and
  - each —V comprises —R$^7$—N=C=O.

9. The composition of claim 1, wherein the polythiol comprises a dithiol of Formula (1a), a polythiol of Formula (1b), or a combination thereof:

HS—R$^1$—SH (1a)

B{—V'—S—R$^1$—SH}$_z$ (1b)

wherein,
- $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_p$—X—]$_q$—(CHR$^3$)$_r$—; wherein,
  - each $R^3$ is independently selected from hydrogen and methyl;
  - each X is independently selected from —O—, —S—, —NH—, and —N(—CH$_3$)—;
  - p is an integer from 2 to 6;
  - q is an integer from 1 to 5; and
  - r is an integer from 2 to 10;
- B represents a core of a z-valent, polyfunctionalizing agent B(—V)$_z$ wherein,
  - z is an integer from 3 to 6; and
  - each —V is a moiety comprising a terminal group reactive with a thiol group; and
  - each —V'— is derived from the reaction of —V with a thiol.

10. The composition of claim 1, wherein the polythiol comprises trimethylolpropane tri(3-mercaptopropionate) (TMPMP), pentaerythritol tetra(3-mercaptopropionate) (PETMP), dipentaerythritol hexa(3-mercaptopropionate), ethoxylated trimethylolpropane tri(3-mercaptopropionate), ethoxylated trimethylolpropane tri(3-mercaptopropionate), tris[2-(3-mercaptopropionyloxy)ethyl] isocyanurate (TEMPIC), or combinations of any of the foregoing.

11. The composition of claim 1, wherein the composition comprises:

from 35 wt % to 75 wt % of the alkenyl-terminated urethane-containing prepolymer, the alkenyl-terminated urea-containing prepolymer, or a combination thereof,
from 5 wt % to 25 wt % of a polythiol without urethane groups or urea groups, and
from 15 wt % to 35 wt % solvent, wherein wt % is based on the total weight of the composition.

12. The composition of claim 1, formulated as a sealant.

13. The composition of claim 12, wherein the composition is sprayable.

14. The composition of claim 13, wherein the composition has a volatile organic content of less than 40 wt %, wherein wt % is based on the total weight of the composition.

15. A method of sealing a part, comprising:
applying the composition of claim 12 to a surface of a part;
exposing the applied composition to actinic radiation; and
allowing the irradiated composition to cure to seal the part.

16. A part comprising a cured sealant prepared from the composition of claim 12.

17. A sealant system comprising:
(a) a first part, wherein the first part comprises a polythiol, wherein the polythiol comprises a thiol-terminated urethane-containing polythioether prepolymer of Formula (2a), a thiol-terminated urea-containing polythioether prepolymer of Formula (2b), or a combination thereof:

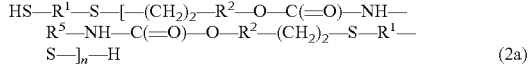
(2a)

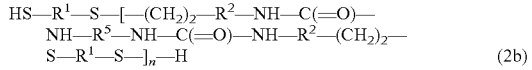
(2b)

wherein,
- n is an integer from 1 to 20;
- $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_p$—X—]$_q$—(CHR$^3$)$_r$—; wherein,
  - each $R^3$ is independently selected from hydrogen and methyl;
  - each X is independently selected from —O—, —S—, —NH—, and —N(—CH$_3$)—;
  - p is an integer from 2 to 6;
  - q is an integer from 1 to 5; and
  - r is an integer from 2 to 10;
- each $R^2$ is independently selected from $C_{3-10}$ alkanediyl, substituted $C_{3-10}$ alkanediyl, $C_{3-10}$ heteroalkanediyl, and substituted $C_{3-10}$ heteroalkanediyl; and
- each $R^5$ is independently selected from $C_{2-10}$ alkanediyl, $C_{2-10}$ heteroalkanediyl, $C_{5-12}$ cycloalkanediyl, $C_{5-12}$ heterocycloalkanediyl, $C_{6-20}$ arenediyl, $C_{5-20}$ heteroarenediyl, $C_{6-20}$ alkanecycloalkanediyl, $C_{6-20}$ heteroalkanecycloalkanediyl, $C_{7-20}$ alkanearenediyl, $C_{7-20}$ heteroalkanearenediyl, substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, substituted $C_{6-20}$ alkanecycloalkanediyl, substituted $C_{6-20}$ heteroalkanecycloalkanediyl, substituted $C_{7-20}$ alkanearenediyl, and substituted $C_{7-20}$ heteroalkanearenediyl; and (b) a second part, wherein the second part comprises a polyalkenyl, wherein the polyalkenyl comprises: an alkenyl-terminated urethane-containing prepolymer; an alkenyl-terminated urea-containing prepolymer; or a combination thereof.

18. The sealant system of claim 17, comprising a combination of the first part, the second part, and a solvent.

19. A method of sealing a part, comprising:

combining the first part of the sealant system of claim 17 and the second part of the sealant system of claim 17 to provide a sealant composition;

applying the sealant composition to a surface of a part;

exposing the applied composition to actinic radiation; and allowing the irradiated composition to cure to seal the part.

20. The composition of claim 1, wherein the polythiol comprises a hydroxyl-functional polythiol having the structure of Formula (5a), a hydroxyl-functional polythiol having the structure of Formula (5b), or a combination thereof:

$$HS-R^1-S-R^4-S-R^1-SH \quad (5a)$$

$$B\{-V'-S-R^1-SH\}_z \quad (5b)$$

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$; wherein, each $R^3$ is independently selected from hydrogen and methyl;

each X is independently selected from $-O-$, $-S-$, $-NH-$, and $-N(-CH_3)-$;

p is an integer from 2 to 6;

q is an integer from 1 to 5; and r is an integer from 2 to 10;

$R^4$ is selected from substituted $C_{2-10}$ alkanediyl, substituted $C_{2-10}$ heteroalkanediyl, substituted $C_{5-12}$ cycloalkanediyl, substituted $C_{5-12}$ heterocycloalkanediyl, substituted $C_{6-20}$ arenediyl, substituted $C_{5-20}$ heteroarenediyl, $C_{6-20}$ alkanecycloalkanediyl, and substituted $C_{6-20}$ heteroalkanecycloalkanediyl, wherein $R^4$ comprises at least one hydroxyl group;

B represents a core of a z-valent, polyfunctionalizing agent $B(-V)_z$ wherein, z is an integer from 3 to 6; and each V is a moiety comprising a terminal group reactive with a thiol group; and each $-V'-$ is derived from the reaction of $-V$ with a thiol and comprises at least one hydroxyl group.

* * * * *